United States Patent [19]
Contreras et al.

[11] Patent Number: 5,995,306
[45] Date of Patent: Nov. 30, 1999

[54] HANDLING DEFECTIVE FRAMES ON HARD SECTORED MAGNETIC TAPE

[75] Inventors: John M. Contreras, deceased, late of Longmont, by Marie Contreras, legal representative; Steven F. Hartung, Boulder; Daniel J. Canterbury, Berthoud; Mark R. Ayres, Boulder, all of Colo.

[73] Assignee: Exabyte Corporation, Boulder, Colo.

[21] Appl. No.: 08/788,790

[22] Filed: Jan. 24, 1997

Related U.S. Application Data

[60] Provisional application No. 60/010,695, Jan. 26, 1996, provisional application No. 60/010,683, Jan. 26, 1996, provisional application No. 60/010,682, Jan. 26, 1996, provisional application No. 60/010,681, Jan. 26, 1996, provisional application No. 60/010,693, Jan. 26, 1996, provisional application No. 60/010,680, Jan. 26, 1996, and provisional application No. 60/034,092, Dec. 30, 1996.

[51] Int. Cl.$^6$ ................................................. G11B 27/36
[52] U.S. Cl. .................... 360/31; 360/53; 360/54
[58] Field of Search ............................ 360/13, 31, 53, 360/54, 47–50, 77.05; 386/1, 46, 113, 21

[56] References Cited

U.S. PATENT DOCUMENTS

| | | |
|---|---|---|
| 4,395,738 | 7/1983 | Hedlund et al. .......................... 358/335 |
| 4,415,938 | 11/1983 | Heitmann ................................... 360/53 |
| 4,494,155 | 1/1985 | Veillard ..................................... 360/47 |
| 4,637,023 | 1/1987 | Lounsbury et al. . |
| 4,638,472 | 1/1987 | Ogata et al. . |
| 4,835,757 | 5/1989 | Abiko ........................................ 369/54 |
| 4,899,232 | 2/1990 | Odaka et al. . |
| 4,984,230 | 1/1991 | Satoh et al. ................................ 369/54 |
| 5,142,422 | 8/1992 | Zook et al. . |
| 5,258,852 | 11/1993 | Kamijima ................................. 358/335 |
| 5,394,277 | 2/1995 | Pahr et al. ................................. 360/53 |
| 5,546,246 | 8/1996 | Klomp et al. . |

Primary Examiner—John W. Cabeca
Assistant Examiner—Dan I. Davidson
Attorney, Agent, or Firm—Nixon & Vanderhye, P.C.

[57] ABSTRACT

Method and apparatus are provided for re-recording of a frame on magnetic tape (22) when a first recording of the frame is determined to be defective. A frame whose first recording is defective is re-recorded at a spare or reserved location on the tape. The reserved location is dedicated to re-recording of frames, and otherwise cannot have data stored therein. The tape contains a defect map frame (326) which is used to pair physical locations of defective frames with the reserved location whereat the frame is re-recorded. In one embodiment, the reserved location whereat a frame is re-recorded is a reserved physical frame on the same track in which the defective frame is recorded. In another embodiment, the reserved location is on a reserved portion of a track (TG39R) which is not the original track (TG39) upon which the frame is recorded. For embodiments having multi-channel or multi-track frames, the reserved location employs a corresponding plurality of tracks.

19 Claims, 31 Drawing Sheets

| FIG. 2A | FIG. 2B |

| SYNC.<br>14 CHANNEL<br>BITS | ID<br>1 SYMBOL | AUX<br>1 SYMBOL | DATA<br>64 SYMBOLS | PARITIES<br>6 SYMBOLS |
|---|---|---|---|---|

| n-2 GOOD | n-1 GOOD | n GOOD | n+1 GOOD | n+2 GOOD | n+3 GOOD | n+4 GOOD |

FIG. 28

| n-1 GOOD | n BAD | n+1 GOOD | n GOOD | n+1 GOOD | n+2 GOOD | n+3 GOOD |

FIG. 29

| n BAD | n+1 BAD | n BAD | n+1 GOOD | n GOOD | n+1 GOOD | n+2 GOOD |

FIG. 30

| n BAD | n+1 BAD | n GOOD | n+1 GOOD | n+2 GOOD | n+3 GOOD | n+4 GOOD |

FIG. 31

| n BAD | n-1 BAD | n GOOD | n+1 BAD | n+2 GOOD | n+1 GOOD | n+2 GOOD |

FIG. 32

| n-2 PASS CNT=5 | n-1 PASS CNT=5 | n PASS CNT=4 | n+1 PASS CNT=4 | n PASS CNT=5 | n+1 PASS CNT=5 | n+2 PASS CNT=5 |

FIG. 33

HANDLING DEFECTIVE FRAMES ON HARD SECTORED MAGNETIC TAPE

This application is based on and claims priority from the following Provisional Applications: No. 60/010,695, filed Jan. 26, 1996; No. 60/010,683, filed Jan. 26,1996; No. 60/010,682, filed Jan. 26,1996; No. 601010,681, filed Jan. 26,1996; No. 60/010,693, filed Jan. 26,1996; No. 60/010,680, filed Jan. 26,1996; and No. 60/034,092, filed Dec. 30,1996 entitled: Multipurpose Digital Recording Method and Apparatus for Media Therefor.

This application claims benefit and priority of the following United States provisional patent applications, all of which are incorporated herein by reference:

United States Provisional Application Ser. No. 60/010,695 filed Jan. 26, 1996 entitled RECORDING METHOD AND APPARATUS FOR MULTIPURPOSE DIGITAL RECORDER.

United States Provisional Application Ser. No. 60/010,683 filed Jan. 26, 1996 entitled METHOD FOR READ/WRITE INTERCHANGEABLE AUDIO/VIDEO DATA IN A MULTI-MODE TAPE FORMAT.

United States Provisional Application Ser. No. 60/010,682 filed Jan. 26, 1996 entitled END OF TRACK WARNING IN SERPENTINE RECORDING.

United States Provisional Application Ser. No. 60/010,681 filed Jan. 26, 1996 entitled METHOD FOR TILED PARTITIONING IN HARD SECTORED SERPENTINE RECORDING.

United States Provisional Application Ser. No. 60/010,693 filed Jan. 26, 1996 entitled RECORDING METHOD AND APPARATUS FOR MULTIPURPOSE DIGITAL RECORDER.

United States Provisional Application Ser. No. 60/010,680 filed Jan. 26, 1996 entitled SPARING FRAMES IN ERROR FOR A RANDOM ACCESS TAPE.

United States Provisional Application Ser. No. 60/010,695, filed Dec. 30, 1996 entitled MULTIPURPOSE DIGITAL RECORDING METHOD AND APPARATUS FOR MEDIA THEREFOR.

BACKGROUND

A portion of this disclosure of this patent document contains material which is subject to copyright protection. The copyright owner has no objection to the facsimile reproduction by anyone of the patent document or the patent disclosure, as it appears in the Patent and Trademark office patent file or records, but otherwise reserves all copyright rights whatsoever.

1. Field of Invention

This invention pertains to recording and reading information on magnetic tape, and particularly to error techniques for handling re-recording and/or reading a frame of information when it has been discovered that the frame was originally erroneously recorded or is unreadable from the tape.

2. Related Art and Other Considerations

In magnetic tape recording, a head unit having one or more head elements transduces information onto or from an elongated magnetic tape which is transported past the head unit. Information is typically recorded in units known as blocks or frames on tracks or stripes of the magnetic tape. The tracks or stripes are formed in dependence upon the transport direction of the tape and (in cases of helical scan recording, for example) any relative motion of the head unit relative to the tape. In view of factors including the transport of the tape, magnetic tape recording is conventionally viewed as a sequential recording technique, since the blocks or frames must be accessed one at a time and in order in a tape read process.

Many magnetic tape recording devices, sometimes known as drives or recorders, have the capability of reading back a block or frame soon after it is recorded in order to determine the fidelity of the recorded block or frame. This capability is generally referred to as "read after write" or "read while write", and is typically implemented by providing the head unit with a read element which follows a write element as it writes a track. If a block or frame as recorded as read back does not agree with what the drive intended to record or otherwise does not meet prescribed error correction criteria, the recorded block or frame is determined to be a bad block or bad frame.

Upon discovery of a defective frame, magnetic tape drives conventionally attempt to rewrite the frame in the next available physical location on the tape. Some techniques essentially involve the re-recording of frames which follow the re-recorded frame, since other frames may have been recorded before the drive detected the discovery of the recordation of the bad frame. See, for example, U.S. Patent U.S. Pat. No. 4,637,023 to Lounsbury et al.

Another technique is the re-recording of a frame or block in a subsequent user-available location on the tape. That is, the frame again appears in the output stream of the drive and is re-recorded in the course of recording subsequent blocks in a non-restricted, user-available portion of the tape. The subsequent location may be chosen to avoid potential media defects or may depend upon selection of one of a plurality of heads in the head unit. See U.S. Pat. No. 5,142,422 to Zook et al., which is incorporated herein by reference.

Magnetic disks have differing operation constraints and conditions than magnetic tape. Conventional practice in the magnetic disk technology is to reserve a portion of the disk for re-recording of bad sectors, the reserved portion of the disk being unavailable for access by the user's other data. The magnetic disk typically has a map of bad sectors, so that a disk drive knows to locate a sector in its bad sector map in the reserved portion of the disk. See, for example, U.S. Pat. No. 4,638,472 to Ogata et al.

Some magnetic tapes are specially prepared by the tape manufacturer to have a servo signal or the like permanently recorded thereon at a frequency which is outside the frequency range of the data which will be recorded on the tape by the user's tape drive. Such a servo signal, e.g, a buried servo signal, can serve to form demarcations or sectoring of the tape, known as hard sectors, such that the blocks or frames recorded on the tape each have a permanent physical location. In a hard sectored format, a tape may be used as a random access device allowing the host to select the location. For the host to be able to select the best locations, the partition geometry relative to the data locations must not be corrupted.

When using such a hard sectored tape with fixed physical locations for frames, and assuming the drive has read while write capabilities, there is a problem when one records or updates a frame and then discovers, during the read back of the frame, that the frame was erroneously recorded or is not readable from the tape. Standard techniques of rewriting the frame on tape at subsequent frame position on the tape cannot be employed, since that subsequent frame position has a fixed physical location which has already been allocated to another frame of the tape.

What is needed therefore, and an object of the present invention, is a technique for handling the re- recording and reading of frames which were erroneously recorded on hard sectored magnetic tape.

SUMMARY

Method and apparatus are provided for re-recording of a frame on magnetic tape when a first recording of the frame is determined to be defective. A frame whose first recording is defective is re-recorded at a spare or reserved location on the tape. The reserved location is dedicated to re-recording of frames, and otherwise cannot have data stored therein. The tape contains a defect map frame which is used to pair physical locations of defective frames with the reserved location whereat the frame is re-recorded.

In one embodiment, the reserved location whereat a frame is re-recorded is a reserved physical frame on the same track in which the defective frame is recorded. In fact, a plurality of reserved locations is provided on the same track with user data frames and are interspersed among physical frame locations of the user data frames track. Consecutive ones of the plurality of reserved locations on the same track are separated by a predetermined number of physical frame locations.

In another embodiment, the reserved location is at least a reserved portion on a track which is not the original track upon which the frame is recorded. Preferably the original track is recorded/read when relative movement between the head unit and the tape is in a first direction and the track having the reserved location is recorded/read when relative movement between the head unit and the tape is in a direction which is opposite the first direction. In one mode of this embodiment, there are a plurality of tracks with reserved locations which are spaced at predetermined vertical positions of the tape. In another mode of this embodiment, the track(s) having reserved locations are bidirectional tracks.

For embodiments having multi-channel or multi-track frames, the reserved location employs a corresponding plurality of tracks.

In a method of recording on a magnetic tape is a recording mode which has a read-while-write (RWW) capability, after a frame is recorded it is read back to determine whether the frame is readable or accurately recorded. If the frame is defective, the contents of the frame are re-recorded at a reserved location. Further, a defect memory map is updated with a pairing of the first physical frame location of the defect with the reserved location at which the re-recording occurred.

In a method of reading a magnetic tape having frames re-recorded to spare or reserved locations, the contents of the defect map frame is first acquired from the tape. The defect map having a pairing of frame original physical locations on the tape with frame re-recording physical locations for frames which are unreadable or erroneously recorded in their frame original physical locations. During the reading operation, frames are read from corresponding frame original physical locations on the tape. When an original physical location is encountered on the tape for which there is a pairing in the defect map, the defect map frame is consulted to discover the reserved location at which the frame contents are re-recorded so that the frame contents may be obtained from the reserved location.

Also provided is a hard sectored magnetic tape storage medium on which information is stored on a plurality of horizontally extending tracks. Each track has a plurality of frames and the tape has a defect map. The defect map has a pairing of frame original physical locations on the tape with frame re-recording physical locations for frames which are unreadable or erroneously recorded in their frame original physical locations. The frame re-recording locations are in a reserved portion of the tape. The tape can have either one or more tracks with reserved portions for frame re-recording physical locations, or have frame re-recording physical locations interspersed among frame original physical locations on the tape.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 28 is a schematic view of a example of a logical frame sequence, no error conditions.

FIG. 29 is a schematic view of a first example of a rewrite logical frame sequence.

FIG. 30 is a schematic view of a second example of a rewrite logical frame sequence.

FIG. 31 is a schematic view of third example of a rewrite logical frame sequence.

FIG. 32 is a schematic view of a fourth example of a rewrite logical frame sequence.

FIG. 33 is a schematic view of a logical frame sequence as read following a servo error during write.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figures 1, 2:
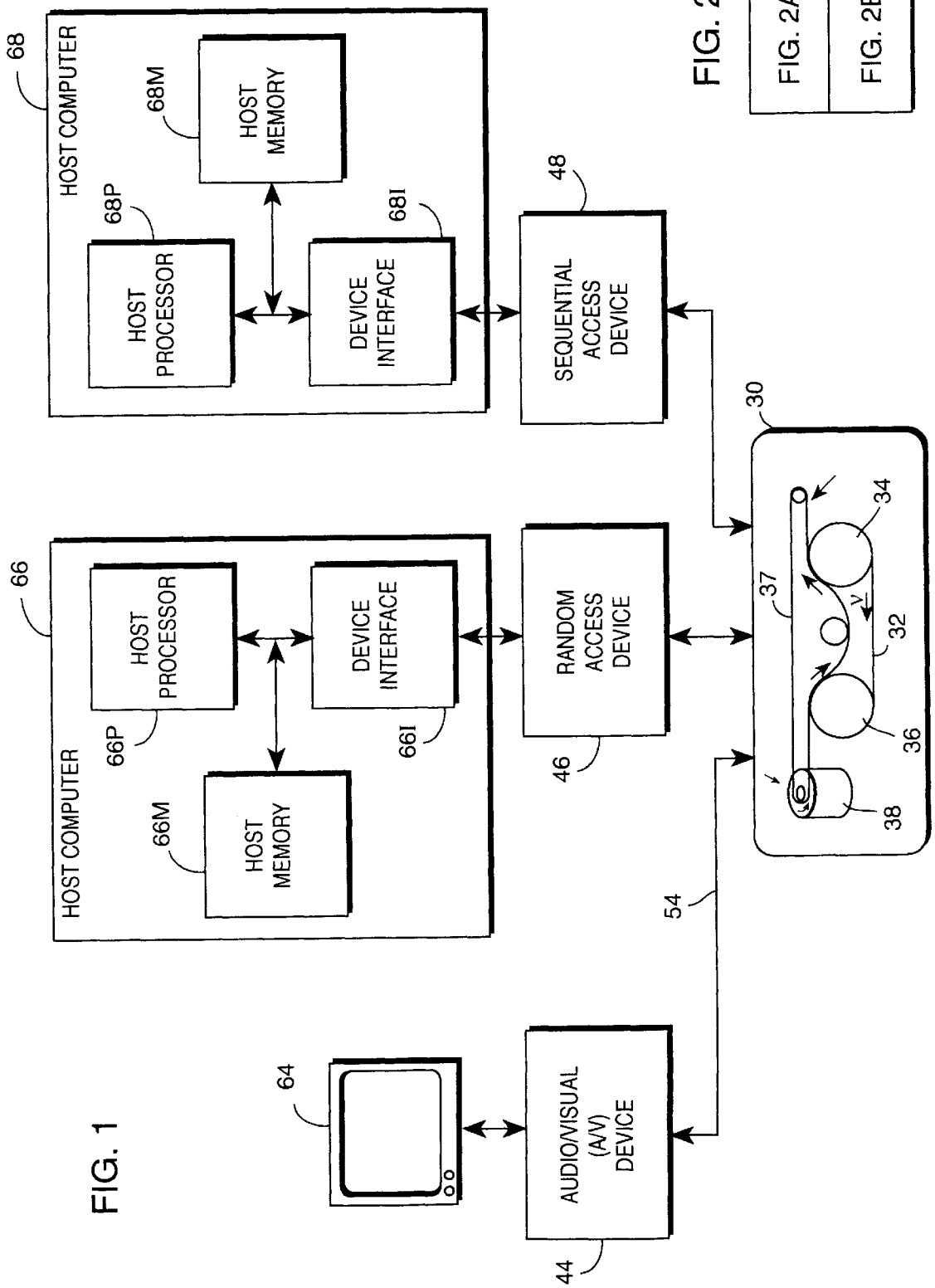
FIG. 1 is a schematic diagram showing usage of a tape media formatted according to the present invention in a plurality of types of devices, including an audio/visual device, a random access device, and a sequential device.
FIG. 2 is a schematic view of showing the interrelationship of FIG. 2A and FIG. 2B.
Figure 2A:
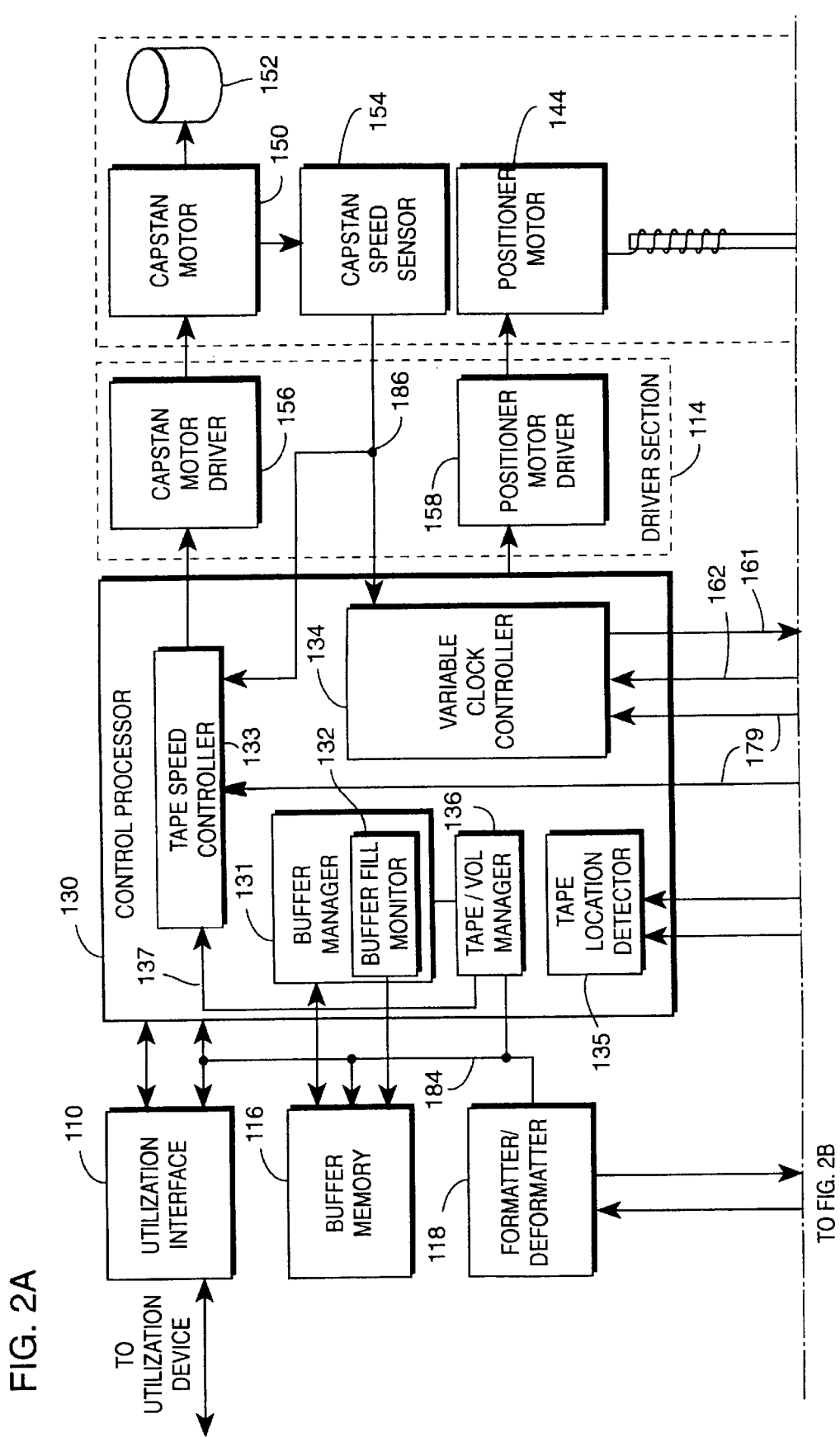
FIG. 2A and FIG. 2B are schematic views of hardware elements included in a device according to the invention which operates upon the tape media of the invention.
Figure 2B:
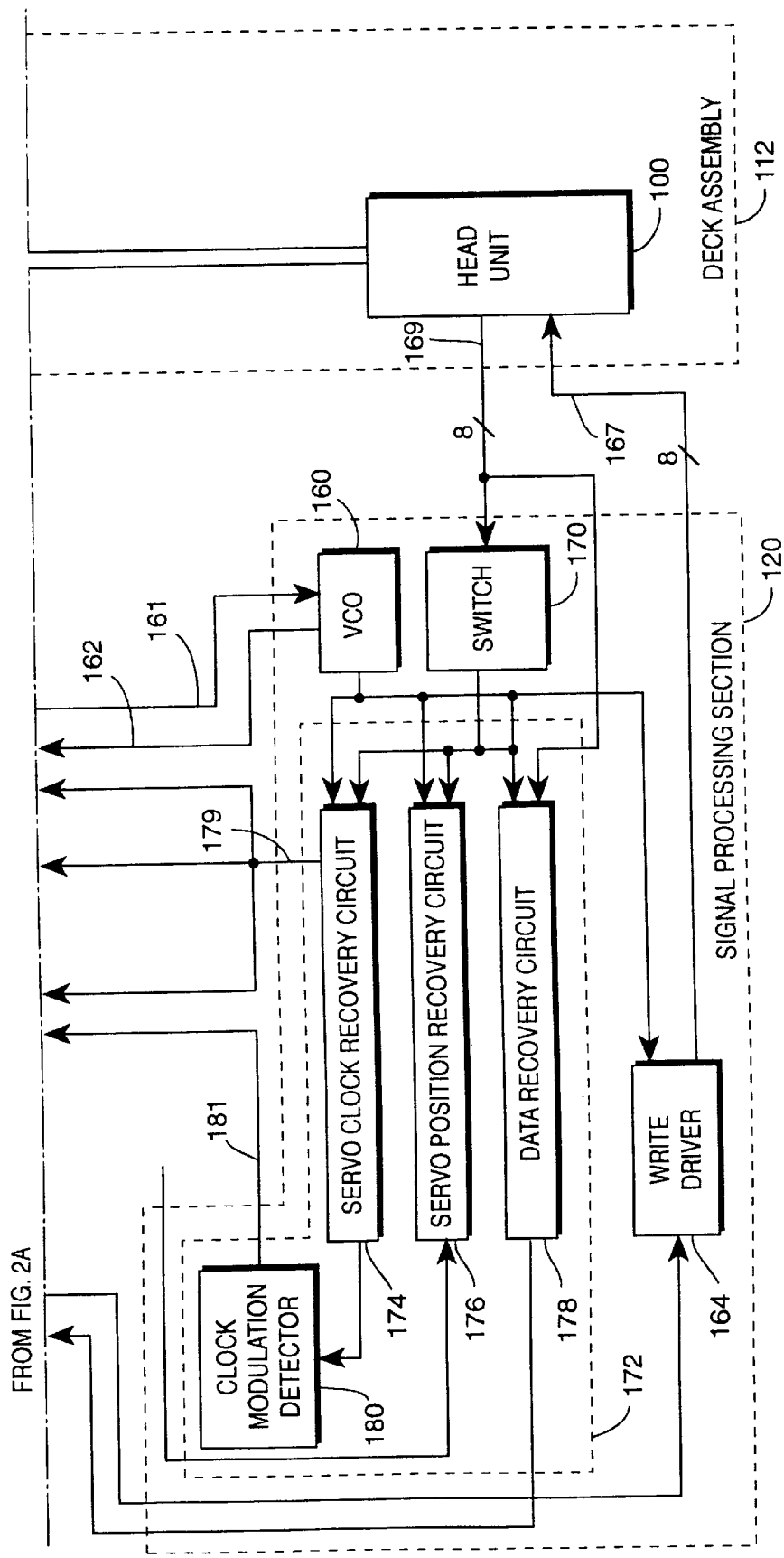

The present invention concerns both a Multi Purpose Digital Recorder (MPDR) and method for operating the same, as well as a specific media format. FIG. 1 shows a cartridge 30 wherein MPDR media, specifically magnetic tape 32, extends from supply reel 34 to take-up reel 36. Tape 32 is transported in cartridge 30 by cartridge belt 37, which extends around capstan puck 38. In the illustrated embodiment, tape 32 has a buried servo signal TS pre-recorded thereon, as subsequently explained. While some aspects of the present invention require the buried servo or track sense (TS) signal, other aspects of the invention do not and should be understood not to be so limited.

By virtue of its multipurpose format, tape 32 is utilizable by a plurality of types of devices. For example, FIG. 1 shows cartridge 30 with tape 32 therein being selectively loadable into an audio/visual (A/V) type device 44; a random access type device 46; and a sequential access type device 48. Bidirectional arrows 54, 56 and 58 indicate that devices 46 and 48, respectively, can read information from and record information on tape 32. A/V device 44 does not record on multipurpose media, but can record on single purpose tape (e.g., a VCR recording on tape). As explained subsequently, the information recorded on tape 32 by devices 46 and 48 can be either audio/visual (A/D) data or non-A/V data.

As further shown in FIG. 1, audio/visual (A/V) device 44 is connected to an A/V reproduction device, e.g., television 64, which is one form of a utilization device. Random access device 46 and sequential access device 48 are also connected to utilization devices, particularly to host computers 66 and 68 respectively. Host computers 66, 68 have respective interfaces 66I, 68I for communicating with devices 46, 48, respectively; host memories 66M, 68M; and host processors 66P, 68P. It should be understood that devices 46 and 48 could, alternatively, both be connected to a single host computer.

Random access device 46 and sequential access device 48 are examples of multipurpose digital recorders or multipurpose digital devices of the present invention. An example of audio/visual device 44 is a Recorder/Player which has the basic minimum functionality of an advanced television VCR or CD-Audio player. Random access device 46 locates any physical frame on the tape and is capable of reading or writing that frame. An example of sequential access device 48 is a streaming or serpentine tape recording system.

Figure 3:
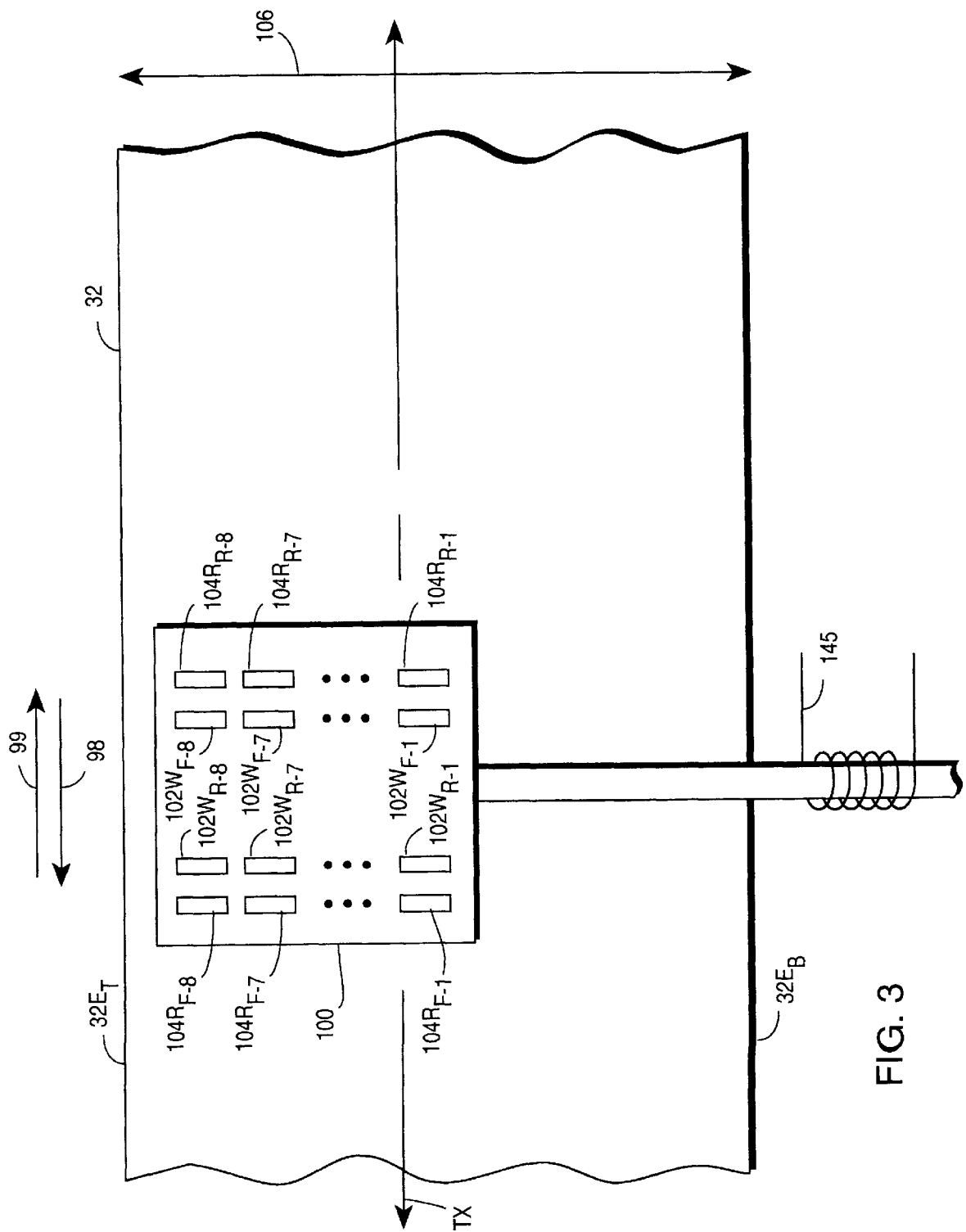
FIG. 3 is a front view of a head unit included in the device of FIG. 2.

As used herein, unless otherwise clear from the context, the term "device" refers collectively to any one of A/V device 44, random access device 46, and sequential access device 48. For this reason, at times the terminology "device 40", "system 40", "drive 40" or "drive system" may be employed to mean any of A/V device 44, random access device 46, and sequential access device 48. Thus, it should be understood that system 40 can function either as an audio/visual device, a random access device, or a sequential access device, or as a combination of any two or more of such devices. Further in this regard, it should be understood that FIG. 2 and FIG. 3 are generic depictions of an embodiment of hardware included in device 40, e.g., any one of the devices 44, 46, and 48.

FIG. 2 shows a magnetic drive system 40 for transducing information (e.g, recording information on and reading recorded information from) with respect to an information storage medium which, in the illustrated embodiment, is magnetic tape 32. As shown in FIG. 3, in drive system 40 tape 32 is transported either in a forward direction (denoted by arrow 98) or a reverse direction (denoted by arrow 99) past head unit 100, the forward and reverse directions both being parallel to an axis TX of tape elongation.

In a recording mode, depending on direction of movement of tape 32, a plurality of write elements mounted on head unit 100 cause magnetic signals to be recorded on horizontal tracks on tape 32. In the embodiment shown in FIG. 3, eight write elements $102W_{F-1}$ through $102W_{F-8}$ record eight respective tracks when head unit 100 moves in the forward direction. Likewise, eight write elements $102_{R-1}$ through $102_{R-8}$, record eight respective tracks when head unit 100 moves in the reverse direction. For sake of simplicity, any one of the write elements may be referred to herein as write element 102. All such write elements 102 are preferably inductive elements. Tape 32 has a top horizontal physical edge $32E_T$ and a bottom horizontal physical edge $32E_B$.

In a reading or reproduction mode, a plurality of read elements mounted on head unit 100 cause magnetic signals to be read from horizontal tracks recorded on tape 32. In the embodiment shown in FIG. 3, eight read elements $104R_{F-1}$ through $104R_{F-8}$ read eight respective tracks when head unit 100 moves in the forward direction. Likewise, eight read elements $104R_{R-1}$ through $104R_{R-8}$ read eight respective tracks when head unit 100 moves in the reverse direction. For sake of simplicity, any one of the read elements may be referred to herein as read element 104. For reasons hereinafter apparent with respect to a description of buried servo signals, all such read elements 104 are preferably magnetoresistive elements.

As used herein, the term "element" includes any structure suitable for transducing information, including inductive magnetic gaps and magnetoresistive material. While preferable types of elements have been mentioned, it should be understood that the invention is not so limited.

Tape 32 has a top horizontal physical edge $32E_T$ and a bottom horizontal physical edge $32E_B$. Head unit 100 is vertically adjustable (e.g., between edges $32E_T$ and $32E_B$ in the direction depicted by arrow 106). In a recording mode, repeated vertical adjustment of head unit 100 yields a plurality of parallel, horizontal tracks subsequently described with respect to FIG. 5.

As shown in FIG. 2, magnetic tape drive system 40 (also known as a tape "deck" system) includes utilization interface 110; deck assembly 112; driver section 114; buffer memory 116; formatter/deformatter 118; signal processing section 120; and control processor 130 (also known as microprocessor 130). As explained subsequently, control processor 130 has firmware (e.g., processor 130 executes sets of coded instructions) for controlling and coordinating various activities and events of drive system 40.

Firmware included in processor 130 includes buffer manager 131 (which has buffer fill monitor 132); tape speed controller 133; variable clock controller 134; tape location detector 135; and, tape/volume manager 136. It should be understood that processor 130 also executes numerous other types of instructions which are not described herein as being understood by the person skilled in the art and unnecessary for explanation of the present invention. Moreover, while FIG. 2 shows various connections of processor 130 for purposes hereinafter elaborated, it should be understood that other connections understood by the person skilled in the art are not necessarily shown, including connections for various control, interrupt, and data transfer purposes.

Deck assembly 112 includes head unit 100 with its write elements 102 and read elements 104 as previously discussed. In addition, deck assembly 112 also has positioner motor 144 for positioning head unit 100 so that head unit 100 has a component of travel in the vertical direction depicted in FIG. 3 by arrow 106. In the illustrated embodiment, positioner motor 144 is a linear-type voice coil motor which controls a roller bearing assembly for repositioning head unit 100 relative to a width or transverse dimension of tape 32 in conventional manner. As used herein, the width dimension of tape 32 refers to the vertical direction depicted by arrow 106, and thus is substantially orthogonal to the horizontal direction depicted both by forward direction arrow 98 and reverse direction arrow 99.

Deck assembly 112 also includes a capstan motor 150 which serves to rotate capstan puck 152 of drive 40. Capstan puck 152 is in contact with cartridge capstan puck 38 (see FIG. 1) which via belt 37 transports tape 32 in the horizontal direction (either forward or reverse, depending on the direction of drive applied to capstan motor 78) during recording and reading operations. The rotational velocity of capstan 152 is monitored by capstan speed sensor 154. In one embodiment, capstan speed sensor 154 comprises Hall Effect sensors which are used to determine the rate of revolution of capstan motor 150.

As also shown in FIG. 2, magnetic tape drive system 40 includes driver section 114. Driver section 114 includes various driver circuits connected to hardware installed in deck assembly 112, particularly capstan motor driver 156 and positioner motor driver 158. Capstan motor driver 156 is connected to capstan motor 150; positioner motor driver 158 is connected to position motor 144.

Tape drive system 40 also includes signal processing section 120. Signal processing section 120 has a voltage controlled oscillator (VCO) 160 which receives a signal on line 161 from variable clock controller 134. VCO 160 applies a feedback signal on line 162 to variable clock controller 134. Signal processing section 120 has an output or recording side and an input or reading side, both of the sides utilizing an output signal from VCO 160.

The output or recording side of signal processing section 120 comprises a write driver 164. Write driver circuit 164 is connected by eight channel line 167 inter alia to apply recording signals to the plurality of write elements 102 during recording operations in accordance with clock signals generated by VCO 160 in the manner hereinafter described.

The input or reading side of signal processing section 120 receives (on line 169) an acquisition signal sensed from a read element(s) 104 mounted on head unit 100. Signal processing section 120 includes switch 170 and read recovery circuit 172. Recovery circuit 172 includes servo clock recovery circuit 174; servo position recovery circuit 176; and data recovery circuit 178. Each of recovery circuits 174, 176, 178 receives an output signal of VCO 160 for timing purposes. In addition, each of recovery circuits 174, 176, 178 receives appropriate channels of the read signal as such channels are multiplexed thereto by switch 170. While data recovery circuit 178 receives all eight channels of the read signal acquired on line 169, recovery circuits 174 and 176 received only two and six channels, respectively. Since recovery circuits 174 and 176 read the lower frequency buried servo sense TS signal, which two of the eight channels are multiplexed to recovery circuit 174 and which six of the eight channels are multiplexed to recovery circuit 176 at any given time depends on the position of head unit 100 relative to tape 32.

Servo position recovery circuit 176 serves to process the buried servo sense TS signal on six of the eight channels in order to determine whether head unit 100 is properly following tracks recorded on tape 32. Servo clock recovery circuit 174 serves to process the buried servo sense TS signal on two of the eight channels in order to obtain a servo clock signal $TS_c$. Servo clock recovery circuit 174 generates an interrupt on line 179 at the beginning of each cycle of servo clock signal $TS_c$ and applies the interrupt to variable clock controller 134, to tape position detector 135, and (at least in some embodiments) to tape speed controller 133. Servo clock recovery circuit 174 is connected to apply the recovered servo clock signal $TS_c$ to clock modulation detector circuit 180. Clock modulation detector circuit 180 generates an interrupt on line 181 upon detection of an intermediate (i.e., negative-going) zero crossing transition of servo clock signal $TS_c$. Interrupt line 181 is connected to modulation decoder and tape location detector 135.

Processor 130 is connected to via utilization interface 110 to a utilization device (e.g, utilization devices 64, 66, or 68 shown in FIG. 1). Processor 130 communicates with various other constituent members of drive system 40 in conventional manner using bus system 184. In particular, processor 130 communicates over bus system 184 with a formatter/deformatter 118 and buffer memory 116. Although not shown, it should be understood that DMA devices interface buffer memory 116 and formatter/deformatter with bus system 184.

Buffer manager 131 administers buffer memory 116. Buffer memory 116 temporarily stores user data in a write operation which is in route from the utilization device (e.g, a host computer) to tape 32 (via formatter/deformatter 118 and write driver 164) and user data in a read operation which is in route from tape 32 (via data recovery circuit 178 and formatter/deformatter 118) to the utilization device. Buffer memory 116 is also used as a location for building data structures for what are hereinafter referred to as configuration frames, as well as data structures which are hereinafter termed AUX data structures. These data structures are built in buffer memory 116 by tape/volume manager 136 acting through buffer manager 131.

As one aspect of its administration of buffer memory 116, buffer manager has buffer fill monitor 132 which keeps track of the amount of user data in buffer memory 116. As described in more detail in §7.3, buffer fill monitor 132 provides input to tape speed controller 133 of processor 130.

In a write mode, formatter/deformatter 118 forms a physical frame for writing on tape by integrating together user data from buffer memory 116 and a corresponding AUX data structure prepared by tape/volume manager 136 in buffer memory 116, and error correction information (C1, C2) generated over the frame. In a read mode, formatter/deformatter 118 interprets a frame obtained from tape via data recovery circuit 178 in order to obtain user data, an AUX data structure, and error correction information, and performs checking and error correction (if needed) for the frame.

An output signal from tape speed controller 133 is applied to capstan motor driver 156 for use in controlling the rotational speed of capstan motor 150. The actual rotational speed of capstan motor 150 is determined by capstan speed sensor 154, which outputs a signal on line 186 to tape speed controller 133 and variable clock controller 134 of processor 130.

1 Appendices
1.1 Definitions and Requirements

A set of alphabetized definitions is provided as an Appendix I. A set of byte and code requirements is provided as Appendix II.

2 Format Overview

Figure 6:
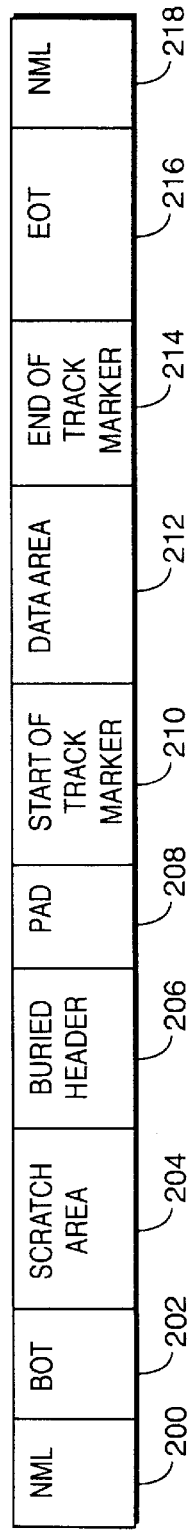
FIG. 6 is a schematic view of a general format of a magnetic tape according to an embodiment of the invention.

FIG. 6 shows tape 32 starting with hub wrap lead region NML 200, followed by a beginning of tape lead-in zone 202; followed by scratch area 204; followed by buried header region 206; followed by pad region 208; followed by a start of track marker 210; followed by data area or data region 212; followed by an end of track marker 214; followed by an end of tape lead-out zone 216; followed by hub wrap lead region NML 218. An overview of the format of the data region 212 is below provided.

Figure 4:
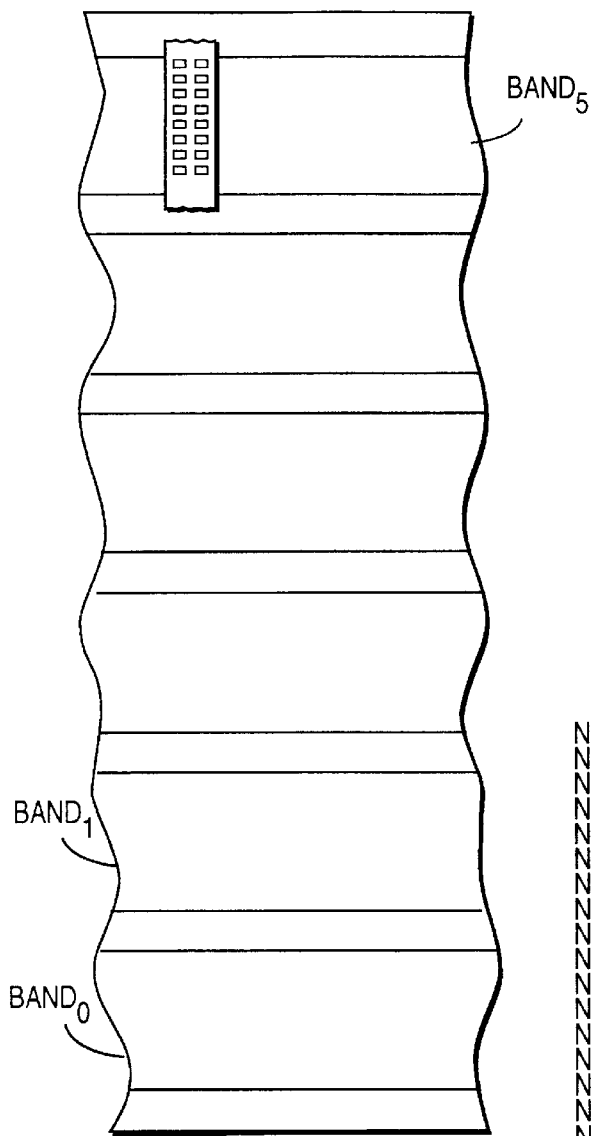
FIG. 4 is a schematic diagram showing a magnetic tape formatted into six bands, each band comprising four track groups, each track group comprising eight tracks.
Figure 5:
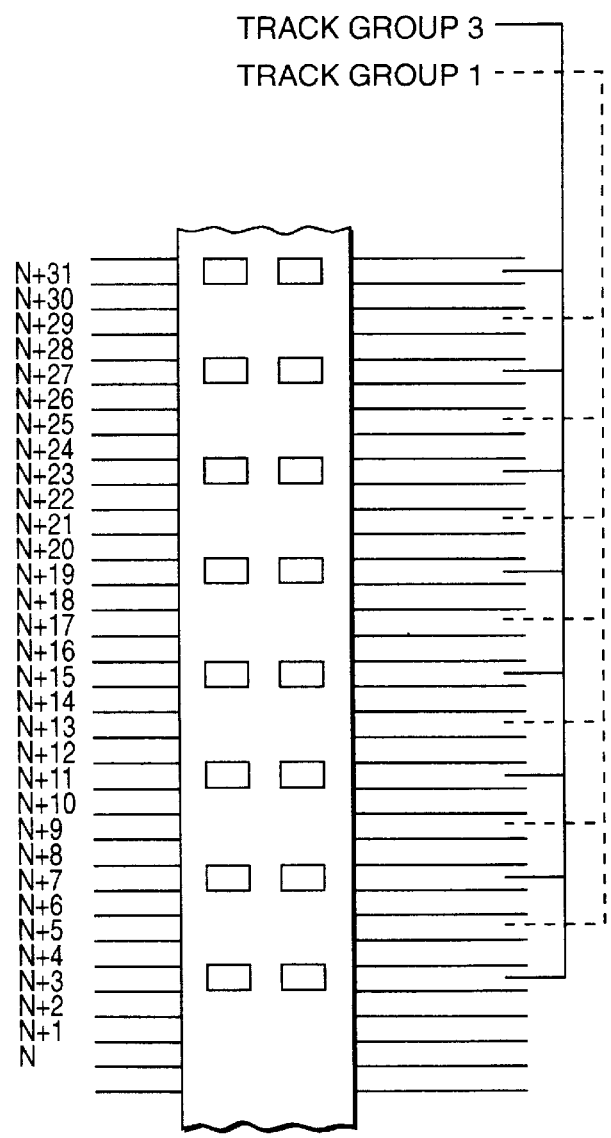
FIG. 5 is a schematic diagram showing a band of the magnetic tape format of FIG. 4.

In data region 212, tape 32 is divided into six bands $BAND_0$ $BAND_5$ as shown in FIG. 4. At any given time, the heads of head unit 100 are over one of bands $BAND_0$ –$BAND_5$. At the moment of time illustrated in FIG. 4, the heads happen to be over $BAND_5$ FIG. 5 is a detailed view of $BAND_5$ of FIG. 4, and serves to provide a representative illustration of the formatting of each of the six bands. As shown in FIG. 5, each band includes thirty-two physical tracks.

Eight parallel channels on eight physical data tracks form a track group, which from a logical perspective becomes a single virtual track and is therefore also known as a logical track. Logical track 3 and logical track 1 are specifically labeled in $BAND_5$ of FIG. 5. Each of the eight channels is separated by three tracks which are members of neighboring logical tracks. Four logical tracks (32 consecutive physical tracks) form a band, a logical track is always contained within a band, no logical track may span across two bands.

Figure 7:
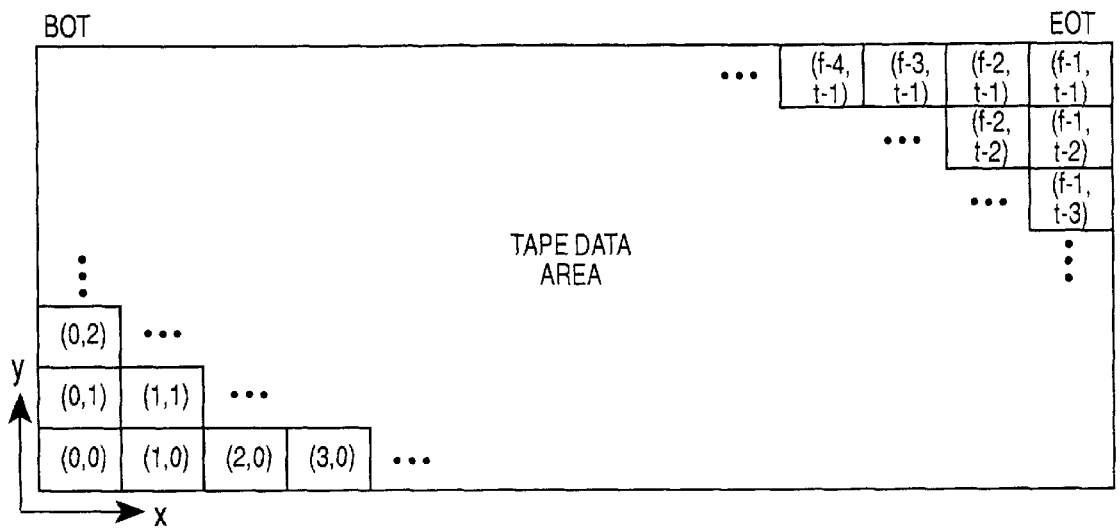
FIG. 7 is a schematic view of physical frame layout on tape.

In data region 212, data is organized into frames, each frame being interleaved across all eight data channels which form a logical track. FIG. 7 shows a physical frame layout for data region 212. Each frame 220 is synchronized to the buried servo or tracking sense (TS) signal.

2.1 Buried Servo Signal

A buried servo or tracking signal TS is recorded on tape 32. Buried servo signal TS is recorded on at least one track and preferably all tracks of a logical track (see FIG. 5). Buried servo signal TS is recorded by the manufacturer of tape 32 at frequency which is much lower that the frequency at which the user records data on the tape (e.g., 1425 times lower), and thus is distinguishable from the user data and accordingly is known as deep buried servo.

Figure 9:
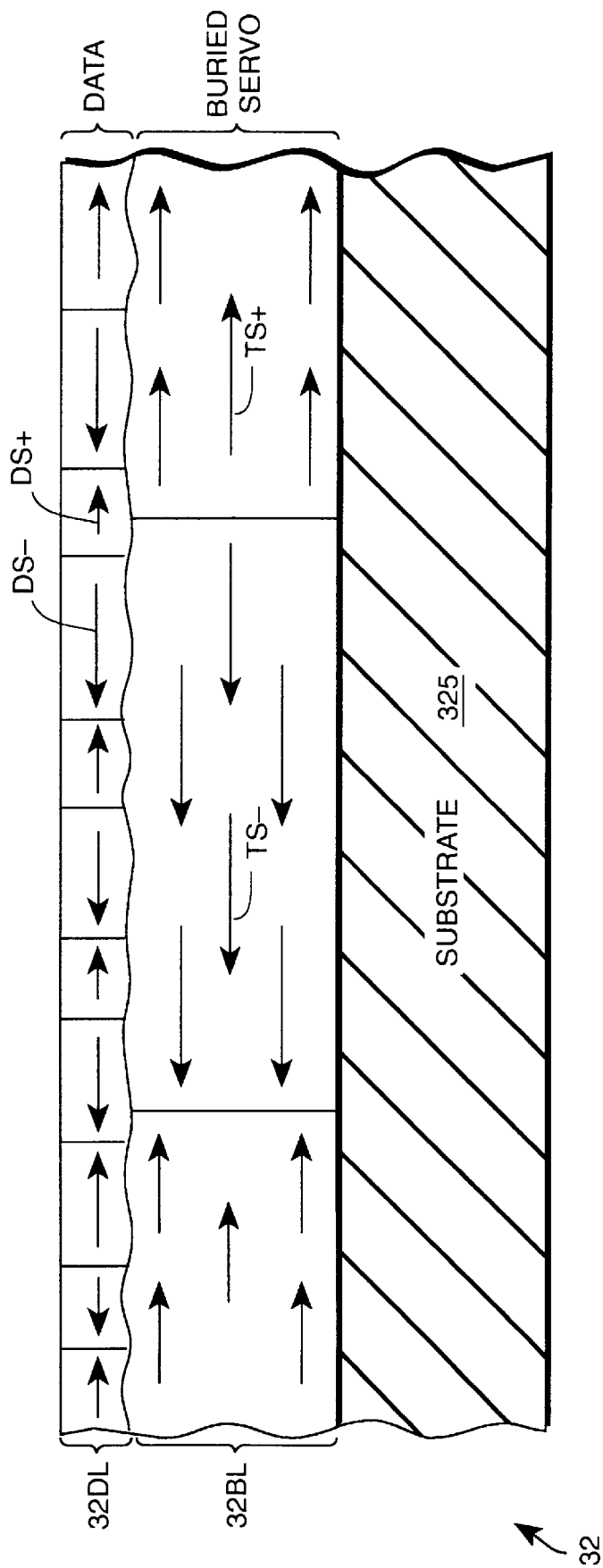
FIG. 9 is a cross-sectional view of tape media utilized by the present invention, particularly showing location of the buried servo or tracking sense (TS) signal.

As shown in FIG. 9, tape 32 has tape substrate 32S. Upon tape substrate 32S is formed a tape buried layer 32BL. Tape data layer 32DL is formed over tape buried layer 32BL. Buried layer 32BL has the track sense (TS) signal or buried servo signal recorded thereon at low frequency. Positive flux directions TS+ and negative flux directions TS− of buried servo signal TS are shown in FIG. 9. Positive flux directions of the data signal are shown in FIG. 9 as DS+, while negative flux directions of the data signal are shown in FIG. 9 as DS−. Flux transitions are shown by the boundaries separating the directional arrows in FIG. 9

Figure 8:
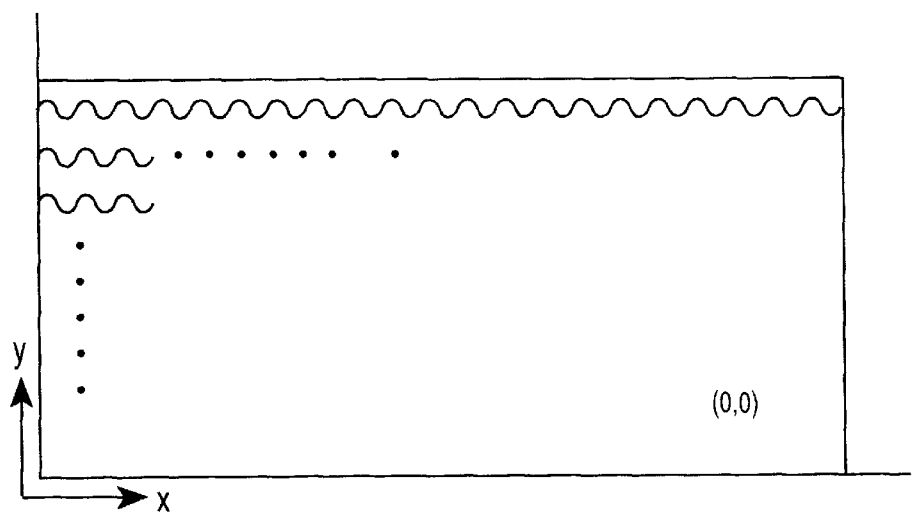
FIG. 8 is a schematic view of tape showing buried servo formatting of a frame of magnetic tape.
Figures 10, 11:
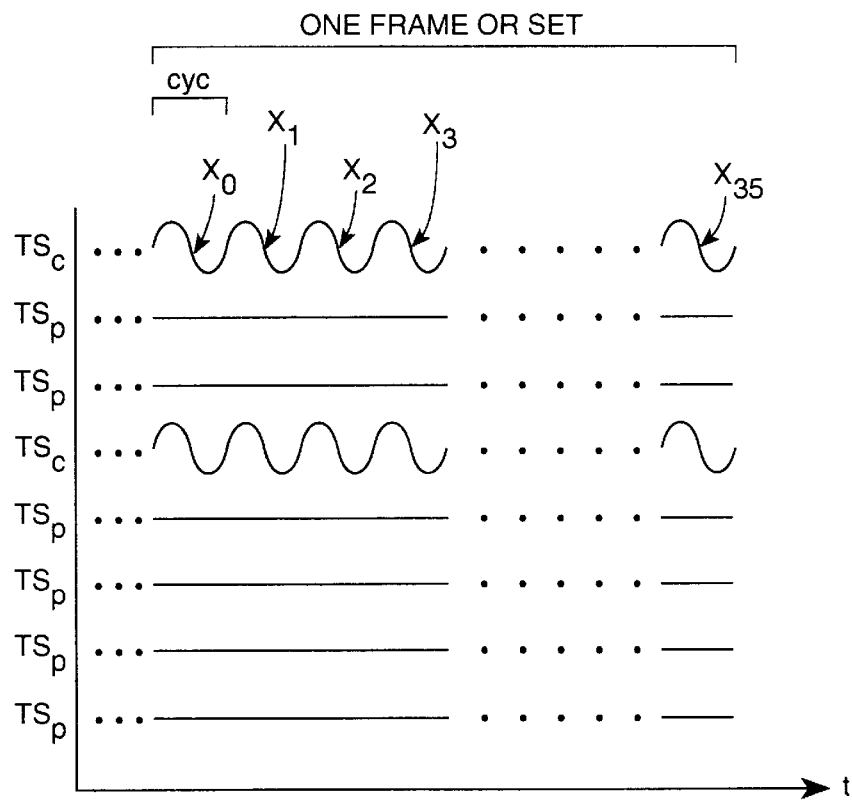
FIG. 10 is a graphical depiction of signals applied to recovery circuits of the present invention for recovery of a buried servo signal.
FIG. 11 is a schematic view of a block of information included in a frame on magnetic tape in accordance with an embodiment of the invention.

As shown in FIG. 8, each of the tracks of a logical track have the buried servo signal TS recorded thereon. Each of the read elements 104 of head unit 100 pick up the buried servo signal TS for the respective tracks which they follow. At least one, and potentially as many as two, of the read elements 104 acquire the buried servo signal for the purpose of deriving the servo clock signal $TS_c$. At least one of six others of the read elements 104 acquire the buried servo signal for the purpose of determining whether head unit 100 is properly aligned (e.g., is correctly following the horizontal tracks on tape 32). Switch 170 of signal processing section 120 (see FIG. 2) multiplexes the channels of the buried servo signals as acquired by read elements 104 to one of servo clock recovery circuit 174 and servo position recovery circuit 176. Whether a channel of recovered buried servo signal is multiplexed to circuit 174 or 176 depends upon which of the logical tracks and bands of tape 32 are currently being read. FIG. 10 shows signals applied by switch 170 to circuits 174 and 176. In particular, signals $TS_c$ are acquired by as many as two of the read elements 104 for processing by servo clock recovery circuit 174, while signals $TS_p$ are acquired by the six remaining read elements 104 for processing by servo position recovery circuit 176. The read elements 104 which acquire signals $TS_p$ are positioned such that buried servo signal TS from adjacent tracks of a logical track cancels out when head unit 100 is properly following the horizontal tracks, for which reason signals $TS_p$ are shown as being flat or zero in FIG. 10.

As shown in FIG. 10, servo clock signal $TS_c$ has a plurality of cycles, one such cycle being indicated in FIG. 10 as "cyc". Each cycle extends between consecutive positive-going zero crossing or transitions of servo clock signal $TS_c$, there being an intermediate or negative-going zero crossing or transition "x" in between the consecutive positive going transitions. It should be understood that cycles of servo clock signal $TS_c$ can be delineated in other manners, such as conversely (e.g., with the cycle assessed between consecutive negative-going crossings).

As shown in FIG. 10, a plurality of consecutive cycles of servo clock signal $TS_c$ constitute a "set". Although not required to be such, in the context of the described embodiment a set happens to be the same as a data frame on tape 32. In the illustrated embodiment, each set, e.g, frame, has thirty six cycles. It should be understood that, in other embodiments, the number of cycles per set (e.g., frame) can be a greater or lesser number. In fact, the number of cycles per set (e.g., frame) need not necessarily be constant from one set to another, as the encoding of the buried servo signal as subsequently elaborated contemplates that the number of cycles can vary from set to set so long as the number of cycles for each set is foreknown or otherwise discernable. Moreover, the invention is not limited to any particular manner in which modulation values are assigned or associated with segments of the servo clock signal $TS_c$, as it should be understood that other aspects of the servo clock signal $TS_c$ can be utilized as delineators for acquiring modulation values.

As shown in FIG. 10, all but one of the cycles of each set (e.g., frame) are symmetrical. That is, all but one of the cycles of each set have intermediate zero crossings at the same location (i.e., in the middle of the cycle). A selected one of the cycles, which differs from other cycles of the set, has an intermediate zero crossing which is asymmetrical with respect to non-selected zero crossings. Preferably the selected cycle of a set, e.g., the asymmetrical zero crossing, is either the first cycle (with its intermediate transition $x_o$ illustrated in FIG. 10) or the last cycle (i.e, the thirty sixth cycle) of a set. The order of the selected cycle within a set, e.g., being the first cycle or the last cycle, can consistently apply through all sets. Alternatively, the order of the selected cycle can vary from set to set in accordance with predetermined criteria, e.g., the selected cycle of the first set can be the first cycle, the selected cycle of the second set can be the second cycle, or some other cycle assigning rule.

FIG. 10 shows a situation in which each set has its first cycle as the selected cycle. The first cycle has its intermediate transition $x_o$ asymmetrical by virtue of being closer to the previous positive-going zero crossing transition rather than equidistantly spaced between adjacent positive-going transitions. An asymmetrical transition occurs either earlier or later than the time at which the transition would occur if it were symmetrical with other cycles in the frame. Having a selected cycle with an asymmetrical intermediate transition is an example of modulation of servo clock signal $TS_c$.

Whereas in FIG. 10 the first cycle of a set as being asymmetrical by reason of its intermediate transition $x_0$ occurring earlier than symmetrical intermediate transitions in other cycles, it should be understood that instead the first cycle could be modulated to have it intermediate transition $x_0$ occurring later than symmetrical intermediate transitions for other cycles of the set (e.g., closer to the following postive-going zero crossing transition than to the previous postive-going zero crossing transition). Moreover, in other embodiments, a set (e.g., frame) may have more than one selected cycle for obtaining e.g., a corresponding number of modulation values per set. As subsequently described in §7.6, the present invention contemplates various techniques for using modulations in order to provide modulation values useful for tape information and encoding schemes.

In the context of tape 32 herein described, each frame 220 is synchronized to the buried servo signal TS, and all frames 220 are of the same length and interval as measured by the buried servo signal TS. All tracks on a tape have the same number of cycles of servo clock signal $TS_c$, and thus all tracks on a tape have the same number of frames.

Servo clock recovery circuit 174 (see FIG. 2) applies an interrupt on line 179 when a positive-going zero crossing transition of servo clock signal $TS_c$ is detected (e.g., the beginning of a cycle of servo clock signal $TS_c$). Clock modulation detector 180 applies an interrupt on line 181 when a negative-going zero crossing transition (e.g., an intermediate transition) is detected.

Synchronization of frames to the buried servo pattern results in a "hard sectored" format, where each frame relates to a specific x,y coordinate of the media 32 relative to the buried servo signal. The x coordinate is directly related to the number of cycles in the servo signal horizontally on the tape, the y coordinate is directly related to the logical track vertically on the tape. Each frame location is assigned a unique physical frame number. Because physical frame numbers are linked to frame locations and not to frames in the order that they are written, the physical frame number assignment is fixed from the time that the buried servo signal is embedded on the tape 32.

Use of a buried servo signal is just one way of producing a hard sectored tape. Hard sectored is understood to be any formatting method that predetermines the location of each block or frame on tape.

2.2 Physical Frames

In data region 212 (see FIG. 6), data is organized into frames, each frame being interleaved across all eight data channels which form a logical track. Reference is again made to FIG. 7 for a physical frame layout for data region 212. In FIG. 7 the small blocks represent physical frames, y represents the logical track number, and x represents a frame's horizontal position on tape 32 as determined by the buried servo signal (see §2.1). In the frames on the EOT end of the tape data area, t represents the number of logical tracks (t=24 in the illustrated embodiment), and f represents the total number of frames per track. Each physical frame is an independent data construct, and as such all write and read operations must be performed on whole physical frames.

As each read head 104 travels down a physical track of tape 32, successive blocks are acquired, there being seventy six blocks per physical track per frame. FIG. 11 shows a format of the first sixty four blocks encountered per physical track of each frame 220 on tape 32 accordance with an embodiment of the invention. Each block of FIG. 11 begins with a synchronization pattern (14 channel bits), followed by an identification symbol, followed by a AUX symbol, followed by sixty four data symbols, followed by six C1 parity symbols.

Figure 12:
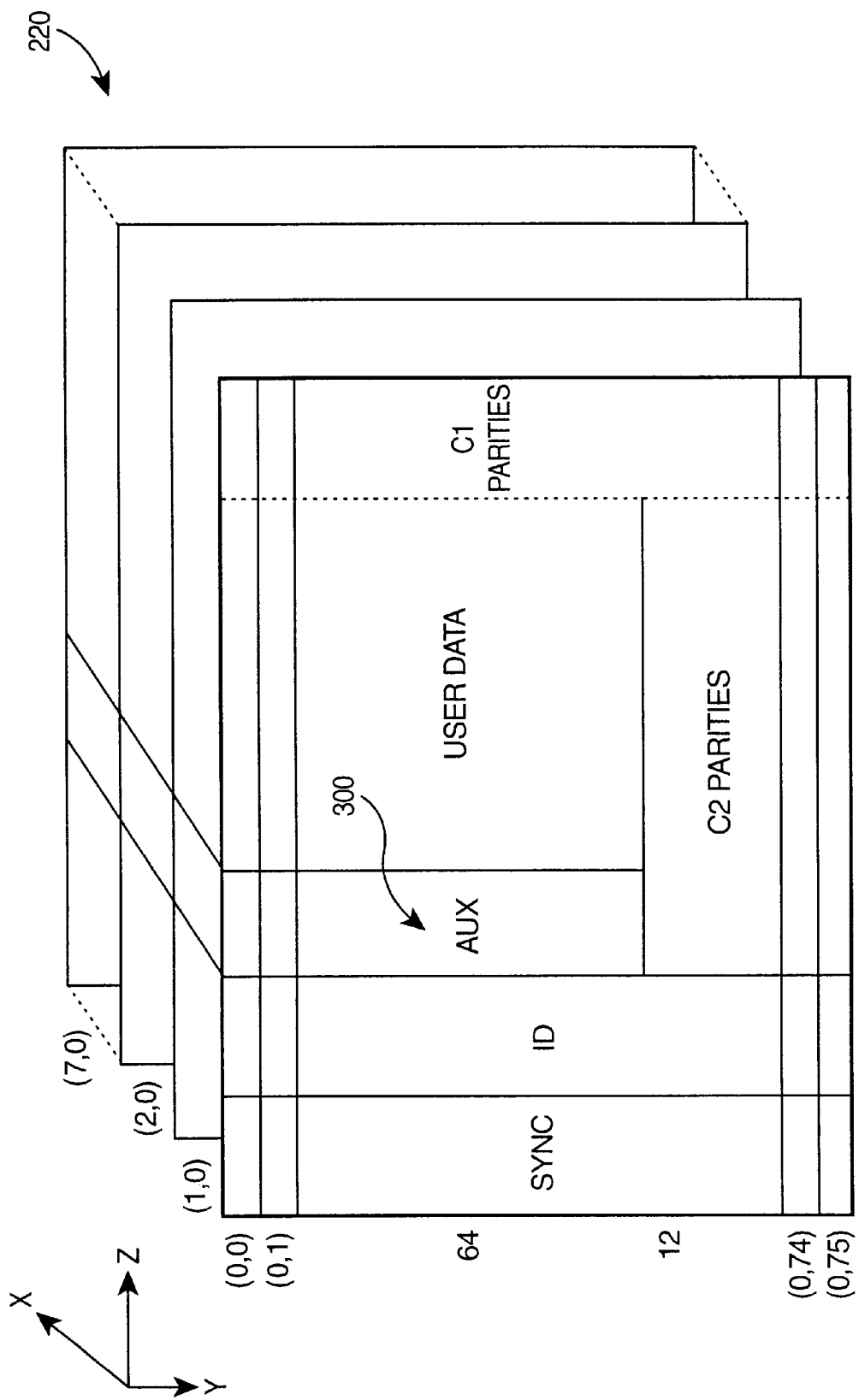
FIG. 12 is a schematic view of an eight channel data frame.

The blocks of information for a frame are interleaved to form the eight product code panes shown in FIG. 12. As shown in FIG. 12, each frame includes an ID (Identification), user data, AUX data, C1 parities, and C2 parities. As will become more apparent hereinafter, each frame 220 includes an AUX data structure 300. Brief introduction is here made that the AUX data structure 300 is 512 bytes per frame and is used as the primary control record for each frame. The user data is 32 KB and is used for the recording of user data in a data frame, or as parameter data structure space in the case of a special control frame.

The user data and AUX data thus read for a frame 220 is loaded into buffer memory 116 (see FIG. 2) so that the data can be accessed in the manner illustrated in FIG. 12 and for the reasons described below.

2.3 Partitioning

In order to facilitate data management and to provide methods of improving seek times, the tape 32 is logically divided into partitions. A partition is a logical subdivision of the medium into smaller independent units. Each partition has a logical BOM and EOM, which are called BOP and EOP respectively. The Logical Frame Address and logical block address count from zero from BOP. All newly created partitions are assigned a tape device model.

The tape data area 212 is divided into logical partitions. All types of devices 44, 46, and 48 support a configuration partition in a reserved area at BOT. The configuration partition is identified as partition−1 (FFh) [see FIG. 13]. The user data area of the tape may be partitioned vertically, horizontally, or in a tiled fashion. Partition geometry can be optimized for the type of data to be stored. The configuration partition is provided for configuration and directory information used by the device, no user data is stored in the configuration partition.

All partitions are configured as a rectangular collection of physical frames. All partition boundaries occur on frame and logical track boundaries. No partial frames exist within a partition. Partition boundaries are identified on tape through the use of a partition directory, and through the use of a partition control field in the AUX data structure 300. As each partition is a logically independent unit, logical frame numbers and logical block numbers count from zero in each partition.

Figure 14:
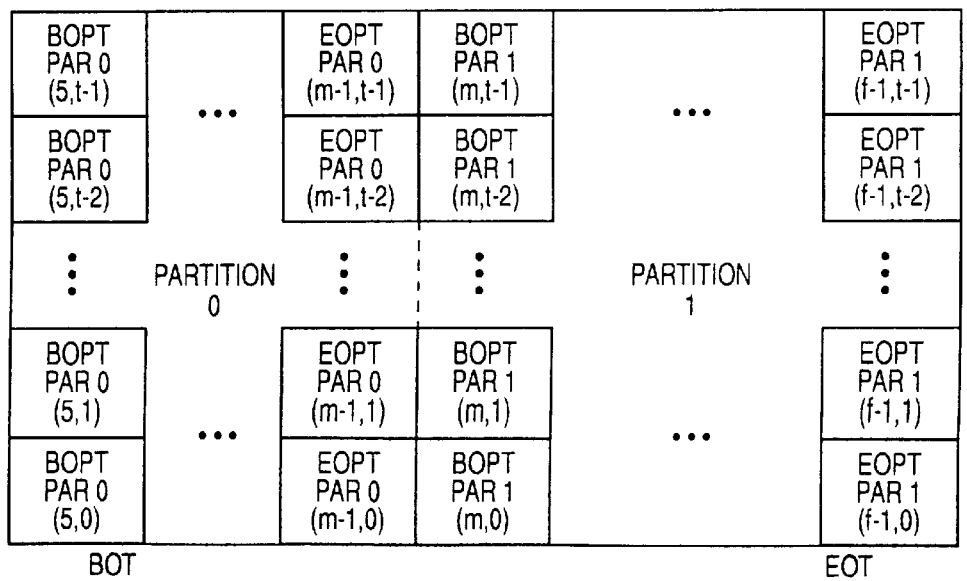
FIG. 14 is a schematic view of an example of vertical partitioning of logical frames.
Figures 15, 16:
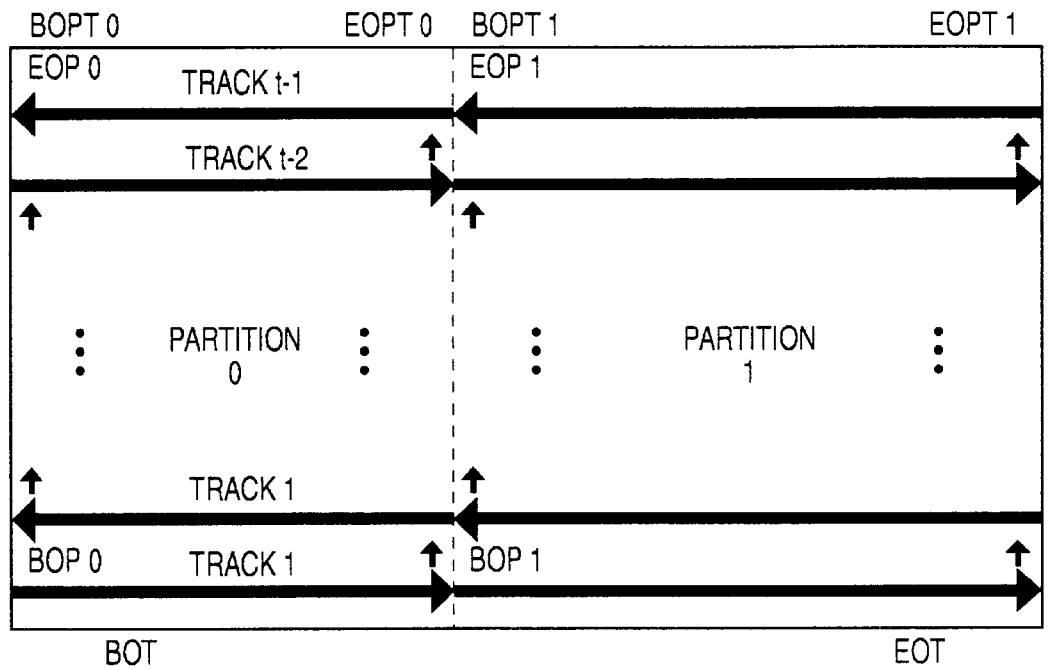
FIG. 15 is a schematic view of an example of track ordering in vertical partitioning.
FIG. 16 is a schematic view of an example of horizontal partitioning of logical frames.

A vertical partitioning method is illustrated in FIG. 14 and FIG. 15, and is particularly suitable for the random access device model. In the drawings the physical block positions are shown as the ordered pair (x,y), where x is the physical frame on track and y is the logical track, there being f frames on each track and m frames on each track in partition 0. Vertical partitioning allows for decreased seek times within related data. Long seek times in serpentine tape are due to tape travel times along the x axis. By restricting a data partition to a limited length in the x dimension, seek times between any two logical frames within a partition can be reduced.

Figure 17:
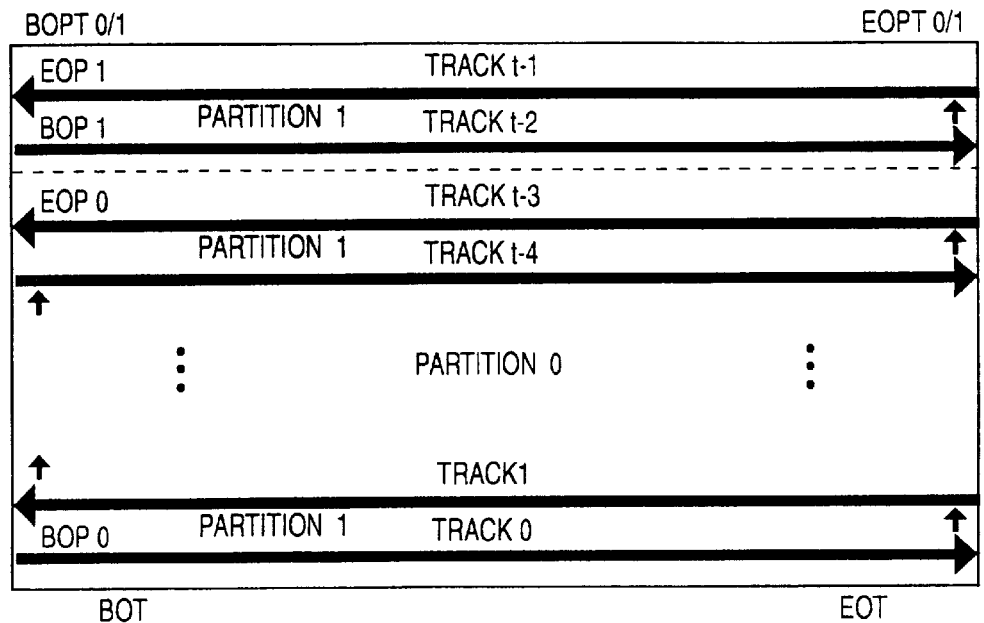
FIG. 17 is a schematic view of an example of track ordering in horizontal partitioning.

A horizontal partitioning method, illustrated in FIG. 16 and FIG. 17, separates partitions along logical tracks. This is a traditional partitioning method for serpentine tape. Horizontal partitioning allows rapid access to the beginning of each partition from BOT, as well as long linear data feeds due to fewer track changes.

3. Device Models

3.1 Supported Device Models

The MPDR logical format is designed to support three different device types: (1) a sequential access or streaming type device 48; (2) Audio/Video Sequential Access—A/V type device 44; and (3) Random Access type device 46 (see FIG. 1). The logical format of tape 32 according to the present invention provides sufficient resources for an interchange of A/V data between all three models on a read-only basis. The ability to write cross-platform, or to interchange non-A/V data across platforms shall be implementation dependent.

3.2 Common Model Aspects

3.2.1 Media Volume Characteristics

The recording medium for tape devices consists of various widths and lengths of a flexible substrate coated with a semi-permanent magnetic material (see FIG. 9). The recording medium is wound onto reel hubs and encapsulated into cartridge 32 containing both a supply reel 34 and a take-up reel 36 (see FIG. 1).

A complete unit, which is composed of the recording medium and its physical carrier (the cartridge), is called a "volume". Volumes have an attribute of being mounted or demounted on a suitable transport mechanism. "Mounted" is the state of a volume when the device is physically capable of executing commands that cause the medium to be moved. A volume is "demounted" when it is being loaded, unloaded or when not installed in the device. The write enabled or write protected state determines when a host may write information on a volume. This attribute is controlled by the user of the volume through manual intervention by setting a mechanical write protect switch on the cartridge.

The recording medium has two physical attributes called beginning-of-medium (BOM) and end-of-medium (EOM). Beginning-of-medium is at the end of the medium that is attached to the take-up reel 36. End-of-medium is at the end of the medium that is attached to the supply reel 34. As shown in FIG. 6, the entire physical length of medium is not usable for recording data. A portion of the medium is reserved before the beginning-of-medium and after the end-of-medium position. This is done to provide sufficient tape wraps onto the reel hub(s) and to ensure that recording starts in an undamaged section of the medium. At no time does a device operate in either of the attachment regions. Operation in the attachment region risks unspooling the tape from either hub.

3.2.2 Direction and Position Definitions

For devices, positioning has the connotation of logically being in, at, before or after some defined place within a volume. This definition means the position is capable of being repeated under the same circumstances. The orientation of usage for the four words (in, at, before or after) is in one direction, from BOPX toward EOPx. All positioning defined below is worded from this perspective.

The forward direction is defined as logically progressing from BOPx toward EOPX. The reverse direction is defined as logically progressing from EOPX toward BOPX. In serpentine devices, the logical forward or reverse direction has an alternating relationship to the physical motion of the medium.

The idea of being "in" some position means not being outside a defined region. The definition allows the position to be on the boundary of a defined region. When a volume is first loaded, the logical position is always at the beginning of the default data partition (BOPO). Whenever a volume is mounted and the medium motion is stopped, the position is in some partition. While moving between partitions, there is no stable position.

The idea of being "at" some position indicates being positioned to a logical or physical extremity of a partition. A Streaming Tape Device may be positioned at beginning-of-medium, at BOPX, at end-of-data (EOD), at EOPx, or at end-of-medium (EOM), since these are stable positions at extremities of a partition.

The idea of being "before" some position indicates that there is some element (data block, filemark or other defined point) which may be encountered when moving toward EOPx, if the proper commands are issued. Being positioned before a particular data block means that if the device receives a valid READ command, the data block is transferred to the Host. This position may also be before EWx and EOPx, since these are defined points within any partition. However, if data has not been written to the end-of-partition, these points m Tot be accessible by the Host.

The idea of being "after" some position indicates that there is some element (data block, filemark, or other defined point) on the BOPx side of the current position that may be encountered if the proper commands are issued. When a READ command for a single data block has been successfully executed, the logical position is after the transferred data block.

3.2.3 Logical Elements within a Partition

The area between BOP x and EOP x on a typical recorded volume contains host accessible elements, which are principally data blocks. A unit of data supplied or requested by a host is called a logical block. Logical blocks may be recorded in one or more tape frames on the medium. When the logical blocks are not recorded in a one-to-one relationship to the tape frames, it is the responsibility of the device to perform all blocking, de-blocking, padding, stripping, splitting or rebuilding of the logical data block(s) sent by a host.

In the streaming type device 48,(e.g., sequential access device), a typical recorded volume contains at least two types of host accessible elements, which are data blocks and tape marks.

For a sequential access type devices, filemarks are special recorded elements containing no user data. Applications traditionally use filemarks to separate user data from labels and logical groupings of data from each other. A setmark is another type of special recorded element containing no user data, providing a segmentation scheme hierarchically superior to filemarks. This level of segmentation is useful for some high capacity storage devices to provide concise addressing and fast positioning to specific sets of data within a partition.

For sequential access type devices, writing data from BOP x, the medium is considered to be a contiguous grouping of blocks, filemarks, and setmarks, terminated with an EOD mark. The data space on the medium beyond EOD (within the active partition) is considered to be blank. Each partition has an EOD. Unrecorded volumes (new or erased) may exhibit blank medium characteristics if an attempt is made to read or space the volume before data has been written.

A sequential access type device may be capable of supporting fixed or variable length blocks. The concept of fixed or variable mode for writing and reading blocks only indicates the method by which the host specifies the size of a logical block for transfer and not the method of recording tape frames on the medium. The length of a logical block is always described in bytes.

3.2.4 Append Operations

For the sequential access type device, the appendable points exists at the BOP side of an EOD mark, a Filemark, or a Setmark. The EOD mark, Filemark, or Setmark, and any data following the appendable point are overwritten.

In the random access type device, each tape frame may be independently written or overwritten. Every tape frame is a potential appendable point.

4 Logical Data Format

The content of frames 220 was discussed previously with reference to FIG. 12. All physical frames 220 have an AUX data structure 300 shown in Table 1. Each frame 220 is assigned a frame type. In particular, the frame type of a frame 220 is defined in AUX data structure 300 of the frame.

4.1 AUX Data Structure

A principal tool for implementing the logical format is AUX Data structure 300 (see FIG. 12). Each tape frame contains 32 Kbytes of data storage space plus 512 bytes of AUX data structure 300. The AUX data structure is set aside as a control field area for use by the device in order to navigate and catalog the information recorded on the tape.

User data from the host is loaded into buffer memory 116 in 32 Kbyte chunks. For each chunk of user data, tape/volume manager 136 builds a 512 byte AUX data structure 300. After the AUX data structure is built, the AUX data structure is integrated with its corresponding user data by formatter/deformater 118 and placed (along with other fields including C1, C2 parities) as a frame in an output stream for application to write driver 164 (see FIG. 2). The manner of construction of AUX data structure 300 by tape/volume manager 136 is understood by the following more specific description of the format of AUX structure 300.

4.1.1. AUX Data Locations

AUX data structure 300 describes the physical location, the type of elements, and a description of the elements contained within a tape frame. Table 1 defines the bytes of AUX Data structure 300. A requirement for support in Table 1 indicates a requirement that the overall field or data structure listed be supported, but it does not imply that every element in a data structure is mandatory. See the individual data structure definitions for detailed requirements. In Table 1, M=Mandatory for device type; O=Optional for device type; and *=Optional within the device type but mandatory when writing A/V streams.

4.1.2 Frame Type

The Frame Type field is contained in the AUX data structure 300, bytes 0 and 1. The Frame Type is a two (2) byte bit field that identifies the frame, as shown in Table 2.

The following frame types are described: Partition; TOC; Track Table; Defect Map; Identify Frame; Filler Frame; Micro-code Update; Marker; Data; A/V Data; and EOD Frame.

Figure 19:
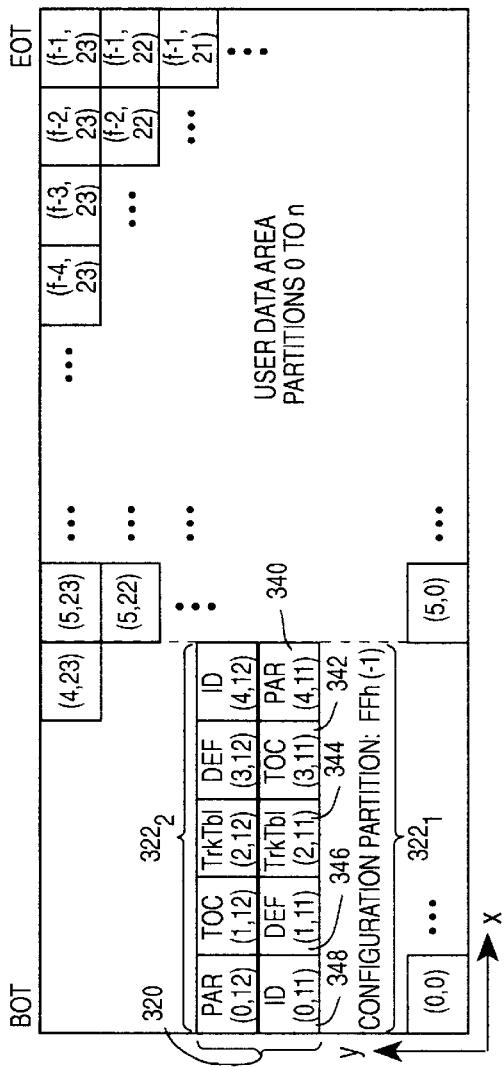
FIG. 19 is a schematic view of configuration or control frames on tape generally.

The first five of the frame types listed above are known as control or configuration frames. As shown in FIG. 19, each MPDR tape 32 has a set 320 of control frames or configuration control frames at the beginning of partition-1 of tape 32. The set of control frames comprises two cycles or sub-sets 322 of frames, particularly subset $322_1$ and subset $322_2$. Each sub-set 322 can include partition frame (PAR) 340, table of contents (TOC) frame 342, track table frame (TrkTbl) 344, defect map frame (DEF) 346, and identification frame (ID) 348. Two sub-sets of frames are provided in the set of control frames for redundancy. Which control frames 340–348 appear in partition-1 for a given tape depends on the type(s) of device which is expected to read the tape.

The Frame Type field defines an A/V flag, which indicates that the frame contains information or data relevant to the A/V device model. The Frame Type bit definitions are provided in Table 2 while the corresponding value for each frame type is given in Table 3.

4.1.2.1 Configuration Frame Types

Figure 13:
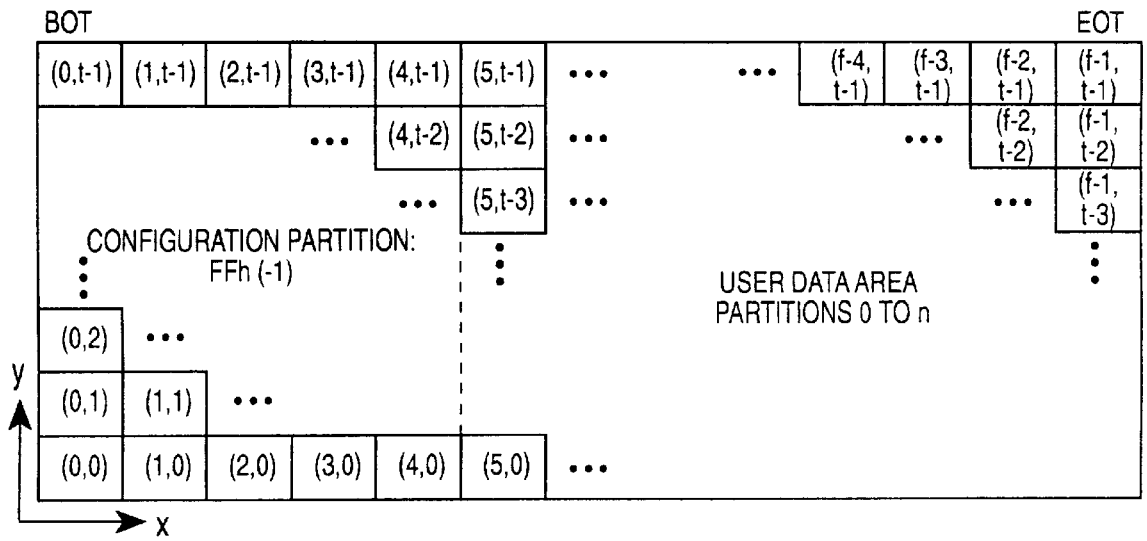
FIG. 13 is a schematic view of a tape with an example of configuration or control partition.

The Configuration Frames are located at the beginning of the tape in the Configuration Partition (see FIG. 13 and FIG. 19). The contents of the Configuration Frames are restricted to the uses defined in this section. The Configuration Frames do not contain user's data. The Configuration Frame types are the Partition Boundary Frame 340, TOC Frames 342, Defect Map Frames 344, Track Table Frame 346, Identify Frame 348.

Only the configuration frame types listed above and/or the universal frame types listed below exist in the configuration partition. Configuration frame types never exist outside the configuration partition. Configuration frames only support the Frame Type and Tape Frame Number fields in the AUX Data structure 300, all other AUX Data fields are undefined.

The configuration partition is prepared by tape/volume manager 136. In particular, tape/volume manager 136 working through buffer manager 131 builds the configuration frames in buffer memory 116. The manner of construction of the configuration frames by tape/volume manager 136 is understood from the ensuing discussion.

4.1.2.1.1 Partition Boundary Frame

Partition Boundary frame 340 describes the number of partitions and each partition's physical location. Partition Boundary frame 340 also contains revision level information about the format recorded on tape. Partition Boundary frame 340 is the principal configuration frame. The Partition Boundary frame 340 is implemented by all MPDR devices regardless of the device type.

All partitions are rectangular in shape and are defined by the tape frame address at two diagonal corners. The Partition Boundary frame 340 positions within the Configuration Partition are located at tape frame address (0,12) and (5,11).

4.1.2.1.2 TOC Frame

TOC frame 342 is reserved for information concerning the physical location of A/V program data. TOC frame 342 contains pointers to the beginning tape frame address and ending tape frame address for all A/V program data. The TOC frame 342 is implemented in all devices which record or playback A/V data streams, regardless of the device type implemented. The TOC frames 342 are positioned immediately following the Partition Boundary frames 340.

4.1.2.1.3 Track Table Frame

Track Table frame 344 contains a look up table used to translate the logical frame address to the tape frame address. This information is used for rapid positioning to logical elements for the Streaming Tape device 48. The Track Table frame 344 is positioned immediately following the TOC frames 342. Implementation of the Track Table frame 344 is mandatory for the streaming tape type devices. The Track Table frame 344 is not implemented by non-streaming tape model type devices.

4.1.2.1.4 Defect Map Frame

Defect Map frame 346 records the tape frame address for unrecoverable frames determined through Read-While-Write or other means. The Defect Map frames 346 are positioned after the Track Table frames 344. Implementation of the Defect Map is optional in a random access record mode, however it is supported in the random access type devices during read operations in order to detect block re-mapping. The defect map frame 346 is not implemented by non random access model type devices.

4.1.2.1.5 Identify Frame

Identify frame 348 contains the basic parameters about the last device used to record the tape 32. Identify frames 348 are positioned after the Defect Map frames 346. The implementation of the Identify frame 346 is optional for all device types.

4.1.2.2 Universal Frame Types

Universal frame types are those that may exist in any partition and do not contain user data. The following are defined types of universal frames: Filler Frame, Micro-code Update Frame, and Reserved Frame Types. Universal frames only support the Frame Type and Tape Frame Address fields in the AUX Data structure 300 (see Table 1), all other AUX Data fields are undefined.

4.1.2.2.1 Filler Frame

Filler frames contain the Tape Frame Address and vendor unique information only. All data in a filler frame is vendor unique. Filler frames most often contain no meaningful data, but they may be used as a volatile working space. Filler frames are be allowed between two data frames when a logical element is spanning the two data frames. A minimum of one Filler frame precedes each Marker frame or EOD frame in the streaming tape model. Reserved frame types are treated as filler frames during reads for forward compatibility.

4.1.2.2.2 Micro-code Update Frame

Micro-code Update Frames are used for device firmware modification. The implementation is vendor unique to accommodate particular device requirements. The device allows overwriting the Micro-Code update frames, which allows for cartridge reuse for data storage.

4.1.2.3 Logical Element Frame Types

The logical element frame types contain elements that are placed on tape based directly on data or commands from the host. Logical element frame types only exist in data partitions, no logical element frame types are recorded in the configuration frame. The logical element frame types defined are as follows: Marker Frame, Data Frame, A/V Data Frame, and EOD Frame.

4.1.2.3.1 Marker Frames

Marker frames are only implemented in the streaming tape type device 48. Marker Frames are used to indicate Filemarks and Setmarks. Each Marker Frame contains at least one mark. The Marker Frame may contain any combination or number of Filemarks and/or Setmarks. All Marker Frames are proceeded by a Filler Frame. Because Marker Frames identify a possible append point to a contiguous data stream, a Filler Frame must be used to ensure that the Marker Frame are overwritten when appending in a read-while-write implementation.

4.1.2.3.1.1 Filemark

Filemarks are a logical entity that have a unique logical block address. Filemarks are only used in the Streaming tape model. As a logical entity, the Filemarks are cataloged in the DAT table (see §4.1.9.5 and Table 7) for the Marker Frame.

4.1.2.3.1.2 Setmark

Setmarks are a logical entity that have a unique logical block address. Setmarks are only used in the Streaming tape type device 48. As a logical entity, the Setmarks are cataloged in the DAT table (see §4.1.9.5 and Table 7) for the Marker Frame.

4.1.2.3.2 Data Frames

As understood from FIG. 12 for example, data frames contain space for 32 Kbytes of user's data. Data frames exists in two types, General purpose data storage and A/V program data.

General purpose data storage is of the nature of standard computer files such as system files, executable files and data files. This data is always be returned with 100 percent integrity. Error recovery methods during a read operation are exhaustive, including reposition and reread techniques. Data integrity may be verified using read-while-write verification during write operations, resulting in rewrite operations in streaming tape type devices, or frame re-mapping in random access type devices. General purpose data frames are identified as having frame type Data with the A/V flag cleared (see Table 2 and Table 3).

A/V Program Data is a stream of digitized audio and/or video data. This data is allowed to be lossy. Only error recovery that can be accomplished on-the-fly is allowed. Data flow to or from the host is maintained regardless of data integrity. No repositions, rewrites, or frame re-mapping are performed.

4.1.2.3.3 EOD Frame

Though not a true logical element, EOD is used in conjunction with logical elements in a streaming tape type device 48. EOD indicates the end of data in a partition and is only used in the streaming tape type device 48. The A/V bit is cleared. An EOD frame is used to identify the append point for subsequent write operations. An EOD Frame contains the EOD data structure. The EOD data structure is used to validate the accuracy of the current Track Table.

4.1.3 Tape Frame Address

The Tape Frame Address is contained in bytes 8 through 11 of AUX data structure 300 (see Table 1). The Tape Frame Address is double-word wide. As shown in Table 4 and Table 5, the Tape Frame Address represents a unique physical location on tape 32 referenced to the buried servo signal. The Tape Frame Address consists of an (x,y) coordinate pair. The 'x' coordinate starts from zero (0) at BOT and sequentially increases to EOT. The 'y' coordinate starts from zero (0) on logical track zero (0) and sequentially increases to the maximum logical track. All tape device types support the Tape Frame Address. The Tape Frame Address is considered to be a double word integer value. All device types 44, 46, and 48 support the Tape Frame Address in every frame that is recorded. No frame is ever be written to tape 32 without a valid Tape Frame Address.

4.1.4 Write Pass Counter

The write pass counter is in bytes 12–25 of AUX data structure 300 (see Table 1). The write pass counter is supported in the streaming tape type devices 48. The write pass counter is not supported in the A/V type devices 44 model or the random access type devices 46. When not supported the write pass counter is zero filled.

The write pass counter is implemented in all streaming tape type device operations. The write pass counter is changed on each write from BOP within a partition during a streaming tape type device write. During streaming tape type device operations data, filemarks, setmarks, and EOD marks are only considered to be current and valid if they contain the current value in the write pass counter. The write pass counter value is modified only during the creation of a new partition, the logical erasure of a partition, or an over-write of a partition from BOP. When a new write pass counter value is required it is assigned as the Maximum Write Pass Counter plus one. The Maximum Write Pass Counter is maintained in the Track Table. No two partitions ever hold the same write pass count.

Old data may exist in a partition from a previous write if during a streaming overwrite operation a servo tracking fault condition arises. During the servo tracking fault condition, the write operation is suspended, but may resume further down tape as the servo system requires lock. The purpose of the write pass counter is to assure that during a subsequent read operation any old data that is detected will not be considered to be part of the current data stream.

4.1.5 Filemark Count

The Filemark Count field of AUX data structure 300 (see Table 1) is a running count of filemarks in the partition up but not including this tape frame. The Filemark Count field is supported in the streaming tape type device 48 but is not not supported in any other type of device. When not supported this field is zero (0) filled.

4.1.6 Setmark Count

The Setmark Count field of AUX data structure 300 (see Table 1) is a running count of setmarks in the partition up to but not including this tape frame. The Setmark Count field is supported in the streaming tape type device 48, but is not supported in any other type device. When not supported this field is zero (0) filled.

4.1.7 Frame Sequence Number

The Frame Sequence Number of AUX data structure 300 (see Table 1) is supported in the streaming tape type device 48, but is not supported in any other type device. When not supported the Frame Sequence Number is zero (0) filled. The Frame Sequence Number is used in the streaming tape type device 48 to indicate the order in which the frames were built to be sent to tape 32. In a read-while-write design frames are recorded on tape 32 out of sequence as unreliable frames are rewritten. The Frame Sequence Number is a double word value that increases monotonically by one from zero in each partition.

The Frame Sequence Number is used during reading in order to properly re-sequence user data. As rewrites occur the Tape Frame Address continues to increment normally, and certain combinations of large logical block sizes during rewrites are difficult to re-sequence from the Logical Frame Address alone. The Frame Sequence Number provides a clear indicator for logical frame ordering.

4.1.8 Logical Frame Address

The Logical Frame Address of AUX data structure 300 (see Table 1) is in bytes 12 through 19. The Logical Frame Address is four words wide. The Logical Frame Address defines the frame's logical position within a partition. A Logical Frame Address is assigned to any frame that contains valid Filemarks, Setmarks or user data.

The Logical Frame Address represents the logical block address for first logical block start contained in the tape frame. In the case of very large logical blocks, were no logical block start exists in the tape frame, the logical block address of the block in progress is used. The Logical Frame Address begins from zero at BOP and increases monotonically towards EOP. The Logical Frame Address is assigned to the first logical element that contains a BOLG in the tape frame. BOLG is defined in the DAT (see §4.1.9.5 and Table 7).

Figure 20:
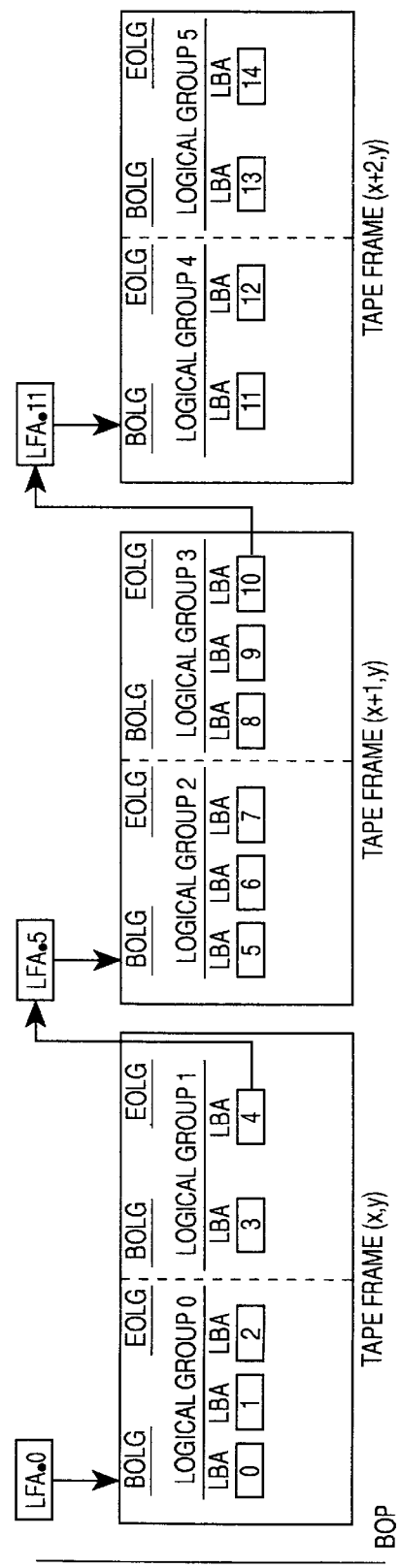
FIG. 20 is a schematic view of a tape showing an example of logical frame addressing.

FIG. 20 is an example of logical frame addressing. In FIG. 20, "BOLG" refers to beginning of logical group; "EOLG" referst to end of logical group; "LBA" refers to logical block address; and "LFA" refers to logical frame address.

The Logical Frame Address is required for the Random Access Tape and Streaming Tape type devices 46 and 48, respectively, and is optional in the Audio/ Video Tape type device 44. Frames containing duplicate data have the same logical frame address.

4.1.9 Data Access Table and Logical Block Descriptions

The Data Access Table (DAT) is in byte positions 48–307 of AUX data structure 300 (see Table 1). DAT is supported in the streaming tape type device 48 and in the random access type device 46, and is optional in the A/V type device 44 (to be used when logical element numbering is desired). When not supported, the first 4 bytes of DAT are zero (0) filled and the remainder of the table is undefined.

4.1.9.1 Logical Elements on tape

A Logical Element represents an entity on tape that possess a unique logical block address. There are three (3) types of logical elements: Data Blocks, Filemarks, and Setmarks. Each logical element on tape has a unique logical address within a partition. The logical block address always starts from 0 at the BOP and the address sequentially increases for each logical element written in sequential order.

4.1.9.2 Logical Groups

A logical group is the sequential grouping of like logical elements that differ only in logical block number.

4.1.9.3 Format Discontinuity

A format discontinuity represents a boundary between adjacent logical elements on tape that have different attributes. Table 6 lists the possible format discontinuities found in a frame.

The logical group attributes are contained in the Logical Block Size and the DAT Entry Flags described in the DAT Entry (see §4.1.9.5.3 and Table 8). Any change in the attributes requires a new DAT entry.

Filemarks and setmarks do not reside in a data frame, and must be placed in a marker frame. Several consecutive marks may reside in the same marker frame. As logical elements, consecutive marks of like attributes are grouped into logical groups that have a data length of zero.

4.1.9.4 Logical Block Address Assignment

The Logical Block Address start from zero (0) at BOP. The Logical Block Address assignment for each logical element within a logical group increases monotonically in sequential order towards EOP. The calculation for the logical element's Logical Block address is determined by the relationship of Equation 1.

Equation 1:

Logical Block Address=Logical Frame Address+Element's Relative Position

In Equation 1, the Element's Relative Position is the element's position within a tape frame. The Element's zero (0) position is the first logical element that contains a BOLG within the tape frame. BOLG is defined in the DAT (see §4.1.9.5 and Table 7). In Equation 1, the Logical Frame Address is the base address used for all logical elements in a tape frame. For more information about Logical Frame Address, see §4.1.8.

4.1.9.5 Data Access Table (DAT) Format

The Data Access Table (DAT) is in bytes 48 through 307 of AUX data structure 300 (see Table 1). The DAT (shown in Table 7) describes the logical elements or partial logical elements contained in the tape frame. When a format discontinuity or a tape frame boundary is encountered, or when a compression group is described, a new DAT entry is made. DAT entries are discussed in §4.1.9.5.3 and illustrated in Table 8. A DAT entry only describes the components of the logical groups contained in the current tape frame or the current compression group.

4.1.9.5.1 DAT Entry Size Each DAT Entry is 8 bytes long.

4.1.9.5.2 Number of DAT Entries

This is the number of entries in the DAT which corresponds to the number of format discontinuities and compression group descriptions contained in the frame. The DAT supports up to 32 entries. No more than 32 format discontinuities and compression group descriptions reside in a single tape frame. The DAT entries beyond those that are enumerated contain undefined data. Some loss of capacity will be experienced in the event that the DAT is filled before the tape frame is filled with user data.

4.1.9.5.3 DAT Entries

DAT entries are shown in Table 8. Each discontinuity in attributes within a frame requires a unique DAT entry. Each compression group requires two DAT entries.

4.1.9.5.3.1 Logical Block Size

A logical block represents the data block size used across the host interface. The logical block size need not have any particular relation to the tape frame size, nor to any of the lower level physical elements defined in the physical tape format document.

The Logical Block Size (LBS) indicates the number of bytes contained in one logical block. If a logical block spans a tape frame boundary, then the Logical Block Size contains the number of bytes actually in the current frame. To determine the host logical block size of logical blocks that span frames, the device has to process all frames containing the components that make up the complete logical element. In a marker frame the Logical Block Size is always be zero.

4.1.9.5.3.2. Number of Logical Elements

The Number of Logical Elements (NLE) indicates the number of logical elements or partial elements described in the DAT entry. For a partial element, the Number of Logical Elements is set to one, since one element is being partially described, this is the case when spanning a tape frame.

4.1.9.5.3.3 DAT Entry Flags

The DAT Entry Flags, understood with reference to Table 9, are used to indicate the attributes of the logical element described by the DAT entry (see Table 8). In Table 9, the following definitions apply:

CMP: If this bit is set to one (1), then the logical element(s) within the logical group is compressed data. If this bit is set to zero (0), then the logical element(s) is uncompressed data.

BOLG: The Beginning of a Logical Group bit indicates that the beginning of this logical group is contained in this frame.

EOLG: The End of a Logical Group bit indicates that the end of this logical group is contained in this frame.

EXT: The Extended Entry bit indicates that the next entry in the DAT is additional information concerning this logical group. For example with compressed data, the first entry in the DAT describes the compression group while the extended entry describes the compression group contents.

MARK: In a data frame the MARK bit is always be set to zero (0). For a DAT entry in a marker frame a Filemark(s) is represented with the MARK bit set to one (1) and a Setmark(s) is represented with the MARK bit set to zero (0). The number of consecutive MARKS with the same attributes is recorded in the "Number of Logical Elements" field.

CID: The Compression ID (CID) indicates the history buffer size used during the compression. A CID value of 00b means a history buffer size of 512; a CID value of 01b means a history buffer size of 1024; a CID value of 10b means a history buffer size of 2048; a CID value of 11b is reserved.

Logical Block Size: The "Logical Block Size" indicates the number of bytes contained in one logical block. In a Marker frame the Logical Block Size is be set to zero (0).

Number of Logical Elements: The "Number of Logical Elements" indicates the number of logical elements in the DAT entry.

4.1.9.6 Filemarks and Setmarks

Since Filemarks and Setmarks represent logical elements and format discontinuities, an entry in the DAT is required for either a filemark logical group or a setmark logical group. Each filemark or setmark has a unique logical block address. All filemarks and setmarks are recorded in a Marker Frame, which separates filemarks and setmarks from user's data. A Marker Frame does not contain user data. All marker frames are preceded by a filler frame.

4.1.9.7 Data Compression

Hardware data compression is an optional feature for the streaming tape type device 48. Hardware data compression is not active in either the random access type device 46 or the A/V type device 44. This does not exclude compression techniques applied to the data outside the device, for example the host may apply MPEG-2 compression against A/V program data before sending the data to the device.

The compression algorithm is the IBM ALDC algorithm. If the drive does not support hardware data compression, it is capable of returning the compressed data to the host.

The description that follows only applies for hardware compression that exists on the device. This description does not apply to compressed data streams that are compressed in the host.

4.1.9.7.1 Data Compression Group

The Data Compression Group is an extension of a logical group (see §4.1.9.2). Only data blocks of the same length are grouped, compressed and recorded as one data compression group. If a block with a different block size is encountered during compression, then the current compression group is closed and a new compression group is started. The maximum amount of uncompressed data contained in a compression group is 32 Kbytes.

A compression group is recorded as a logical group with a single block that possess an extended set of attributes. Two DAT entries are required to describe a compression group. The first entry describes the attributes of the logical group that contains the compression group itself. In addition, the first entry sets the EXT bit to one (1) indicating that there is a second entry which completes the description. The second entry describes the uncompressed contents of the compression group with the EXT bit set to zero (0), the CMP bit set to one (1), and the history buffer size used for the compression group.

4.1.9.8 Logical Groups Spanning Tape Frames

Logical groups can span across tape frames. BOLG and EOLG, which are described in the DAT entry (see §4.1.9.5.3.3 and Table 8), are used to accomplish spanning across tape frames.

All sequential logical elements that have the same attributes are grouped into one DAT entry. In situations when the logical grouping spans to the next frame the beginning and end of a logical group is identified with two flag bits. One flag that marks the beginning of a logical group (BOLG) and another flag that marks the end of a logical group (EOLG). All logical groups have a BOLG and EOLG. Table 10 defines the use of BOLG and EOLG.

Except for data compression groups, a logical group that spans across tape frames only contains one logical block. If a logical block boundary coincides with a tape frame boundary, then the logical group that contains that logical block also ends at the tape frame boundary. If a logical group containing multiple logical blocks is going to span a tape frame, then the logical group are broken into multiple logical groups. The first logical group ends after the last whole logical block that can be fit into the tape frame. A second logical group is started so that a logical group with only one logical block spans the tape frame. The completion of the second logical group is in the next tape frame. This rule does not apply to compression groups.

A compression group is recorded as a logical group consisting of a single block. A compression group is defined in the DAT by two entries. In the first entry the BOLG and EOLG flags define the beginning and ending of the compression group itself. In the second entry the BOLG and EOLG flags define the beginning and ending of the logical blocks contained in the entire compression group.

4.1.10 Partition Control

Partition Control, shown in Table 11, is used to indicate partition boundary. The Partition Control field or partition control flags reside in AUX data structure 300 bytes 34–335 (see Table 1) and are mandatory in all A/V program streams. The Partition Control field is provided as a mechanism to simplify A/V interchange across different device types and between A/V players of different levels of capability.

The most simplistic implementation of the A/V type of device 44 may not have sufficient capability to process a complexly partitioned tape. However, the TOC does supply the beginning and ending tape frame number, and the partition control frame alerts the device as to when a track change is required. Thus, once the beginning of an A/V program has been acquired, the entire program may be retrieved sequentially without any knowledge of the partition geometry.

The following terminology applies to the partition control field as shown in Table 11:

Beginning Of Partition Track (BOPT) is set to indicate that a vertical partition boundary is present on the supply-reel end of the partition. A cornering operation is required to remain in the partition. Support for the BOPT bit is mandatory in all A/V program streams.

End Of Partition Track (EOPT) is set to indicate that a vertical partition boundary is present on the take-up-reel end of the partition, a cornering operation is required to remain in the partition. Support for the EOPT bit is mandatory in all A/V program streams.

Figure 21:
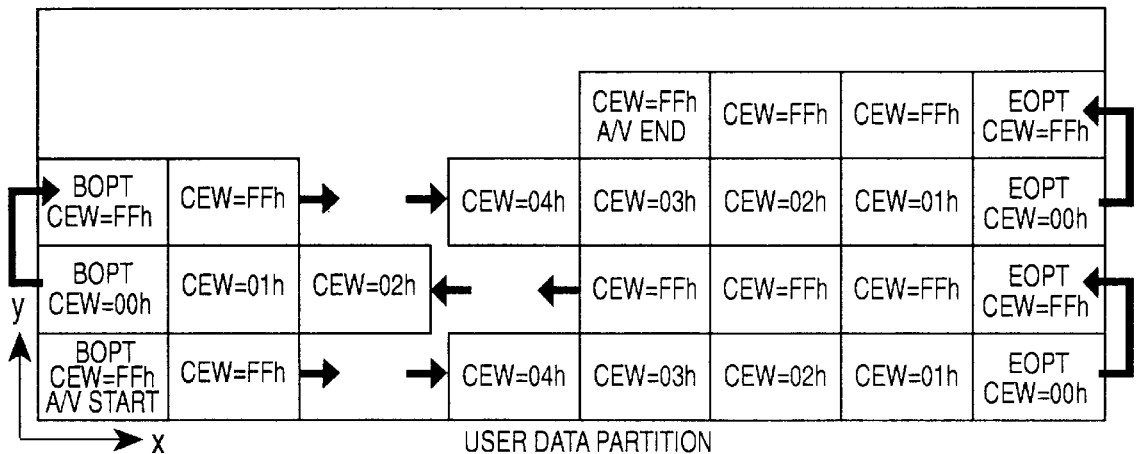
FIG. 21 is a schematic view of magnetic tape media having various partition-related markers and flags of the present invention.

Corner Early Warning (CEW) is a count-down counter indicating that an EOPT or BOPT is approaching in the logically forward direction. CEW is used to by the drive or the system to allow for modifications in data buffering and cache operations in order to smooth the flow of isochronous data. As shown in FIG. 21, beyond saturation (FFh) the CEW always reads 255 (FFh). When the tape frame is within 254 frames of the partition boundary the CEW indicate the number of frames to the partition boundary. At EOPT or BOPT in the logically forward direction the CEW reads zero (0).

4.1.11 Partition Description

The Partition Description of AUX data structure 300 (bytes 336–367) is a duplicate of the 32 byte data structure of the partition boundary frame 340, as described in §4.2.1.5.

4.1.12 A/V Program Description

The A/V Program Description is located in bytes 368 through 431 of AUX structure 300 (see Table 1). The A/V Program Description, shown in Table 12, is a duplication of the 64 byte TOC Entry Data Structure.

4.1.12.1 TOC Entry Structure as A/V Program Description

The A/V Program Description consists of a 64 byte structure, which defines the type of A/V data in each program.

4.1.12.1.1 Program Entry Number

The Program Entry Number is the index into the TOC for this TOC entry. Each TOC entry is assigned a unique Program Entry Number. This first entry is entry 0 with each subsequent entry increasing by one. The TOC entry number is supported in all A/V Program Descriptions.

4.1.12.1.2 Tape Frame Address Start

This field records the starting tape frame address for the current A/V program. This field is supported in all A/V Program Descriptions.

4.1.12.1.3 Tape Frame Address End

This field records the ending tape frame address for the current A/V program. This field is zero (0) in all A/V Program Descriptions.

4.1.12.1.4 Multi-media Source

As shown in Table 13, this 16 bit field is used to identify the source of the A/V data, such as audio or video, which format, and level of copy protection support is to be enforced. Support for this field is optional, if not supported this field is zero filled.

The CP (Copy Protect) and SCPY (Single Copy) bits of Table 13 are provided for copy protection support. Values for CP and SCPY are understood from Table 14. Other values and terminology of Table 13 are understood with respect to the following:

VIDEO—If the VIDEO bit is set to one (1), then the data content is from a video source.

AUDIO—If the AUDIO bit is set to one (1), then the data content is from an audio source.

FUNK—If the FUNK bit is set to one (1), then the data format is unknown to the device.

TSTP—If the TSTP bit is set to one (1), then MPEG time stamp information is embedded in the data stream.

MPEG—If the MPEG bit is set to one (1), then the data format is compliant to MPEG audio/video.

NOCMP—If the NOCMP bit is set to one (1), then the data format is not compressed, real-time linear recording.

Revision—any data format revision levels that are required are entered in this field, if no revision level is required for accurate identification of the format then this field is treated as reserved.

4.1.12.1.5 Program Name/Credits

The Program Name/Credits is a left justified, 32 character, null terminated, ASCII text string used to supply information about the program. Support for this field is optional, if not supported this field is zero filled.

4.1.12.1.6 Program Date/Time

The Program Date and Time fields are fields of numerical values used to recorded the creation date and time of the program. Support for these fields is optional, if not supported these fields are zero filled.

4.2 Configuration Frames Data Structures

4.2.1 Partition Boundary Data Structures

Partition Boundary frame 340 resides in the Configuration Partition and is shown in Table 15. The data structure of Partition Boundary frame 340 defines all the partitions on the tape 32. Any regions on tape that are not defined in this data structure are considered to be undefined and invalid. The entries into the data structure of the partition boundary frame 340 are in ascending order starting with the Configuration Partition (see §5.1 and §4.1.2.1.1). All device types support the Partition Boundary frame 340.

4.2.1.1 MPDR Physical Format Revision Level

Physical format revision levels is reported beginning from revision 1.0. The decimal point separates the major and minor revision levels. The value recorded here is the version number of the specification implemented in the firmware of the device that is recording the Partition Boundary frame.

4.2.1.2 MPDR Logical Format Revision Level

Logical format revision levels are reported beginning from revision 1.0. The decimal point separates the major and minor revision levels. The value recorded here is the version number of the specification implemented in the firmware of the device that is recording the Partition Boundary frame.

4.2.1.3 Partition Boundary Entry Length

This field defines in bytes the length of each Partition Boundary entry, which is 16 bytes.

4.2.1.4 Number of Partitions on Tape

This field indicates the number of partitions on the tape. The minimum value is 2, as all tapes support the Configuration Partition (partition-1, see FIG. 13) and at least one data partition (partition 0) for user's data. There is a Partition Boundary Entry for every partition on the tape (including the configuration partition, partition-1). The maximum number of partitions allowed by this specification is 65 (the configuration partition plus up to 64 user partitions).

4.2.1.5 Partition Boundary Entries

Figure 22:
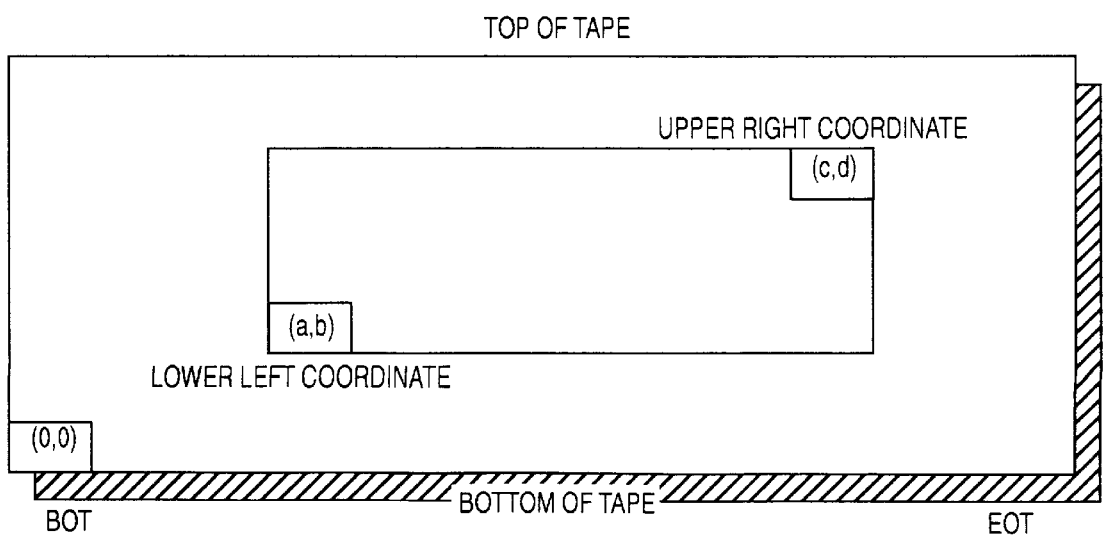
FIG. 22 is a schematic view illustrating partition definition coordinates.

The sixteen bytes of the data structure for a partition entry are shown in Table 16. Partitions are defined by a pair of tape frame coordinates defining the lower left and upper right corners of a rectangle. Partitions may start and end on either even or odd numbered tracks, or they may be contained on a single track, but they are always be rectangular. In FIG. 22, the coordinate pair (a,b) defines the lower left boundary of the partition, while coordinate pair (c,d) defines the upper right boundary. The remaining two corners are derived as tape frame (a,d) and tape frame (c,b).

4.2.1.5.1 Partition Number

Partition numbers are assigned from-1 (FFh) for the directory partition incrementing by one. The first user data partition is partition zero (0). All types of devices support a minimum of partition-1 and partition 0. There are no discontinuities in the partition numbers. Partition entries are ordered by the increasing partition numbers. The order of the partition number assignment does not have any particular correlation with the physical location of the partitions on the tape.

4.2.1.5.2 Tape Device Model Field

Table 17 shows the two byte tape device model field of a partition boundary entry of partition boundary frame 340. The following bit assignments appear in Table 17:

A/V—when this bit is set the partition was created for the A/V device operation.

RA—when this bit is set the partition was created for the Random Access device operation.

STRMR—when this bit is set the partition was created for the Streaming Tape device operation.

TOC—when this bit is set the table of contents is supported for this partition.

DEF—when this bit is set the defect map listing applies to the tape frames within this partition.

TrkTbl—when this bit is set the track table is supported for this partition.

RWW—when this bit is set a least one device that recorded in this partition supported automated read-while-write rewrite operations as described in the streaming tape model.

ERASE—when set the ERASE bit indicates that the partition contains no valid data.

4.2.1.5.3 Lower Left Tape Frame Address

The Lower Left Tape Frame Address specifies the frame that forms the corner of a rectangular partition closest to BOT and logical track zero.

4.2.1.5.4 Upper Right Tape Frame Address

The Upper Right Tape Frame Address specifies the frame that forms the corner of a rectangular partition closest to EOT and the maximum logical track.

4.2.2. TOC Data Structure

The TOC frames 342 reside in the Configuration Partition (see FIG. 13 and FIG. 19). The TOC frames 442 contain a list of all the A/V programs on tape 32. The data structure for TOC frame 342 is shown in Table 18. See §5.1 and §4.1.2.1.2.

4.2.2.1 TOC Frame Number

The TOC frame number shown in Table 18 indicates the index number of the TOC frame 342 starting from zero (0). The TOC frame number is used to distinguish individual frames in the case of a TOC that has been expanded to more than one tape frame. When there is only a single frame TOC, thus the TOC Frame Number is zero.

4.2.2.2 Total Number of Frames in TOC

This field defines the total number of frames currently in use to hold the complete listing of TOC entries. In the standard case all of the TOC entries are listed in one frame and the value in this field is one (1). If the TOC grows beyond the capacity of a single frame, additional frames in partition−1 are allocated from available Configuration Frames. When there is more than a single frame TOC, the Total Number of Frames in TOC is one.

4.2.2.3 Number of Entries in this Frame

Bytes four and five of the data structure of the TOC frame 342 (see Table 18) indicate the number of TOC entries in this TOC frame.

4.2.2.4 TOC Entry Length

Byte six of the data structure of the TOC frame 342 (see Table 18) defines in bytes the length of each TOC entry, which is 64 bytes.

4.2.2.5 TOC Entries

Each TOC entry consists of a 64 byte structure, which defines the type of A/V data in each program. The sixty four byte structure is the same as that shown in Table 12.

4.2.3 Track Table Data Structure

The Track Table frame 344 resides in the Configuration Partition (partition−1, see FIG. 19). The Track Table frame 344 contains information that provides fast and efficient positioning of the tape. The content of Track Table frame 344 is built up by the drive and is not accessible to the host system.

Each streaming tape type model partition has its own record within the Track Table frame 344. The entire Track Table, shown in Table 19, is limited to one tape frame in size (32768 bytes).

4.2.3.1 Maximum Write Pass Count

The Maximum Write Pass Count contains the highest write pass counter in all partitions. When the write pass counter is supported the initial value is one (1). Each time a new write pass count value is required for any partition, it is created as the Maximum Write Pass Counter plus one, and the Maximum Write Pass Counter is incremented to reflect the new highest write pass counter in all partitions. In this way no two partitions ever have the same write pass count.

4.2.3.2 Number of Partitions

This field indicates the number of partitions that are described by the Track Table frame 344.

4.2.3.3 Partition Entry Header Length

This field defines in bytes the length of each Track Table entry header, which is 16 bytes.

4.2.3.4 Track Table Partition Entries

A Track Table Partition Entry contains a header followed by a list of logical block numbers. A Track Table Partition Entry, shown in Table 20, contains a record for relating logical to physical relationships for a particular partition. Each streaming tape model partition has a corresponding Track Table Partition Entry.

4.2.3.4.1 Partition Number

This field of the partition entry data structure (see Table 20) indicates the partition number assigned in the partition boundary frame 340. The Track Table Partition Entries need not be ordered by partition number.

4.2.3.4.2 EOD Tape Frame Address

This field contains the tape frame address of the frame following the last logical entity in the partition. Locating to the frame immediately following the last logical entity ensures that the first copy of any readable EOD frame will be encountered in a RWW implementation.

4.2.3.4.3 Last Marker Frame Address

This field contains the tape frame address of the last marker frame in the partition. It is used to assist in reverse spacing operations. Each marker frame also includes a tape frame address to the previous marker frame. If their are no marker frames in the partition then this field is set to−1 (FFFFFFFFh).

4.2.3.4.4 Last Marker Frame LFA

This field contains the logical frame address of the last marker frame in the partition. If their are no prior marker frames in the partition then this field is undefined.

4.2.3.4.5 Number of Tracks in Partition

This field indicates the number of samples that are described by the Track Table Partition Entry since each track contains one entry.

4.2.3.4.6 Track Entry Length

This field defines in bytes the length of each Track Entry, which is 16 bytes.

4.2.3.4.7 Track Entry

Track entries for Table 20 are shown in more detail in Table 21. Track entries are made in ascending logical track number within the partition. A track entry is reserved for each logical track in the partition at the time that the partition is created. Track entries beyond the EOD track contain undefined data.

4.2.3.4.7.1 Next Logical Block Address

The Next Logical Block Address is the logical block address for the first logical element to start on the next track. In the case of the EOD track this number is the last logical block number in the partition plus one.

4.2.3.4.7.2 Filemark Count

The Filemark Count represents the number of Filemarks recorded in this partition up to and including the last frame on the track.

4.2.3.4.7.3 Setmark Count

The Setmark Count represents the number of Setmarks recorded in this partition up to and including the last frame on the track. In a read-while-write (RWW) environment a frame may be duplicated on two tracks. The Track Table Entry corresponds to the first verified copy.

4.2.4 Defect Map Data Structure

The Defect Map frames 346 reside in the Configuration Partition (partition−1, see FIG. 13 and FIG. 19). If the Defect Map support is implemented, then the host or the device re- maps any tape frame address found to unreliable.

The list is always constructed with the defective tape frame addresses in ascending order for each defect entry. The data structure for defect map frame 346 is shown in Table 27.

4.2.4.1 Defect Map Frame Number

This field indicates the index number of the Defect Map frame starting from zero (0) and incrementing by one. This is used to distinguish individual frames in the case of a Defect Map that has been expanded to more than one tape frame. As the defect map fits in one frame, this entry is zero.

4.2.4.2 Total Number of Frames in Defect Map

This field defines the total number of frames currently in use to hold the Defect Map. As the defect map fits in one frame, this entry is zero.

4.2.4.3 Number of Entries in this Defect Map

This field indicates the number of Defect Map entries in this Defect Map frame 346.

4.2.4.4 Defect Map Entry Length

This field defines the length of each Defect Map entry, which is eight (8) bytes.

4.2.4.5 Defect Entries

As shown in Table 23, each Defect Entry is a pair of double-words defining the tape frame location that is mapped out and the location to which it is re-mapped.

4.2.5 Identify Frame Data Structure

The Identify Frame 348 is in the Configuration Partition (partition-1 ). As shown in Table 24, Identify Frame 348 contains parameter information about the tape drive that initialized tape 32. Support for the Identify Frame 348 is optional.

4.2.5.1 Tape Device Model

The Tape Device Model field of the data structure of identify frame 348 (see Table 24) defines the device model that partitioned the tape. The tape device model field is shown in Table 25. Support for this field is mandatory when the Identify Frame 348 is implemented.

Bit assignments in Table 25 are explained below:

A/V—when this bit is set to one (1) the tape was initialized for the A/V device operation.

RA—when this bit is set to one (1) the tape was initialized for the Random Access device operation.

STRMR—when this bit is set to one (1) the tape was initialized for the Streaming Tape device operation.

FMTR—when this bit is set to one (1) the tape was initialized by a generic factory formatting station.

4.2.5.2 Manufacturer Name

This field is a left justified, null terminated, ASCII text string indicating the manufacturer of the device that initialized the tape. Support for this field is mandatory when the Identify Frame is implemented.

4.2.5.3 Model Name

This field is a left justified, null terminated, ASCII text string indicating the manufacturer's model name that initialized the tape.

4.2.5.4 Model Revision

This field is a left justified, null terminated, ASCII text string indicating the revision level of the device that initialized the tape.

4.2.5.5 Additional Identify Fields Supported

When implementing an intelligent interface, such as SCSI, ATA (IDE) or ATAPI, a number of data structures containing detailed information about the device are readily available. These data structures, shown in Table 26, may be recorded in the Identify frame 348 as a convenient method for storing device information. Any such data structure recorded conforms to the respective interface specification.

Support for this field is mandatory when the Identify Frame 348 is implemented. If no additional identify data fields are supported then this field is zero filled.

The data fields begin at offset 512 within the Identify Frame 348 and each subsequent data field begins on a 512 byte boundary. The data in the reserved areas of the Identify Frame 348 is undefined.

Bit assignments in Table 26 are understood by the following:

INQ—when this bit is set to one (1), the SCSI or ATAPI compatible inquiry data is recorded beginning at block offset 512 in the Identify frame data space.

MODE—when this bit is set to one (1), the SCSI or ATAPI compatible mode sense pages are recorded beginning at block offset 1024 in the Identify frame data space.

LOG—when this bit is set to one (1), the SCSI or ATAPI compatible log sense pages are recorded beginning at block offset 1536 in the Identify frame data space.

ATAID—when this bit is set to one (1), the ATA or ATAPI compatible identify device data is recorded beginning at block offset 2048 in the Identify frame data space.

Undefined—the undefined space is reserved for future expansion, but unlike reserved fields it need not be zero filled.

Any of the identify data fields that are not supported also contain undefined data. Any identify data structure that does not require the entire 512 byte field that has been reserved for it may contain undefined data following the data structure.

4.3 Marker Frame and EOD Frame Data Structures 4.3.1 Marker Frame Data Structure The marker frame is shown in Table 27. The marker frame is only implemented for the streaming tape type device 48. The marker frame is a container for navigational markers on tape 32. The marker frame is where filemarks and setmarks reside. Indications of the type and total number of markers in the frame are located in the AUX data structure 300 to facilitate rapid searching.

The Marker frame data structure for filemarks and setmarks is a subset of the Track Table entry for the current partition. This data structure is placed beginning at byte 0 of the data space of the Marker frame. This information is for use by the device and is not returned to the host.

4.3.1.1 Partition Number

This field indicates the partition number assigned in the partition boundary frame.

4.3.1.2 Previous Marker Frame Address

This field contains the tape frame address of the previous marker frame in the partition. It is used to assist in reverse spacing operations. If there are no prior marker frames in the partition then this field is set to-1 (FFFFFFFFh).

4.3.1.2 Previous Marker Frame LFA

This field contains the logical frame address of the Previous marker frame in the partition. If there are no prior marker frames in the partition then this field is undefined.

4.3.2 EOD Frame Data Structure

The EOD frame data structure is a copy of the Track Table Partition Entries entry for the current partition. This data structure is placed beginning at byte 0 of the data space of the EOD frame. This information is for use by the device and is not returned to the host. For a definition of the elements within the EOD frame data structure, see §4.2.3.4. In the event of a conflict between the EOD Track Table structure and the configuration partition Track Table entries for that partition, the EOD Track Table structure is considered to be most recent for that partition. A seek to EOD will be required in each streaming tape model partition in order to recover the entire current Track Table structure information.

5 Tape Model Operation 5.1 Configuration Partition

The Configuration Partition (parittion-1 , see FIG. 13 and FIG. 19) contains the configuration frames 340, 342, 344, 346, and 348. The configuration frames hold the partition boundary information, and depending on the supported models, frames for managing data on the tape and the device models. All device types initialize and maintain the Partition Boundary frame 340 for format compatibility.

As shown in FIG. 13, the Configuration Partition is the. first partition located on tape 32 from BOT, which is also depicted in FIG. 19. The Configuration Partition contains the Configuration Frames. The Configuration Partition is composed of five (5) frames horizontally and twenty-four (24) logical tracks vertically. The Configuration Partition has a partition number of FFh (−1). No user data (apart from the optional program information in the TOC) stored in the Configuration Partition. All devices types support the Configuration Partition and partition 0. Subdividing the user data area into additional partitions is optional. The Configuration Partition is subdivided into additional partitions. When recording the Configuration Frames, the device maintains the Tape Frame Address.

The Configuration Frames are written in the middle logical tracks. The Configuration Frames are written twice, once in each direction in different physical bands for redundant security. The logical tracks eleven (11) and twelve (12) are used for the Configuration Frames. The Configuration Frame recording order on logical track twelve (12) and eleven (11) always begins with the Partition Boundary frame. Configuration frames have a hierarchical order in which they are written, the hierarchical order being descending as follows:Partition Boundary Frame 340; TOC Frames 342; Track Table Frame 344; Defect Map Frames 346; and Identify Frame 348.

Only five or less configuration frames are used at one time. All of the supported configuration frames are written contiguously. If a particular configuration frame is not supported by the given tape model, then the next frame type in the hierarchy is written. There are no rewriting or re-mapping of the configuration frames.

The frames in the configuration partition not explicitly defined in FIG. 19 are available for use by any of the Universal Frame types. Reserved frame types encountered in the configuration partition are ignored to provide a path to future enhancements with backward compatibility. Filler Frames in the configuration partition may be used as drive working space, however filler frames are considered volatile storage as Filler Frame data is undefined, any device type may write any data into a Filler Frame.

5.2 Audio/Video Tape Operation

Figure 23:
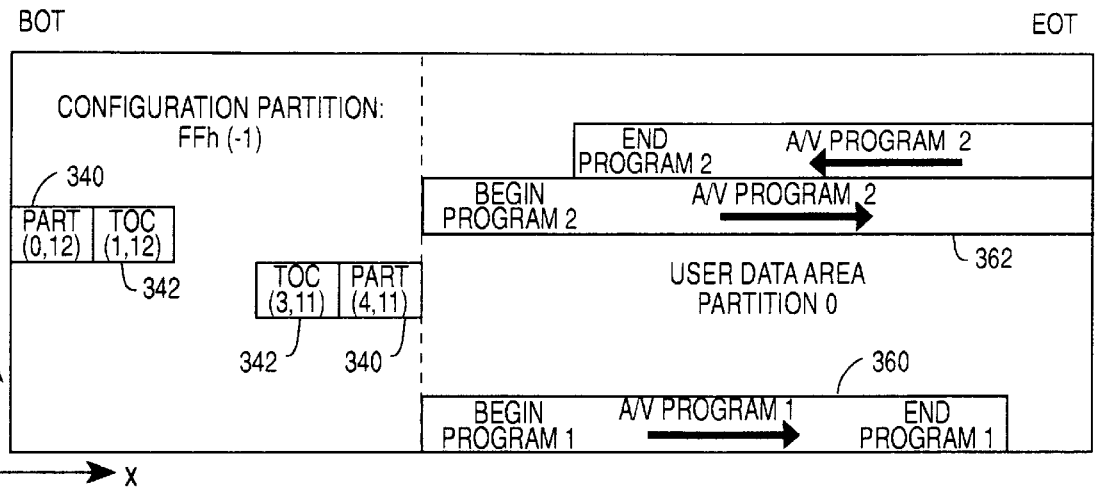
FIG. 23 is a schematic view of example of control frames and A/V programs on A/V Data tape.

The A/V format relies on the concept of Audio/Video program data. A/V program data requires an uninterrupted data flow on play back. The A/V type device 44 maintains an isochronous stream during the program play back. As shown in FIG. 23, the A/V Tape supports and maintains the both partition boundary frame 340 and table of contents frame 342 of the Configuration Frames. The A/V Tape sets the A/V bit in the Frame Type field of AUX data structure 300 (see Table 1) to indicate that the data is A/V program data. A bit in the Frame Type Field separates A/V program data from non-A/V program data. During a read operation, all non-A/V frames are ignored and treated as filler frames.

The A/V Tape has the following attributes: (1) The data from an A/V program is recorded contiguously on tape; (2) During read, the device maintains an uninterrupted data stream; (3) For read-while-write (RWW)devices, the A/V Tape disable RWW; (4) The A/V Tape disables all read recovery techniques involving repositioning; (5) The A/V Tape disables hardware data compression. Only the Tape Frame Number needs to be updated for every frame. The Partition Control Flags field only needs to be updated in connection with end-of-track/end-of-partition corner turns.

FIG. 23 shows a plurality of A/V programs 360, 362 in partition 0.

5.3 Random Access Tape Operation

Figure 24:
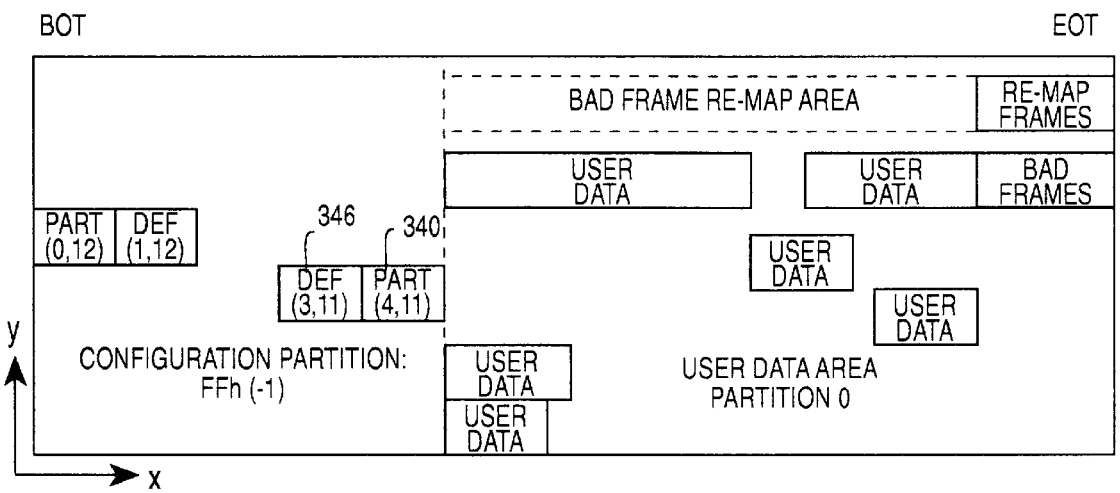
FIG. 24 is a schematic view of example of control frames on a random access tape without A/V Data.

The Random Access tape performs similar to a Random Access type device 46. The Random Access Tape permits writing and reading at all locations on tape 32 with some limitations, which limitations are speed and block size. As shown in FIG. 24, the Random Access Tape supports and maintains the Partition Boundary frame 340 and the Defect Map frame 346 of the Configuration Frames.

If the device records an A/V program data while configured as a Random Access Tape, then the device supports the requirements for the A/V Tape including the initialization and update of the TOC frame 342 (see §5.2).

In the Random Access Tape model, only one entry in the DAT (see §4.1.9.5.3 and Table 8) is require to describe the entire data contents of a tape frame written to tape since there are no discontinuities in the logical element sizes and no logical blocks span across tape frame boundaries.

Figure 25:
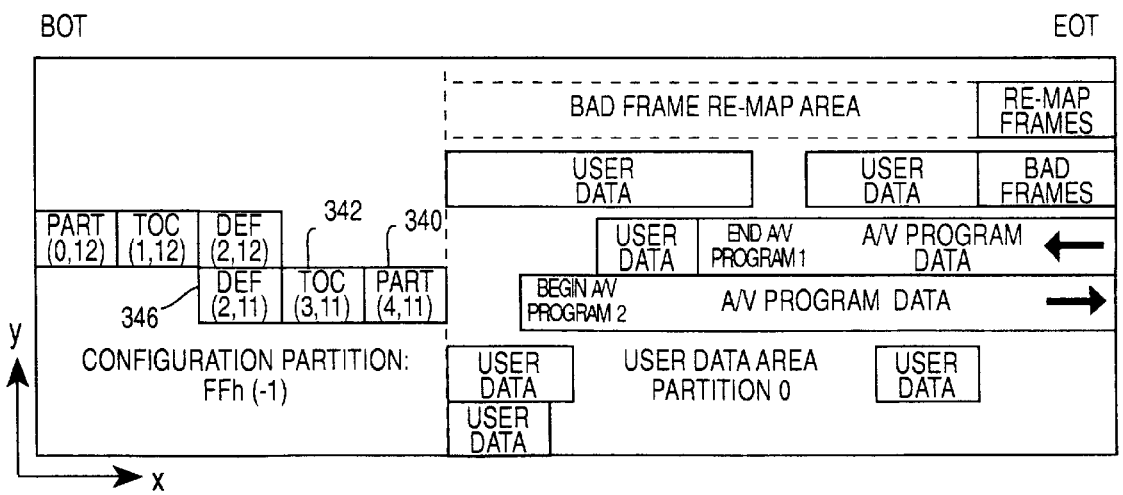
FIG. 25 is a schematic view of example of control frames on a random access tape with A/V Data.

An example of a random access tape without A/v data is shown in FIG. 24. An example of a random access tape with A/V data (e.g., A/v program 370) is shown in FIG. 25.

The Random Access Tape has the following attributes: (1) The logical blocks have a fixed correlation to tape frames and the logical blocks are an even divisor of the 32 Kbytes frame; (2) All logical blocks within a partition are the same size; (3) All read or write operations are performed on complete 32 Kbytes frames; (4) The Random Access Tape disables hardware data compression; and, (5) The Random Access Tape does not support EOD marks, Filemarks and Setmarks.

In the case of a RWW error, the bad frame is re-mapped to a reserved area and the re-mapping is logged in the defect map frame 346. The remainder of the random access partition geometry remains unchanged. The area reserved for re-mapping is set aside at the time that the random access partition is created.

5.4 Streaming Tape Operation

The Streaming Tape type device 48 records the user's data as a sequential data stream on the medium 32. The device terminates a data stream with an EOD mark. Additional data is recorded only at appendable points on the medium. The appendable points on tape are EOD and BOP. Optional appendable points on tape are Filemarks and Setmarks. In addition, a Streaming Tape type device 48 allows rewriting unrecoverable frames, which were detected through RWW, e.g., farther down the tape. For more information about RWW in a Streaming Tape, see §6.3.

Figure 26:
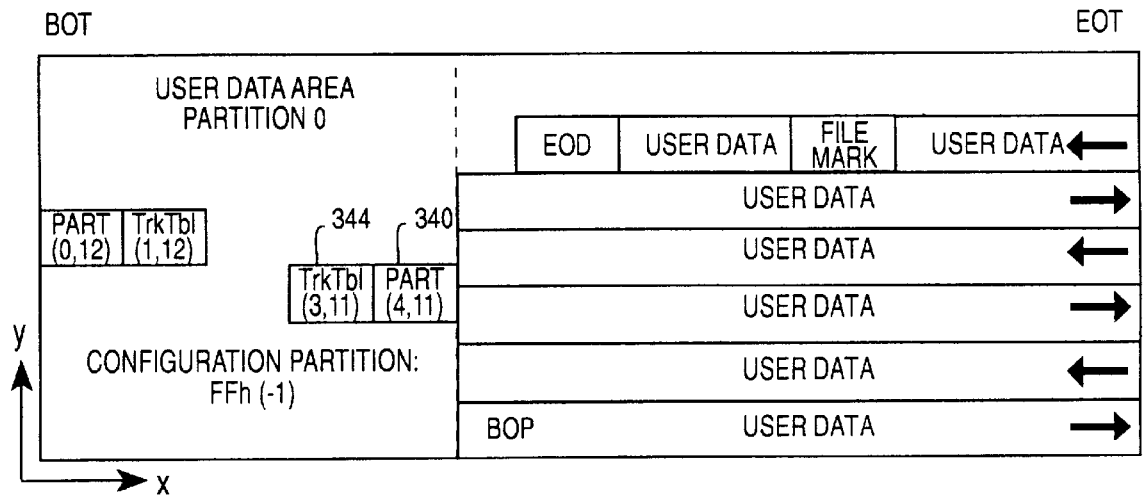
FIG. 26 is a schematic view of example of control frames on streaming tape without A/V Data.
Figure 27:
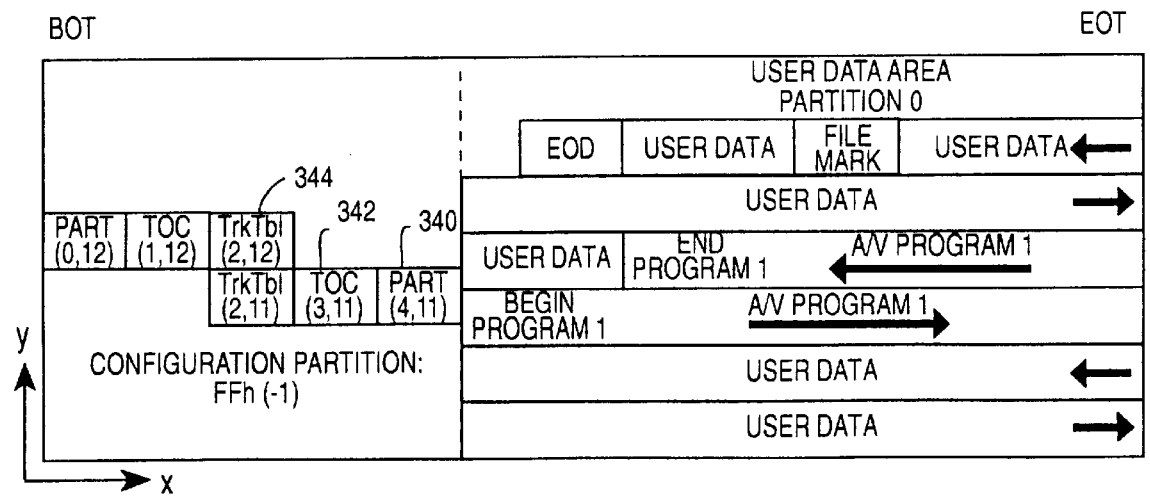
FIG. 27 is a schematic view of example of control frames on streaming tape with A/V Data.

As shown in FIG. 26, the Streaming Tape without A/V data supports and maintain the following Configuration Frames: partition boundary frame 340 and the Track Table frame 344.

If the device records an A/V program while configured as a Streaming Tape device, then the device supports the requirements for the A/V Tape including the initialization and update of the TOC frame 342. Hardware data compression is not active when recording an A/V program data.

The Streaming Tape has the following attributes: (1) Logical blocks are independent of tape frames; (2) Reading or writing physically on tape is performed on complete 32 KByte frame boundaries (thus the device pads frames as required before they are written to tape and reconstructs the data to the host on a read); (3) All data is written contiguously from BOP toward EOP in a stream; (4) Each stream is terminated with an EOD mark (There is only one valid EOD mark in each partition and all frames between the EOD mark and EOP are considered to be blank); (5) The Streaming Tape supports Filemarks and Setmarks; (6) The Streaming Tape supports hardware data compression; and (7) Optionally, the Streaming Tape supports RWW.

5.5 Configuration Frame Initialization

All device types 44, 46, and 48 recognize a two partition minimum configuration, the minimum two partitions are the Configuration Partition (partition–1 ) and partition 0 (see FIG. 13). During cartridge initialization, all device types initialize the Partition Boundary frame 340 in the configuration partition.

5.6 Minimum Configuration Frame Support

Table 28 defines the minimum configuration frame support for each device model. In Table 28, "*" denotes optional during write operations, mandatory during read operations for interchange compatibility.

6 Read-While-Write Verify Operation

In some modes, data recorded on tape can be verified after the recording. When the data recorded on tape is essentially immediately read back for verification purposes by a read head which follows the write head, the operation is known as a "Read-While-Write" (RWW) operation. As used herein, a "Read-After-Write" (RAW) operation is a read for verification purposes that occurs either during the recording process (e.g., RWW), or subsequently (e.g., as by recording further frames or blocks of data before going back to read the frames which were recorded).

6.1 Read-While-Write Verify in A/V Data Operations

Verification can be utilized during the writing of A/V data streams, but there is no re-recording of defective frames.

6.2 Read-While-Write Verify in the Random Access Model

Read-While-Write verification for random access device 46 (see FIG. 1) can be implemented in either of two modes. In a host-responsible rewrite mode (described e.g., in §7.5.1), the host determines suitable rewrite criteria and rewrite locations on the tape for frames which are not readable or which were incorrectly read during read-while-write verification. In a device-responsible rewrite mode (described e.g., in §7.5.2), the device determines locations on the hard sectored tape 32 for a re-recording of such a frame.

6.3 Read-While-Write Verify in the Streaming Tape Model

During a write operation in the Streaming Tape model, RWW verification and rewrites are an automated process controlled by the device. In order that the data returns to the host in the same order in which it was recorded, all Streaming Tape devices recognize the data reordering that takes place during a rewrite.

6.3.1 Frame Rewrites

If during a RWW verify it is determined that a frame is bad, then the frame in error is rewritten in the next available tape frame. When rewriting a bad frame, the following frame is also rewritten regardless of whether it was verified good or bad. For all rewritten frames, the Logical Frame Address and the Frame Sequence Number are unchanged for the rewritten frame; but, the Tape Frame Address is assigned the appropriate address for the physical location. All frames have a unique tape frame address on tape. All rewrites take place on a frame basis. In FIG. 28, FIG. 29, FIG. 30, FIG. 31, and FIG. 32, each square represents a tape frame, n is the Frame Sequence Number, and a RWW read status is shown. A logical frame pair (the frame that returned bad status during the RWW read and the frame immediately following it) may be rewritten up to 64 times consecutively. More than 64 consecutive rewrites constitutes a hard write error.

FIG. 28 shows an example of a logical frame sequence, no error conditions. FIG. 29 shows an example of a first possible rewrite logical frame sequence. FIG. 30 shows an example of a second possible rewrite logical frame sequence. FIG. 31 shows an example of a third possible rewrite logical frame sequence. FIG. 32 shows an example of a fourth possible rewrite logical frame sequence.

6.3.2 Rewrite Criteria

6.3.2.1 Servo Tracking Errors

In the case of an off-track condition during a write, the write operation is suspended. Any frame in progress or pending frame is written upon requisition of proper track following.

When a maximum length (in tape frames) that a lack of servo lock condition is allowed to exist in a stream is exceeded, the device repositions and re-attempts the write, or returns a fatal write error condition to the host. Extreme caution must be exercised when this condition exists in the vicinity of a partition boundary or track end.

The write pass counter is used to signify a frame's validity for the most recent write pass. FIG. 33 shows the use of the write counter, two copies of logical frames with Frame Sequence Numbers n and n+1 can be seen. The copies with the lower write pass counter (PassCnt) are from an earlier write pass (PassCnt =4). They were not overwritten during the latest write pass (PassCnt =5), due to a servo tracking error condition. During the write pass, the tracking error existed for less than 2 tape frame lengths, then valid tracking was re-established, and the write resumed from frame n.

6.3.2.2 Servo Dropout Conditions

A servo dropout is a total loss of servo tracking signal. The condition is created by a large tape defect or a loss of tape to head contact. When a servo dropout occurs the device ceases writing until servo tracking is reacquired. The condition is treated the same as Servo Tracking Errors, except that the device interprets the length of tape traveled since servo data is not available to indicate tape frames. Extreme caution must be exercised when this condition occurs in the vicinity of partition boundaries or track ends.

7 Operation

7.1 Interchangeable Media and Recording Thereon

Figure 34:
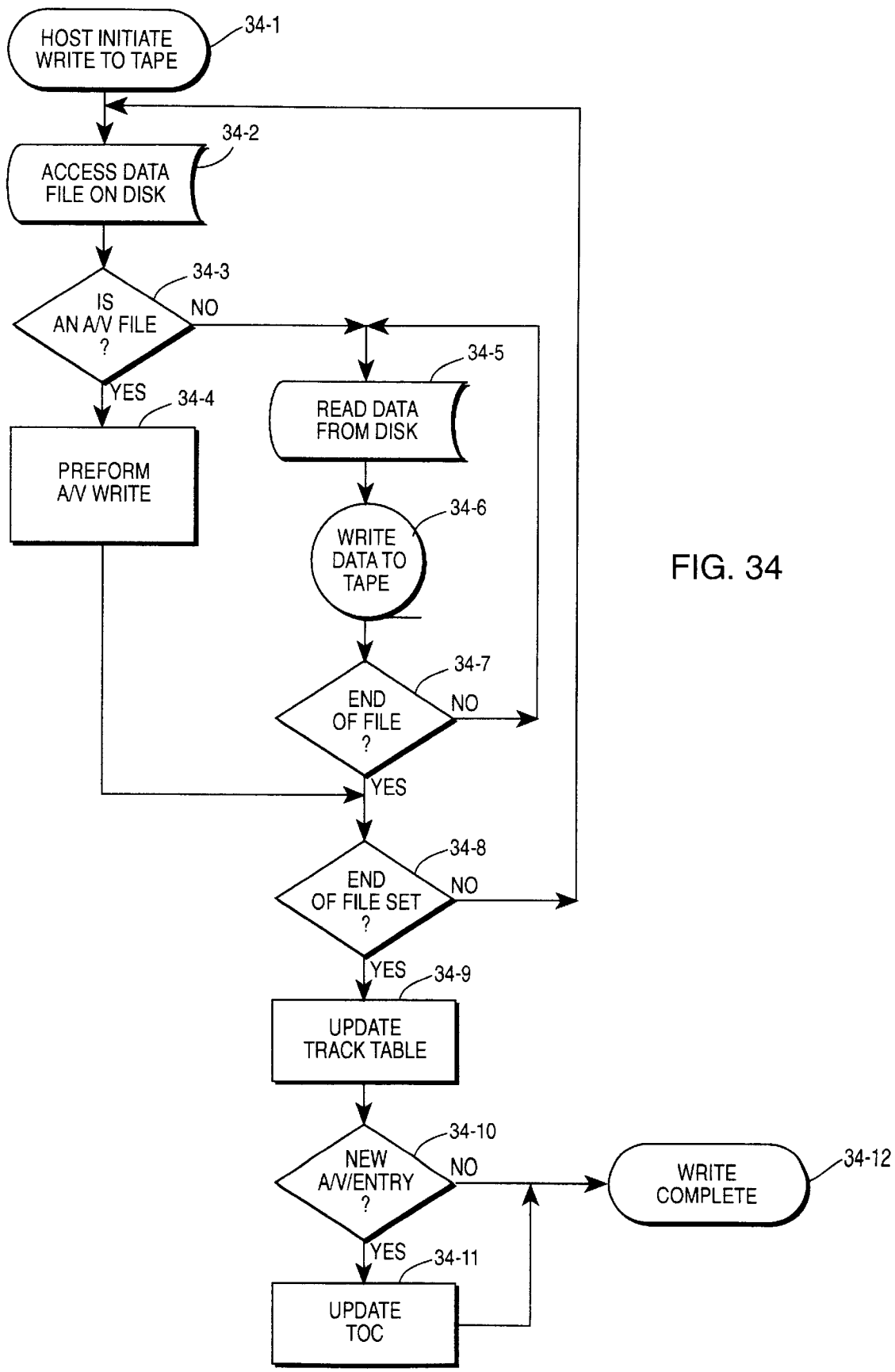
FIG. 34 is a flowchart showing steps executed when a host computer records data on a multipurpose tape of the present invention.

As shown in FIG. 1, tape 32 (housed in cartridge 30) can be utilized by a plurality of device types, including A/V type device 44, random access type device 46, and sequential access type device 48. Two of these device types, random access device 46 and sequential access device 48, can be used to write both A/V programs and non-A/V data to the same tape 32. Described below with reference to FIG. 34 are steps implemented by a host computer of either random access device 46 or sequential access device 48 in a mode of recording on tape 32. The steps results from execution by a processor of the host of a set of coded instructions. The set of coded instructions is stored in a memory of the host.

At step 34-1, the host computer initiates a write to tape 32 via its connected access device. Again, it is mentioned that the access device intended with reference to FIG. 34 can be either of devices 46 or 48, and that the host is either of their respective hosts 66 or 68.

Step 34-2 shows the host accessing (e.g, from its memory [e.g., a disk file]) the data that is to be recorded on tape 32. Depending on whether the data to be recorded is A/V data or not (see step 34-3), either step 34-4 is executed (for A/V data) or a series of steps A-5, A-6, and A-7 are executed (for non-A/V data).

If non-A/V data is to be recorded, at step 34-5 the non-A/V data is read from the host's memory (e.g. disk). Step 34-6 shows the host-obtained non-A/V data being recorded on tape. In the recording of step 34-6, 32 Kbytes of user data and a corresponding AUX data structure 300

(prepared by tape/volume manager 136) are fetched from buffer memory 116 and sent to formatter/deformatter 118 for inclusion in a frame. Formatter/deformatter 118 includes in each frame further information as understood with respect to FIG. 12, including C1 and C2 parity values.

The reading of host non-A/V data (step 34-5) and recording to tape (step 34-6) continues until an end of file is encountered (step 34-7). If an end of file is encountered at step 34-7, a check is made at step 34-8 whether another file is to be written to tape 32. If another file is to be written, execution returns to step 34-2 for a repetition e.g., of steps described above.

Figure 35:
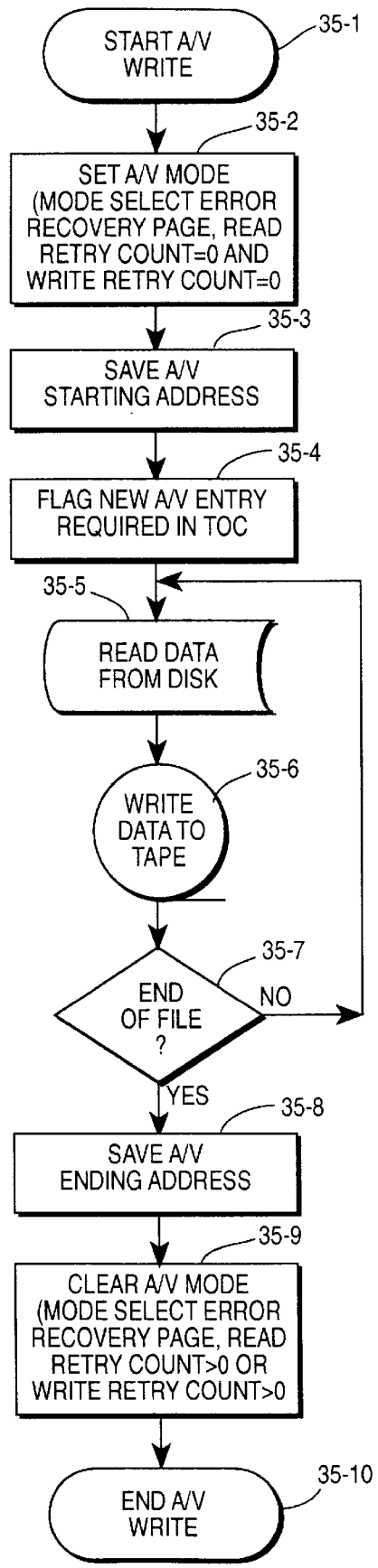
FIG. 35 is a flowchart showing steps executed in connection with a write of A/V data to a multipurpose tape of the present invention.

The writing of A/V data to tape 32 preformed at step 34-4 is shown in more detail in FIG. 35. FIG. 35 illustrates substeps involved in the A/V write procedure of step 34-4. Step 35-1 depicts the beginning of writing of A/V data to tape 32. At step 35-2, the host sets various A/V mode parameters necessary for recording of A/V data. Among the parameters set at step 35-2, the mode select error recovery page is set (a configuration command from the host in SCSI and ATAPI), the read retry count is set to zero, and the write retry count is set to zero. The setting of these data rate parameters reflects the fact that the recording of the A/V data can be lossy so that, e.g., data rate will not be determined by the drive, but instead only by the host.

At step 35-3, the host determines and saves in host memory the starting address on tape 32 at which the A/V data will reside. The starting address is the tape frame address at the time the modes are changes to indicate A/V data. At step 35-4 the host sets a flag indicative of the fact that a new A/V entry will be required in TOC frame 342 (see FIG. 19) for the new A/V data program.

Step 35-5, step 35-6, and step 35-7 show the host reading the A/V data to-be-recorded from its memory (e.g., disk) and recording the same on tape 32 (step 35-6) until an end of file is encountered (step 35-7). The writing of frames at step 35-6 occurs in much the same manner as described above with respect to step 34-6. When an end of file is encountered, the host saves the ending address of the A/V program in host memory (step 35-8). Then, prior to completion of the A/V write (indicated by step 35-10), the host clears the A/V mode parameters (step 35-9). In clearing the A/V mode parameters, the mode select error recovery page is set so that either the read retry count or write retry count are set to non-zero values for non-A/V mode.

After all files have been written by the host to tape 32, at step 34-9 the host writes to tape 32 to update the track table frame 344 (see FIG. 19). As indicated previously, the track table frame 344 contains a look up table which is used to translate the logical frame address to the tape frame address. The data structure of track table frame 344 is shown in Table 19, wherein it is seen that the track table frame 344 has a plurality of entries. A format of each of the entries in the track table frame 344 is shown in Table 20. Thus, at step 34-9 the host updates the entry in the track table frame 344 that pertains to the partition in which the data just written has been recorded.

At step 34-10 the host determines whether any of the data files written in the previous steps were A/V programs. If any A/V programs were written, the table of contents (TOC) frame 342 (see FIG. 19) is updated at step 34-11. The data structure for the TOC frame format is shown in Table 18. As mentioned previously, the TOC frame 342 contains a list of all A/V programs on tape 32. In updating TOC frame 342, for each A/V program just recorded to tape 32, the host creates an entry for TOC frame 342, the format of the entries being set forth in Table 12. In so doing, the host stores in the entry, among other parameters described in Table 12, the tape frame starting address as determined from step 35-3 and the tape frame ending address as determined from step 35-8. Also, in accordance with the number of new entries and lengths thereof, the host updates the count of the number of entries and length of table in TOC frame 342.

After the track table frame 344 and, when necessary for A/V programs, the TOC frame 342 have been updated, the record mode of the host is terminated, as reflected by step 34-12.

In the writing of data to tape 32 as occurs in step 34-6 (for non-A/V data) or step 35-6 (for A/V data), the location in which the data is to be written must be determined and accessed on tape 32. For non-A/V data, the determination of the location is device dependent. For A/V devices, the TOC frame is consulted as having an indication of the location. Of course, in recording of user data, the devices must skip over the control frames in partition-1 before writing user data to tape. Any structure not supported by a particular device must be written by a filler frame (a frame type 00h with a physical block number as the only other valid field).

User data is recorded in step 34-6 (for non-A/V data) or step 35-6 (for A/V data) in frames as herein described. As mentioned above, the AUX data structure 300 for a frame is prepared in buffer memory 116 by tape/volume manager 136 acting through buffer manager 131. Components of a frame are fetched from buffer memory 116 and applied to formatter/deformatter 118. Formatter/deformatter 118 builds the frame, including other information understood from FIG. 12 including C1 and C2 parity values. The frame built by formatter/deformatter 118 is applied to write driver 164 for recording on tape 32. It will be recalled that AUX data structure 300 (see Table 1) has a frame identify field for designating the type of frame being recorded (see Table 2 and Table 3). Thus, upon recording of a frame, the AUX data structure 300 of that frame includes an indication of its type of frame and accordingly whether the frame contains A/V data or not.

The invention implements a strategy of control tables or control frames to implement the multipurpose functions of tape 32 (e.g, tape being usable by differing types of devices). In particular, tape 32 has a reserved area wherein necessary ones of a plurality of potential control or configuration tables can be recorded. Which control tables are necessary depends on the type of data recorded on tape 32 and the type of devices expected to read tape 32.

In the illustrated embodiments, the reserved area is a separate vertical partition on tape 32 (partition-1 ) [see FIG. 19]. It should be understood that the reserved area can take other forms in other implementations (e.g., a reserved horizontal partition, or reserved locations in a partition shared with user data, for example).

The illustrated embodiments, the control or configuration tables are frames which are synchronized to a hard sectored format. Again it should be understood that the tables need not each have a separate frame, but can be stored on the tape in other ways.

The particular control tables or frames herein provided include partition boundary frame 340, table of contents frame 342, track table frame 344, defect map frame 346, and identify frame 348. As shown in FIG. 19, two sets 322 of necessary frames are recorded, one set being in a forward direction; the other set being in the reverse direction. The order of recording of the necessary ones of the control frames is as listed above.

Partition boundary table frame 340 is a necessary frame for all tapes. Any tape having an A/V program recorded thereon must also have the table of contents (TOC) frame 342, since TOC frame 342 includes e.g., a listing of all A/V programs on the tape.

All tapes having random access data recorded thereon must have, in addition to partition boundary frame 340, the defect map frame 346. In addition, if the tape with random access data also has an A/V program thereon, the TOC frame 342 must be included.

All tapes having sequential access data recorded thereon must have, in addition to partition boundary frame 340, the track table 344. In addition, if the tape with sequential access data also has an A/V program thereon, the TOC frame 342 must be included.

In the multi-mode tape format disclosed herein, a common method is provided for exchange of audio/video data. The disclosed tape format serves as random access data storage, streaming tape data recorder, and/or digital entertainment (i.e. movies or music) program recorder/player, a common recording method is desired for audio/video (A/V) data streams. By utilizing the concept of an A/V program and a table-of-contents (TOC), which lists the beginning and end of each A/V program, all three implementations can interchange the A/V data. Although data format incompatibilities inherently will exist between the random access and stream data recorder formats (and a simple A/V recorder/player will be unable to interpret data from either), the A/V component is common to all.

The ability exits for any of the MPDR device models to record and playback the audio/video stream data format. Other data is stored as a series of logical blocks and cross platform access are implementation dependent.

7.2 Flexible Partitioning

Section 2.3 describes the logical division of tape 32 into rectangular partitions, each partition being a logically independent unit. The example of tape provided herein is a hard sectored tape format in which all recording entities (blocks and frames) have fixed and known locations on the tape.

Each partition is defined by two points on a diagonal. A vertical partitioning method is illustrated in FIG. 13 and FIG. 14; a horizontal partitioning method is illustrated in FIG. 15 and FIG. 16.

According to the present invention, rectangular partitions can be created with differing partitions having differing numbers of tracks/logical tracks per partition, and/or differing numbers of frames per track. Thus, partitions can be flexibly mapped or tiled on tape 32, with a combination of horizontal partitioning and vertical partitioning as desired. The present invention provides method and apparatus for defining and controlling such tiled flexible partitions.

Figure 18:
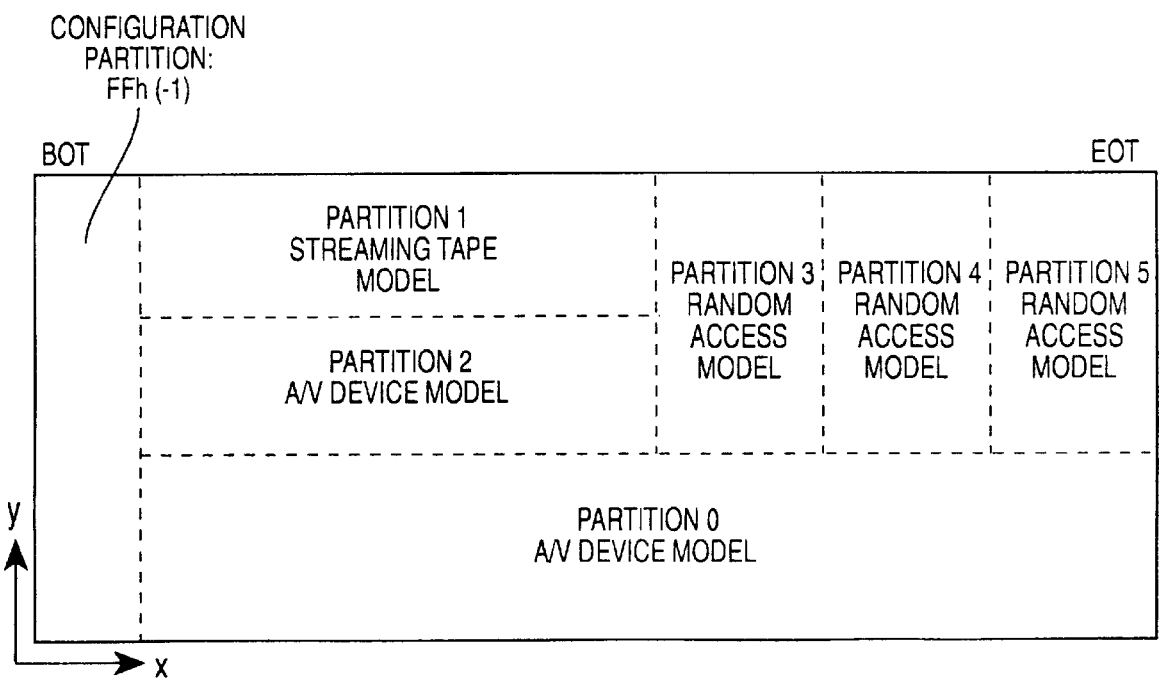
FIG. 18 is a schematic view of a tiled combination of horizontal and vertical partitions on magnetic tape media.

One such example of tiled flexible partitioning is shown in FIG. 18. FIG. 18 shows a tiled combination of horizontal and vertical partitions, each partition being defined by (A,B) diagonal physical frame pairs on tape. FIG. 18 illustrates creation of seven partitions, i.e., the configuration partition and Partition 0 through Partition 5, on tape media 32. Partition 0 is a horizontal partition. The remainder of tape 32 has vertical partitions Partition 3, Partition 4, and Partition 5, with yet remaining portions of the tape horizontally partitioned into Partition 1 and Partition 2. In the example of FIG. 18, various partitions may be utilized by differing types of devices. For example, some of the partitions may be created for audio/visual device 44; others of the partitions may be created for random access device 46; yet others of the partitions may be created for sequential access or streaming device 48 (see FIG. 1).

A directory at the beginning of tape 32 serves as a central list of the diagonal coordinates of each partition. Specifically, the Partition Boundary Frame 340 at the beginning of tape (see FIG. 18) is employed. Frame 340 includes a partition boundary data structure which contains a definition of the number partitions on the media, and the beginning and end locations of each of the partitions. In addition, the Partition Boundary frame 340 contains, for each partition, a Tape Device Model Field which indicates for which type of device (e.g., audio/visual device 44; random access device 46; sequential access or streaming device 48) the partition was created.

For the example of FIG. 18, the Partition frame Structure has seven Partition Boundary Entries, one entry for each of the configuration partition and Partition 0 through Partition 5. The diagonal physical frames of each partition are determined with reference to the Partition Entry Data Structure for each partition The AUX data structure 300 (see FIG. 12) also serves to identify partition boundaries on tape 32. In particular, AUX data structure 300 contains both a Partition Control Field and a Partition Description Field (see Table 1). The functions served by the fields are summarized below.

When information is being recorded to tape, the present invention provides the host with an indication that the recording device is approaching the end of the permissible recording area (end of partition), or that the device is approaching the end of track and must turn a corner. These indications are called early-warning (EW) indications or early-warning markers. In particular, there are two types of early-warning markers: the Logical-early-warning (LEW) marker and the Corner-early-warning (CEW) marker. Both of these early-warning markers are stored in AUX data structure 300 of a frame, or they may be calculated based on a stored knowledge of the partition geometry (also in the AUX data structure 300), and particularly reside in the Partition Control Field of AUX data structure 300 for A/V data streams.

The Logical-early-warning (LEW) marker is placed in a physical frame at some distance prior to the end of a partition. The purpose of the LEW marker is to notify the system that the end of the allowable recording area is imminent.

The Corner-early-warning (CEW) marker is placed in a physical frame at some distance prior to beginning of partition on this track (BOPT) or end of partition on this track (EOPT). The purpose of the CEW marker is to notify the system that a track corner turn is imminent. In the case of an isosynchronous data stream, this warning allows the system time to buffer sufficient data, ensuring that the pause in data flow during the cornering operation does not adversely affect the asynchronous nature of the data stream.

The Partition Control Field, in which these and other markers are stored, is shown in Table 14 and is provided in bytes 334–335 of AUX Data Structure 300. The Partition Control Field thus has a 16 bit field used for storing these markers or other flags used to indicate partition boundary conditions and marker frame identifiers. The following are examples of the markers or flags contained in the Partition Control Field: Beginning Of Partition this Track (BOPT); End Of Partition this Track (EOPT); Corner Early Warning (CEW); Logical Early Warning (LEW). FIG. 21 is a schematic view of magnetic tape media having various partition-related markers and flags of the present invention.

Placement of the early warning (EW) markers on a track in a partition is dependent upon numerous factors as understood herein, including buffer size, reading/recording rate, and tape linear speed. Such factors influence how many frames must separate a frame containing an early warning (EW) marker from a frame which forms a partition boundary.

The horizontal partition boundaries are defined by the tracks or logical tracks, the vertical partition boundaries are indicated through the use of the beginning-of-partition-track (BOPT) flags, and the end-of-partition-track (EOPT) flags. During a read of the tape media, the xOPT (x being either a B or E) flag indicates that the partition boundary has been reached and that the device must change tracks and direction to remain within the current partition. The use of the partition boundary markers or flags in the AUX data structure allows simplified cross platform utilization of the partitions during read. A device reading the tape need only detect the flags in order to navigate the partition boundaries and does not need to constantly mathematically model the partition.

Thus, in a hard sectored format rectangular partitions may be created that are identical models of the total tape, differing only in the number of tracks/logical tracks and frames per track.

While relying somewhat on command sets between the device 20 and host, the partitioning flexibility is not necessarily limited thereby. In one embodiment involving simple partitioning schemes, for example, device 20 determines the geometry of the partitioning scheme based on a host command which specifies the number of partitions and the size of each. In another example embodiment which particularly utilizes random access data, the host (utilizing an appropriate device driver) defines the partition geometry in order to optimize storage of data that the host knows it will send to the drive.

7.3 Control of Tape Speed and Read/Record Clocking

Conventional drives use external references, e.g., crystal oscillators, to control linear speed of tape and the rate of recording of data on the tape. As seen hereinafter, the linear speed of tape 32 is controlled by the data transfer rate to and from the host as reflected, e.g., by a detected "buffer level" of buffer memory 116. The rate of recording of user data is, in turn, dependent upon the linear speed of tape 32 as detected with reference to the clocking signal $TS_c$.

In the present invention, linear motion is imparted to tape 32 by cartridge belt 37 (see FIG. 1). Cartridge belt 37 is entrained about cartridge puck 38 and revolves in a belt path (partially in contact with tape 32) as cartridge puck 38 rotates. Cartridge puck 38 rotates when in contact with drive capstan 152. Drive capstan 152 is rotated by capstan motor driver 150, which is driven by capstan motor driver 156 (see FIG. 2).

Tape speed controller 133 of processor 130 seeks to control capstan motor driver 156 so that capstan 152 is rotated at a suitable rotational speed to impart a desired linear velocity to tape 32. Tape speed controller 133 receives a feedback signal from capstan speed sensor 154 or servo clock recovery circuit 174 to ascertain the rotational speed of capstan 152. As hereinafter described, tape speed controller 133 determines the desired linear velocity of tape 32 based on a value (represented by line 133-3) from buffer fill monitor 132.

Figure 36A:
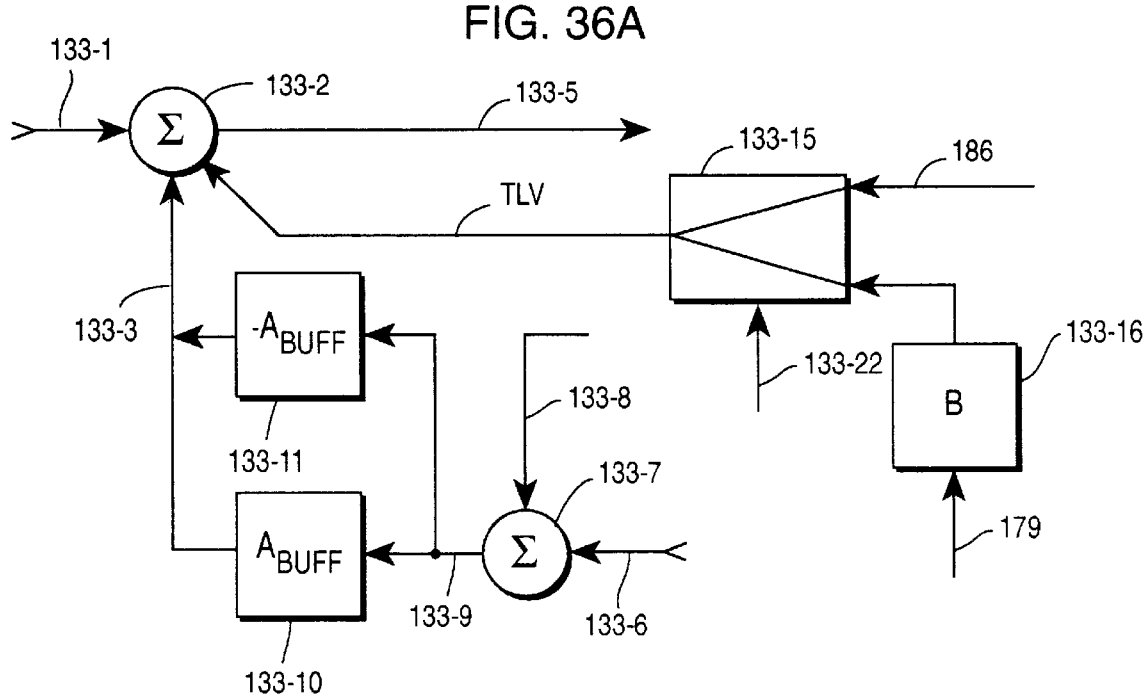
FIG. 36A, FIG. 36B, FIG. 36C, FIG. 36D, and FIG. 36E are schematic view of alternative embodiments of a tape speed controller according to an embodiment of the invention.

FIG. 36A shows a first embodiment of tape speed controller 133. An initial desired tape speed value (in, e.g., inches per second) is applied to tape speed controller 133 as represented by input 133-1. Adder 133-2 adds an adjustment value (represented by input line 133-3) and a tape linear velocity feedback signal (TLV) to the initial value 133-1. The output of adder 133-2 is applied to capstan motor driver 156 on line 133-5. Thus, the value of the signal on line 133-5 is used to control capstan motor driver 156, which in turn drives capstan motor 150, which in turn rotates drive capstan 152. Rotation of drive capstan 152 causes rotation of cartridge capstan puck 38, and consequentially the linear velocity of belt 37 and tape 32.

In the embodiments hereof, it should be understood that a clamping of the signal to control capstan motor driver 156 can occur either with respect to maximum velocity, minimum velocity, or acceleration.

The adjustment value represented by input line 133-3 depends on the amount of user data in buffer memory 116. In this regard, buffer fill monitor 132 (see FIG. 2) outputs a buffer level value represented by line 133-6. The buffer level value on line 133-6 is in units of frame numbers or buffer memory location numbers. An adder 133-7 adds the buffer level value and a buffer level normalization value (a negative quantity represented by line 133-8). Adder 133-7 yields a buffer level differential value on line 133-9. If the buffer level value exceeds the buffer level normalization value, the buffer differential value has a positive sign but a negative sign otherwise. The buffer level differential value is applied both to gated mode-dependent (write) compensation function 133-10 and to gated mode-dependent (read) gain compensation function 133-11. Compensation functions 133-10 and 133-11 are functions of the present and, if desired, the past linear velocity of tape 32 and can include, for example, a gain multiplier. When the drive is in a write mode, write compensation function 133-10 applies a positive gain factor (represented as $A_{buff}$) to convert the buffer level differential value to the units of input value 133-1 (e.g., inches per second) and outputs the adjustment value on line 133-3. When the drive is in a read mode, on the other hand, read gain compensation function 133-11 applies an inverted (e.g., negative) gain factor (represented as $-A_{buff}$) to convert the buffer level differential value to the units of input value 133-1 (e.g., inches per second) and outputs the adjustment value on line 133-3.

Figure 36B:
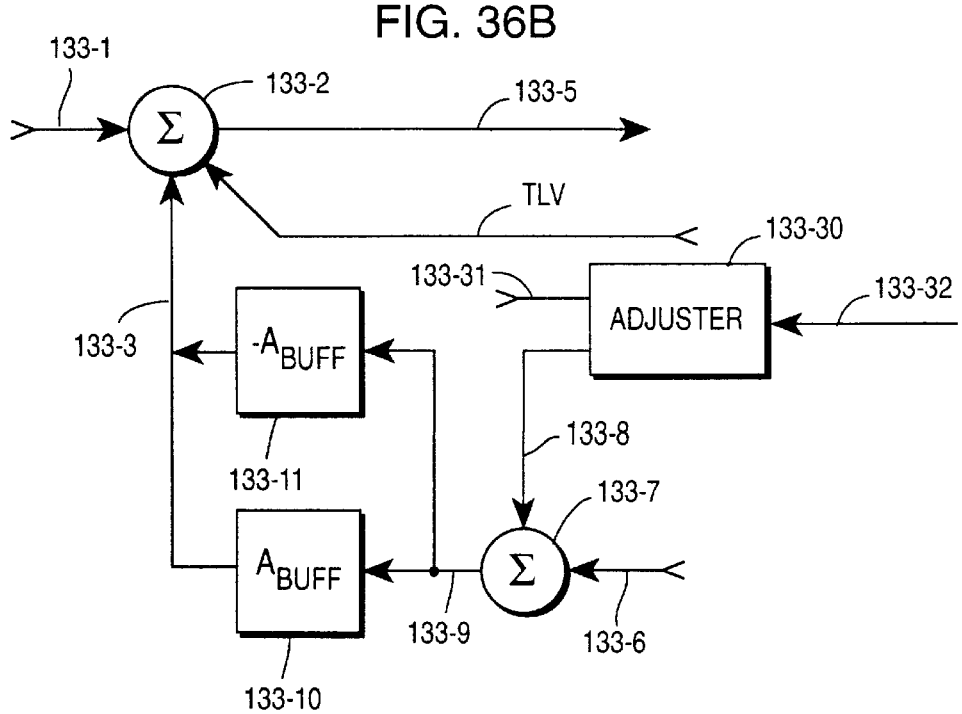

Thus, adder 133-2 receives the initial input value (line 133-1), the adjustment value (on line 13-3), and the tape linear velocity value. In one embodiment, the tape linear velocity (TLV) value is always the capstan speed sensor feedback value applied on line 186. In another embodiment, the tape linear velocity (TLV) value switches from the capstan speed sensor feedback value to a value derived from the actual tape linear velocity. In this regard, FIG. 36A shows a switch, gate, or multiplexer 133-15 which selects between two inputs to form its TLV output value. A first input to switch 133-15 is the capstan speed sensor feedback value on line 186; the second input to switch 133-15 is connected to an output terminal of converter 133-16, which has its input terminal connected to line 179. In FIG. 36B, the interrupt on line 179 indicative of the beginning of a cycle of servo clock signal $TS_c$ is applied to a converter 133-10. Converter 133-16 times the interval between interrupts on line 179 (e.g, the number of cycles) and applies a compensation factor (e.g., multiplier) so that its output is in appropriate units for application to adder 133-2.

Switch 133-15 is operated by a control flag (represented by line 133-22). In one mode of operation, control flag 133-22 has a first value at the beginning of drive operation so that the capstan speed sensor feedback value on line 186 is first selected as the the tape linear velocity value (TLV). Then, after sufficient start-up time has elapsed, control flag 133-22 changes values so that the signal from converter 133-16 (based on the actual linear velocity of tape 32) is selected.

In subsequently described embodiments of FIG. 36C and FIG. 36D, the identifier "TLV" is employed to generically denote tape linear velocity, which can be obtained either from capstan speed sensor 154 (on line 186) or from the actual linear velocity of tape 32 (from converter 133-6).

Thus, the adjustment value represented by line 133-3, which is dependent on the amount of user data in buffer memory 116 relative to the buffer level normalization value, is used to determine a desired linear velocity for tape 32. In other embodiments of tape speed controller 133, described for example in FIG. 36B, FIG. 36C, and FIG. 36D, other factors are utilized in addition to the user data level in buffer 116 to determine desired tape linear velocity.

If, in a read mode, the level of user data in buffer memory 116 (indicated by line 133-6 in FIG. 36A) falls below the buffer normalization value (represented by line 133-8), the rate of user data acquisition from tape 32 is falling behind the data requirements of the host. In such case, the buffer level differential value 133-9 has a negative value and a magnitude equal to the difference of values 133-6 and 133-8. Read gain multiplier 133-11 scales and inverts the buffer level differential value 133-9 to provide the buffer level-dependent adjustment value 133-3. The adjustment value 133-3 is a positive value, which serves to increase the desired linear velocity of tape 32. An increase in the linear velocity of tape 32 causes faster reading of user data from tape 32, thereby allowing more filling of buffer memory 116. Operation continues in this manner until the buffer fill level reaches the desired buffer normalization value.

If, in the read mode, the level of user data in buffer memory 116 (indicated by line 133-6 in FIG. 36A) rises above the buffer normalization value (represented by line 133-8), the rate of user data acquisition from tape 32 exceeds the data requirements of the host. In such case, the buffer level differential value 133-9 has a positive value and a magnitude equal to the difference of values 133-6 and 133-8. Read gain multiplier 133-11 scales and inverts the buffer level differential value 133-9 to provide the buffer level-dependent adjustment value 133-3. The adjustment value 133-3 is then a negative value, which serves to decrease the desired linear velocity of tape 32. A decrease in the linear velocity of tape 32 causes slowing of the reading of user data from tape, thereby allowing more emptying of buffer memory 116. Operation continues in this manner until the buffer fill level reaches the desired buffer normalization value.

If, in a write mode, the level of user data in buffer memory 116 (indicated by line 133-6 in FIG. 36A) falls below the buffer normalization value (represented by line 133-8), the device is writing user data to tape 32 at a rate faster than user data is being acquired from the host. In such case, the buffer level differential value 133-9 has a negative value and a magnitude equal to the difference of values 133-6 and 133-8. Write gain multiplier 133-10 scales the buffer level differential value 133-9 to provide the buffer level-dependent adjustment value 133-3. The adjustment value 133-3 is a negative value, which serves to decrease the desired linear velocity of tape 32. A decrease in the linear velocity of tape 32 causes writing of user data to slow down, so that the amount of user data in buffer memory 116 can increase. Operation continues in this manner until the buffer fill level reaches the desired buffer normalization value.

If, the write mode, the level of user data in buffer memory 116 (indicated by line 133-6 in FIG. 36A) rises above the buffer normalization value (represented by line 133-8), the rate of writing to tape 32 is falling behind the rate of acquisition of use data from the host. In such case, the buffer level differential value 133-9 has a positive value and a magnitude equal to the difference of values 133-6 and 133-8. Write gain multiplier 133-10 scales the buffer level differential value 133-9 to provide the buffer level-dependent adjustment value 133-3. The adjustment value 133-3 is then a positive value, which serves to increase the desired linear velocity of tape 32. An increase in the linear velocity of tape 32 causes the writing of data at a faster rate, thereby lowering the buffer fill level. Operation continues in this manner until the buffer fill level reaches the desired buffer normalization value.

Figure 36C:
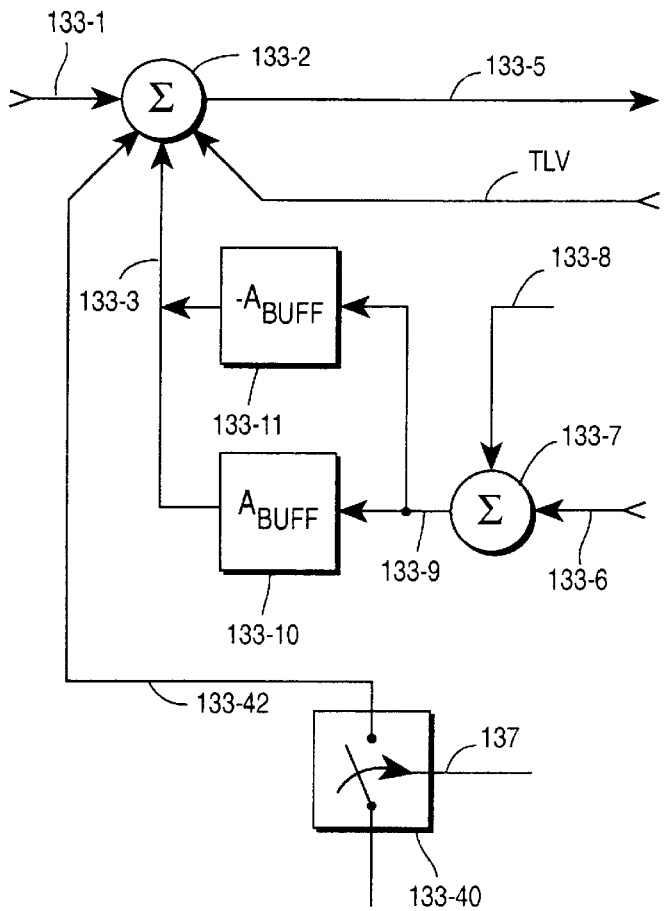
Figure 36D:
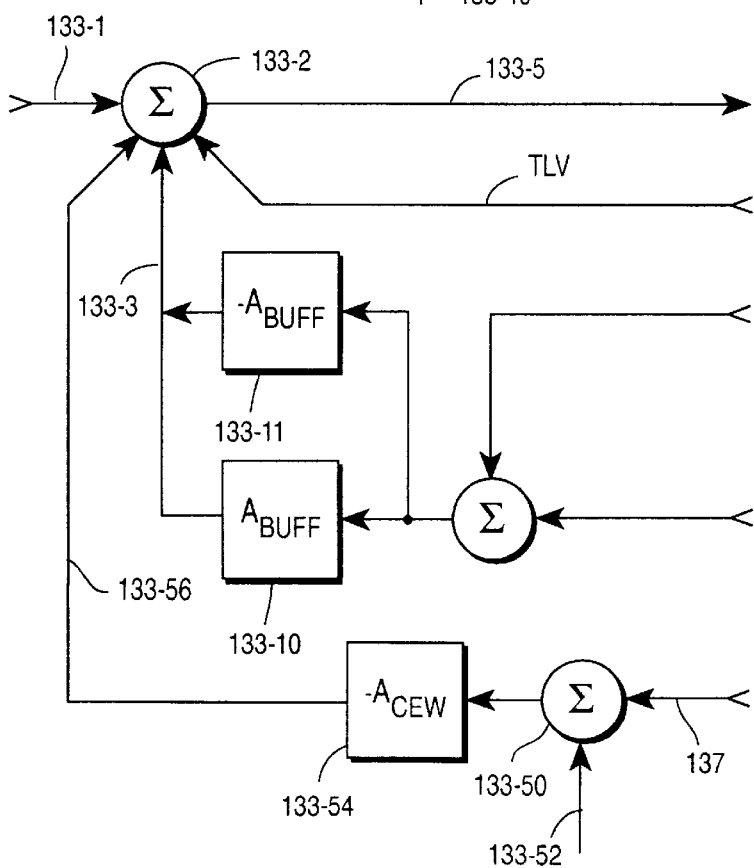
Figure 36E:
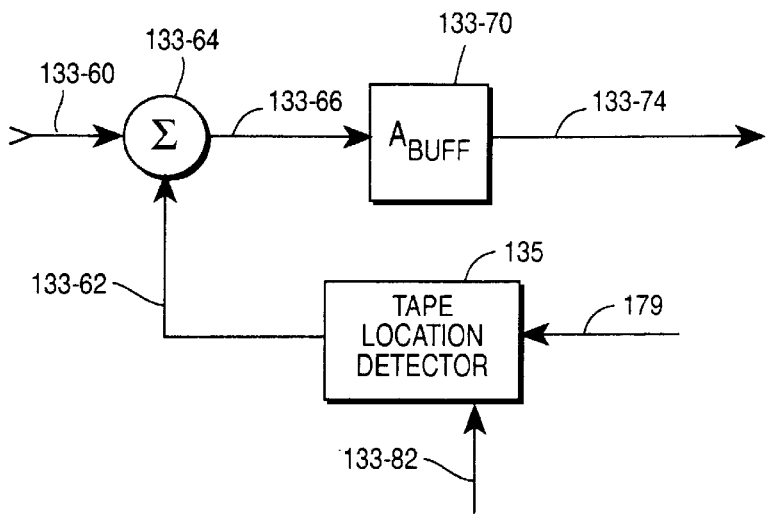

FIG. 36E shows another embodiment of tape speed controller 133 wherein an input desired initial value or target position (represented by line 133-60) is in units of buffer location. In the FIG. 36E embodiment, user data locations in buffer memory 116 correspond directly to original locations (e.g., non-re-write locations) on tape 32. Buffer memory 116 is conceptualized has having incrementally moving windows of user data which correspond to physical positions on tape, e.g., hard sectored frames having positions delimited and addresses decodable from the servo clock signal $TS_c$. Therefore, in FIG. 36E, a normalization (i.e., "target") position within buffer 116 has a corresponding target position on tape. As data is transferred to and from buffer memory 116, the target position moves incrementally along tape 32. FIG. 36E shows an actual tape position value (represented by line 133-62) being subtracted at adder 133-64 from the target position value (line 133-60) to yield a position error value (represented by line 133-66). The position error value is applied to a buffer compensation function 133-70 which outputs a control signal which can be, for example, a pulse width modulated control signal. The control signal from buffer compensation function 133-70 is applied on line 133-74 to capstan motor driver 156, thereby endeavoring to obtain a desired tape position on tape 32.

The actual tape position value (represented by line 133-62) is output from tape location detector 135 and can be obtained in a number of ways. In a first way, formatter/deformatter 118 provides an indication on line 133-82 of a physical frame number which has been retrieved from a frame actually read on tape 32. In a second way, tape location detector 135 keeps tracks of the interrupts provided on line 179 and uses such tracking to determine physical longitudinal location on tape 32. For example, detector 135 can count off cycles of the servo signal TS on tape, and thereby count off frames on tape 32 upon receiving, in the illustrated embodiment, thirty six interrupts on line 179 for each frame on tape. Detector 135 can keep track of such count from the beginning of tape (knowing when to begin such frame counting at the beginning of user data on tape in view of the differing modulation schemes of buried servo signal $TS_c$ for user data and non-user information [e.g., start of track marker]). Further, when reading begins in mid-tape, the encoding of the buried servo signal $TS_c$ as described in §7.6.1 can be utilized to obtain an indication of horizontal position relative to beginning of tape, and the counting of interrupts on line 179 indexed relative to that horizontal position.

The foregoing describes how the buffer fill level (FIG. 36A, FIG. 36B) or tape position (FIG. 36E) is used to set the desired tape linear velocity. The present invention uses the actual linear velocity of tape 32, rather than the above-described desired linear velocity of tape 32, to control rates of reading and recording data to tape 32. As described below, variable clock controller 134 of processor 130, voltage control oscillator 160, servo clock recovery circuit 174, and clock modulation detector 180 are all involved in ensuring that the rates of reading and recording data are dependent upon the actual linear velocity of tape 32.

As indicated previously, servo clock recovery circuit 174 recovers the buried servo clock signal $TS_c$ from at least one physical track of the logical track. Servo clock recovery circuit 174 generates an interrupt on line 179 at the beginning of each clock cycle (e.g., at each positive-going zero crossing transition of servo clock signal $TS_c$ [see FIG. 13]). The interrupt on line 179 is indicative of a beginning of new cycle of servo clock signal $TS_c$ and is applied on line 179 to variable clock controller 134. Servo clock recovery circuit 174 also applies the recovered servo clock signal $TS_c$ to clock modulation detector 180 (see FIG. 2).

Figure 37:
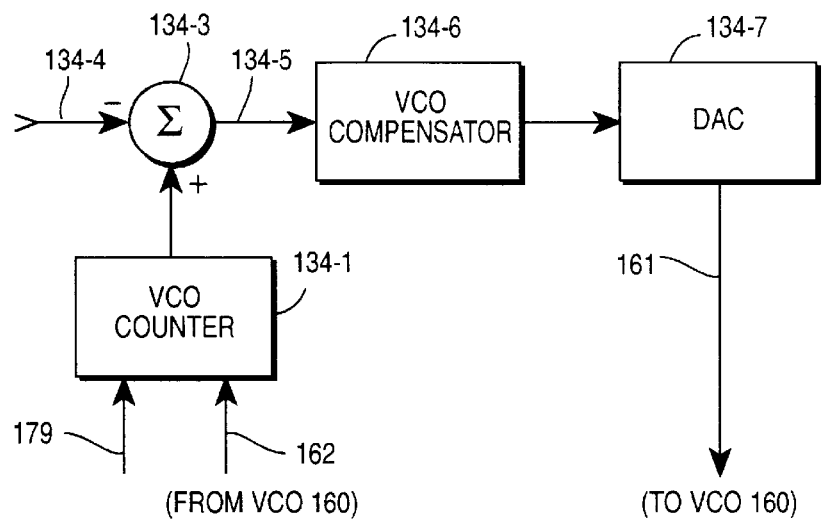
FIG. 37 is a schematic view of a variable clock controller according to a first embodiment of the invention.

Functions of a first embodiment of variable clock controller 134 are shown in FIG. 37. Variable clock controller 134 receives both the interrupt on line 179 indicative of beginning of each new cycle of servo clock signal $TS_c$ and the output (feedback) signal of VCO 160 on line 162. Variable clock controller 134 comprises a counter 134-1 which counts pulses output from VCO 160 and received on line 162. Counter 134-1 is clock-enabled by the interrupt on line 179. At the end of each cycle of servo clock signal $TS_c$, counter 134-1 outputs a VCO actual count value (represented by line 134-2) to an adder 134-3. Adder 134-3 also receives a desired VCO count value as represented by input line 134-4. In the illustrated embodiment, the initial VCO count value is 1425. In timed relation with the end of each cycle of servo clock signal $TS_c$, adder 134-3 outputs an error value (represented by line 134-5) to VCO compensator 134-6. In one embodiment, VCO compensator 134-6 is a proportional integral compensator which multiplies the error value on line 134-5 by a compensation value which is a function of the error and, if desired, past errors. A compensated control signal output from VCO compensator 134-6 is applied to a digital to analog converter (DAC) 134-7. The analog output signal from converter 134-7, also known as the VCO voltage drive signal, is applied on line 161 to VCO 160.

Thus, in the embodiment of FIG. 37, variable clock controller 134 endeavors to drive VCO 160 so that VCO outputs 1425 counts or pulses during each cycle of servo clock signal $TS_c$.

Figure 37A:
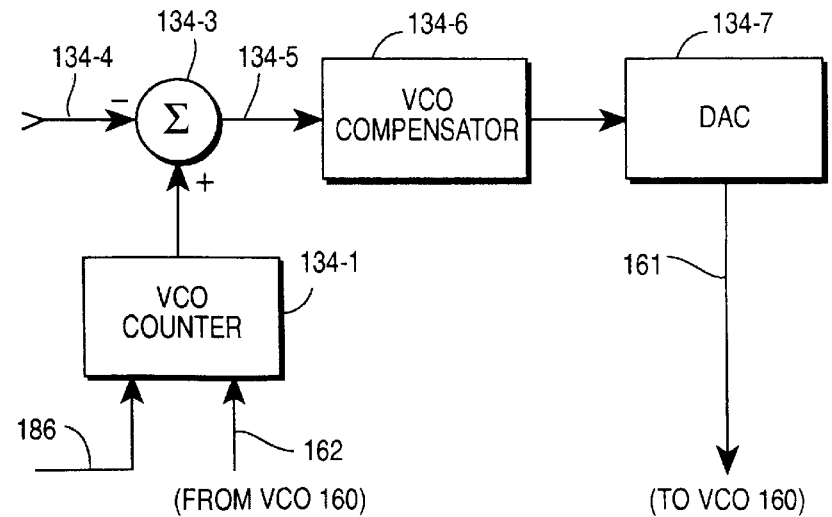
FIG. 37A is a schematic view of a variable clock controller according to a second embodiment of the invention.

In a second embodiment of variable clock controller 134 shown in FIG. 37A, VCO counter 134-1 receives the capstan speed sensor feedback value applied on line 186 instead of the interrupt on line 179. Thus, in the embodiment of FIG. 37A counter 134-1 counts pulses output from VCO 160 and received on line 162 between tach pulses of the capstan received on line 186. In the embodiment of FIG. 37A, compensation or adjustment is made so that the VCO pulses are properly calibrated relative to the tach signals from capstan speed sensor 154. Thus, in contrast to the embodiment of FIG. 37, in the embodiment of FIG. 37A variable clock controller 134 endeavors to drive VCO 160 so that VCO outputs a predetermined number of pulses between tach counts of capstan motor 150 (see FIG. 2).

In a third embodiment, VCO counter 134-1 of variable clock controller 134 is programmably or otherwise controlled to select between either of line 179 or line 186 as its clocking input. In such embodiment, selection is also make of proper calibration or compensation values.

VCO 160 oscillates at the rate determined by variable clock controller 134 (in the manner described above) in accordance with the VCO voltage drive signal on line 161. The oscillation rate of VCO 160, in a read mode, e.g., initiates and drives a digital sampling process of data for constituting a read clock. The signal from oscillator 160 enables the response of the digital read filters to scale with the actual data rate, thereby adding robustness to the detection process. In a write mode, the oscillations of oscillator 160 become the actual clock rate for recording. In this regard, clock pulses outputted from VCO 160 are applied to each of the recovery circuits 174, 176, and 178, as well as to write driver 164. Recovery circuits 174, 176, and 178 thus use the actual tape speed-dependent clock signal outputted by VCO to time the recovery of the servo signal TS and user data. Similarly, write circuit 164 uses the clock signal outputted by VCO 160 to time the recording of information to tape 32.

Thus, the present invention makes the data transfer rate in read channel 172 and write channel 164 dependent upon the linear velocity of tape 32. In the embodiment of FIG. 37A, the linear velocity is the desired linear velocity of tape 32 as determined from capstan motor 150. In the embodiment of FIG. 37, on the other hand, the linear velocity of tape 32 upon which the data transfer rate is dependent is the actual tape linear velocity as assessed from the buried servo signal. Thus, in the embodiment of FIG. 37, the present invention takes into account tape speed transients introduced e.g., by cartridge 30. With the read and write clock of the present invention being directly dependent upon linear velocity of tape 32, data is more accurately recovered from tape 32. Moreover, data is more uniformly recorded and accurately positioned on tape 32, thereby resulting in better signal recovery and more economical utilization of tape 32.

The embodiment of FIG. 36B differs from those described above in that tape speed controller 130 further includes a buffer level normalization value adjuster 133-30 for dynamically changing the buffer level normalization value (indicated as 133-8). Adjuster 133-30 receives an initial buffer level normalization value as an input represented by line 133-31. Adjuster 133-30 also has access to buffer manager 131 (as indicated by line 133-32) in order to obtain performance and historical information e.g., regarding levels of user data in buffer memory 116. In one mode, adjuster 133-30 uses the information obtained from buffer manager 131 to perform statistical analyses regarding the levels of user data in buffer memory 116 (e.g., histogram, average, standard deviation, skew, etc.). In the same or another modes, adjuster 133-30 applies an asymmetric distribution function to indicate an advantage to change the buffer normalization value. For example, adjuster 133-30 can determine that short bursts of fast reading interspersed with longer periods of slow reading can be served by keeping the buffer mostly full, and vice versa. Such distributions have a large first moment metric (e.g., skew). In another mode, adjuster 133-30 applies a predictive algorithm (e.g., Levinson-Shurr) to estimate future values of sequenced based on dynamic regression of past samples. The predictive algorithm is applied to sequence host data rates sampled at regular intervals, and to adjust the drive data rate according to a value predicted for the host.

It should be understood that variations of the foregoing are envisioned and provided in alternate embodiments. For example, in another embodiment, both counter 134-1 and DAC 134-7 are provided in ASICS which are external to variable clock controller 134.

7.4 End of Track/Corner Early Warning

As indicated previously, frames 220 of data can be recorded on tape 32 by a device, such as random access device 46 or sequential access device 48, upon instigation of recording by a host computer connected to the device (see FIG. 1). As frames are recorded on tape 32 (see, for example, steps 34-6 and 35-6 of FIG. 34 and FIG. 35, respectively), a corner early warning (CEW) marker is generated by tape/volume manager 136 and included in the AUX data structure 300 of each frame (see Table 1), and particularly in the partition control field (see Table 11 and §4.1.10). The CEW indicates, upon recording, that the write head is approaching a boundary position on the tape at which the write head must change tracks in order to continue recording frames. As used herein in connection with CEW, "boundary position" means either a vertical boundary of a partition or an end of a track but not the end of data.

The tape/volume manager 136 is able to generate the CEW for inclusion in AUX data structure 300 in view of manager 136's foreknowledge of the format of tape 32 including partitioning of tape 32.

According to one recording mode of the invention, when the CEW value changes from a normal value to a warning value, an indication is provided that head unit 100 is a predetermined number of frames from a boundary position. In an embellishment of this mode, illustrated in FIG. 36C, tape/volume manager 136 applies a value (represented by line 137) indicative of whether the CEW value is the normal value or the warning value to tape speed controller 133. The embodiment of the to tape speed controller 133 shown in FIG. 36C differs from that of FIG. 36A by including a switch which remains open so long as the value applied on line 137 is the normal CEW value. However, if tape/volume manager 135 assigns a warning value to the CEW field of an AUX structure 300 of a frame 220 which is about-to-be-recorded, the value on line 137 changes to indicate that the warning value is being generated. The value on line 137 indicative of a warning value causes switch 133-40 to close. Closure of switch 133-40 causes a predetermined CEW adjustment value to be applied (as reflected by line 133-42) to adder 133-2. Application of the CEW adjustment value to adder 133-2 serves to increase the desired tape linear speed. The increase of speed of tape 32 is appropriate, in view of the fact that it such an increase tends to lower the level of user data in buffer memory 116. The lowered level of user data in buffer memory 116 is beneficial since head unit 100 will soon engage in a track corner turning exercise. During the track corner turning exercise, no user data will be taken out of buffer memory 116 but user data from the host will continue to be introduced into buffer memory 116. Therefore, the lowering, in advance of the track corner turn, of the level of user data in buffer memory 116 serves as a helpful caching technique that avoids excessive filling of buffer memory 116. Advantageously, this caching technique means that the invention does not require large size buffers as do prior art drives that must have extra buffer space to accumulate user data from the host during a track corner turn.

The embodiment of FIG. 36C also provides a caching function in an read mode. Upon reading tape 32, when tape/volume manager 136 has determined that the CEW of the AUX data structure has changed from a normal value to a warning value, the value represented by line 137 changes to close switch 133-40. The predetermined CEW adjustment value thereby applied (as reflected by line 133-42) to adder 133-2 serves to increase desired tape linear speed as in the write mode. Also in the read mode the increase of speed of tape 32 is appropriate. In this regard, the increase in tape speed causes a faster reading of user data from tape 32, which in turn tends to raise the level of user data in buffer memory 116. The raised level of user data in buffer memory 116 is beneficial since head unit 100 will soon engage in a track corner turning exercise. During the track corner turning exercise, no additional user data will be loaded into buffer memory 116, but the host will nevertheless expect the same rate of requirement of user data from buffer memory 116. Therefore, the raising, in advance of the track corner turn, of the level of user data in buffer memory 116 serves also as a helpful caching technique that avoids depletion of buffer memory 116 during a track corner turning event.

According to another embodiment of the invention, in recording, the CEW has a value related to a number of frames that can yet be recorded on the track before the boundary position is encountered. As explained previously, in this embodiment the CEW serves as a count-down counter indicating that EOPT or BOPT is approaching in the logically forward direction. The value of CEW is a predetermined constant (a hexidecimal value of 255) if the number of frames that can yet be recorded on the track before the boundary position is encountered exceeds 254. Within 254 frames of the boundary position, the CEW indicates the number of frames to the boundary position.

The embodiment of the invention wherein the CEW function as a down counter employs the embodiment of tape speed controller 133 shown in FIG. 36D. The tape speed controller 133 of FIG. 36D differs from that of FIG. 36A in having line 137 connected to a first input of adder 133-50. In this embodiment, line 137 carries the CEW value obtained from AUX data structure 300. A second input of adder 133-50 is a negation of the predetermined constant (hexidecimal value of −255). The sum produced by adder 133-50 is applied to a gain multiplier 133-54, which has a negative factor (represented as $-A_{CEW}$) for converting the CEW frame number units to tape speed units (e.g,. inches per second, for example). The value obtained from gain multiplier 133-54 is applied as a CEW adjustment value on line 133-56 to adder 133-2.

The embodiment which uses the CEW as a down counter and the tape speed controller of FIG. 36D differs from the embodiment of FIG. 36C in that, in the embodiment of FIG. 36D, the CEW adjustment value applied to adder 133-2 dynamically changes as the CEW value counts down.

In yet another embodiment, upon encountering a CEW warning marker the tape/volume manager 136 sends a CEW notification signal to notify the host that the host should control its data transmission to the drive in view of the occurrence of the CEW early warning marker. Tape/volume manager 136 sends the such a CEW notification signal to the host via control processor 130 in which it is included and through interface 110 (see FIG. 2).

In a reading mode, read elements 104 of head unit 100 read frames on a horizontal logical track as head unit 100 travels in the logical forward direction. As frames are read in to buffer memory 116, tape/volume manager 136 picks out the CEW value from AUX data structure 300 of each frame. The CEW thus serves to apprise the device of the partition geometry, with the result that during reading the device need have no prior knowledge of the partition geometry. Not requiring prior knowledge of the partition geometry simplifies the read procedure by reducing memory requirements and code instructions.

7.5 Re-recording of Frames in the Random Access Model

Read-While-Write verification for random access device 46 (see FIG. 1) can be implemented in either of two modes. In a host-responsible rewrite mode (described e.g., in §7.5.1), the host determines suitable rewrite criteria and rewrite locations on the tape for frames which are not readable or which were incorrectly read during read-while-write verification. In a device-responsible rewrite mode (described e.g., in §7.5.2), the device determines locations on the hard sectored tape 32 for a re-recording of such a frame.

7.5.1 Host-responsible Rewrite Mode

In the host-responsible rewrite mode, assuming that the device contains a RWW architecture, a verify failure is reported to the host as a write failure. It is up to the host to determine suitable rewrite criteria and locations. It is also up to the host to observe and update the Defect Map 346. The Random Access device does not perform automated rewrites of user data, it neither spares frames for rewrites nor sequentially rewrite frames in the event of a RWW verify failure. All responsibility for rewriting user data lies with the host.

7.5.2 Device-responsible Rewrite Mode

In a device-responsible rewrite mode, frames which cannot be read during read-while-writing (RWW) or which are incorrectly read during RWW are collectively known as defective frames and are re-recorded at reserved location(s) on tape 32. As used herein in the context of read-while-writing, re-recording of frames, or reading of frames which have been re-recorded, a "reserved location" is a portion of tape 32 in which frames cannot be originally recorded, e.g., recorded for the first time.

In one submode of the invention discussed in more detail in §7.5.2.1, a reserved location comprises a physical frame which shares a same track with the original physical frame location at which a frame is recorded. In this submode, reserved locations are interspersed among original physical frames at predetermined locations on the same track. For multi-track or multi-channel frames, the reserved locations are interspersed among original physical frames at predetermined locations on the same logical track.

In another submode of the invention discussed in more detail in §7.5.2.2, a reserved location is on another track of the tape which is not employed for the original physical frame location. In this submode, the reserved location is preferably on a special track, or in the context of the format of FIG. 4 and FIG. 5, a special logical track.

In the device-responsible rewrite mode, the defect map frame 346 (See FIG. 19 and Table 22) has defect entries as shown in Table 23. The defect entries of Table 23 have two fields, each of four bytes —a first field for storing the physical frame number of a defective frame; a second field for storing the physical frame number (in the reserved location) whereat the frame is re-recorded.

It should be understood that the re-recording of frames at reserved locations as described herein is not limited to the format of FIG. 4 and FIG. 5 wherein eight channels or tracks are employed to form a logical track or frame, but can also apply to devices having fewer (e.g., one) or more channels utilized per frame.

7.5.2.1 Interspersed Same-Track Reserved Locations for RWW

Figure 38:
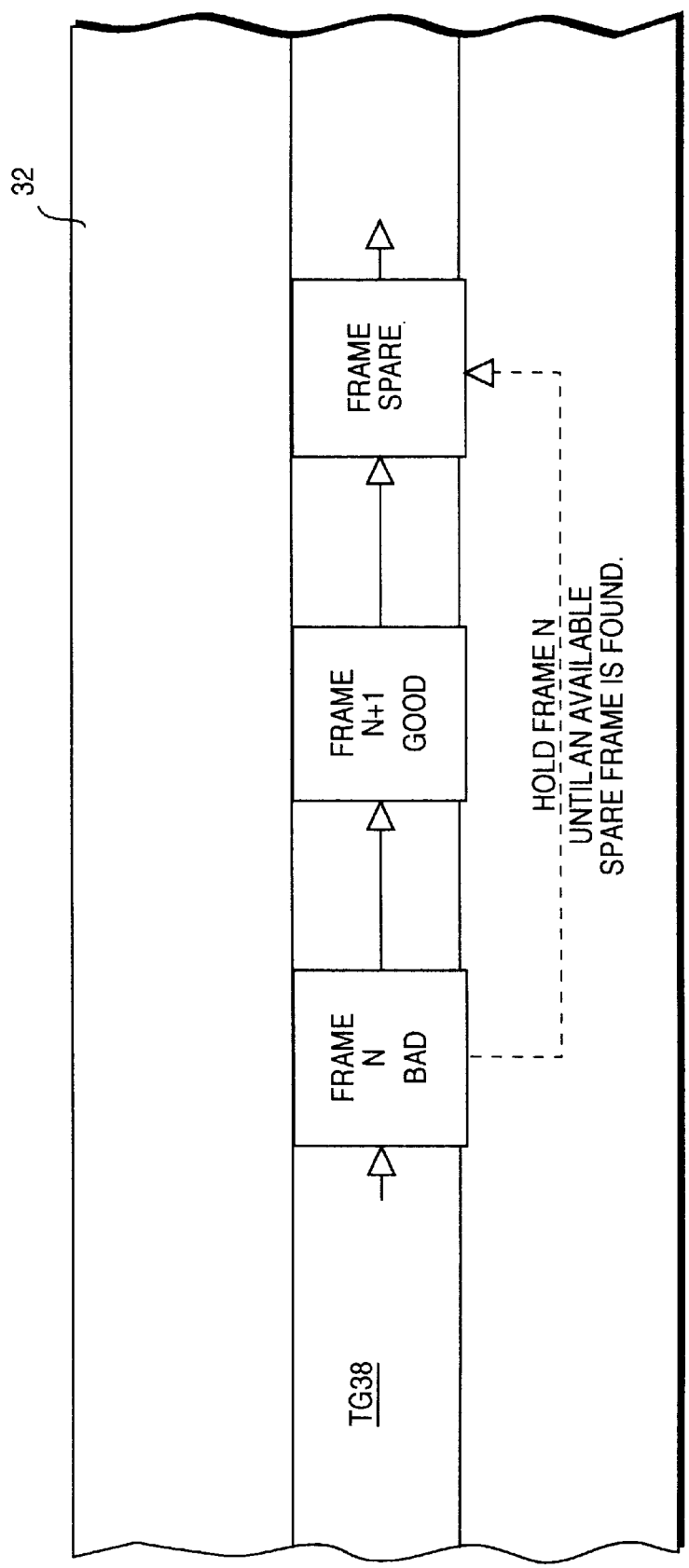
FIG. 38 is a schematic view of a tape in accordance with a submode of the invention wherein frames are re-recorded at a reserved location, the reserved location comprising a physical frame which shares a same track with the original physical frame location at which a frame is recorded.

FIG. 38 shows a submode of the invention wherein frames are re-recorded at a reserved location, the reserved location comprising a physical frame which shares a same track with the original physical frame location at which a frame is recorded. In FIG. 38, the reserved location is labeled "Frame Spare". The reserved location "Frame Spare" is shown as residing in the same horizontal logical track TG31 as Frame N (Frame N being the original physical location in which a defective frame was first recorded). It should be understood that, in FIG. 38 as well as in FIG. 39 and FIG. 40A subsequently discussed, that frames are consecutively spaced on the tracks and that the logical symbols shown, e.g., between frames, are provided only for facilitating illustration of head movement.

In the technique of FIG. 38, reserved locations (e.g., reserved physical frame locations) are allocated periodically on each track. In embodiments of multi-channel frames, the reserved locations (e.g., reserved physical frame locations) are allocated horizontally, and preferably periodically, on each logical track. The number of allocated reserved locations and the frequency of reserved locations per track or logical track is a trade off between tape capacity loss and performance. For example, if 10% of the capacity of a track or logical track is allocated for reserved locations, then nine frames are available for user's data and the tenth frame is available for sparing. If a defective frame is detected during a write operation, then the frame is held in the drive's buffer memory 116 (see FIG. 1) until a free spare frame, e.g, a free reserved location, is found, as shown in FIG. 38.

For the ensuing discussion, a "target" frame is a frame that is recorded to tape (either initially recorded or read and edited for recording at the same place, e.g., the original location). When the target frame is determined to be defective in a recording or editing mode, the steps of FIG. 38A are implemented.

At step 38A-1, the defect map frame 346 (see FIG. 19) is consulted to determine an available spare frame, preferably the nearest in an appropriate direction, in the reserved location for rewriting of the target frame. In this regard, the known physical frame location of the target frame is compared with the values stored in defect map frame 346. Then, as shown by step 38A-2, the contents of the target frame are retained in buffer memory 116 while further frames are recorded in succeeding physical frame locations on the same track until the head unit reaches the physical frame location corresponding to the nearest spare physical frame location that was determined from the defect map frame 346. At step 38A-3, the contents of the target frame are re-recorded at the frame spare on the same track, i.e., at the spare physical frame location that was determined from the defect map frame 346. Then, as shown by step 38A-4, the defect map frame 325 is updated. In particular, at step 38A-4, an entry in Table 23 is made for the defective frame, the first four bytes of the entry being the physical frame number of the defective frame and the second four bytes of the entry being the physical frame number at which the frame contents were re-recorded. Thus, the updated defect map frame 346 both indicates that the target frame's original area on tape is bad, and provides a pointer designating a new location for the target frame.

Figure 38A:
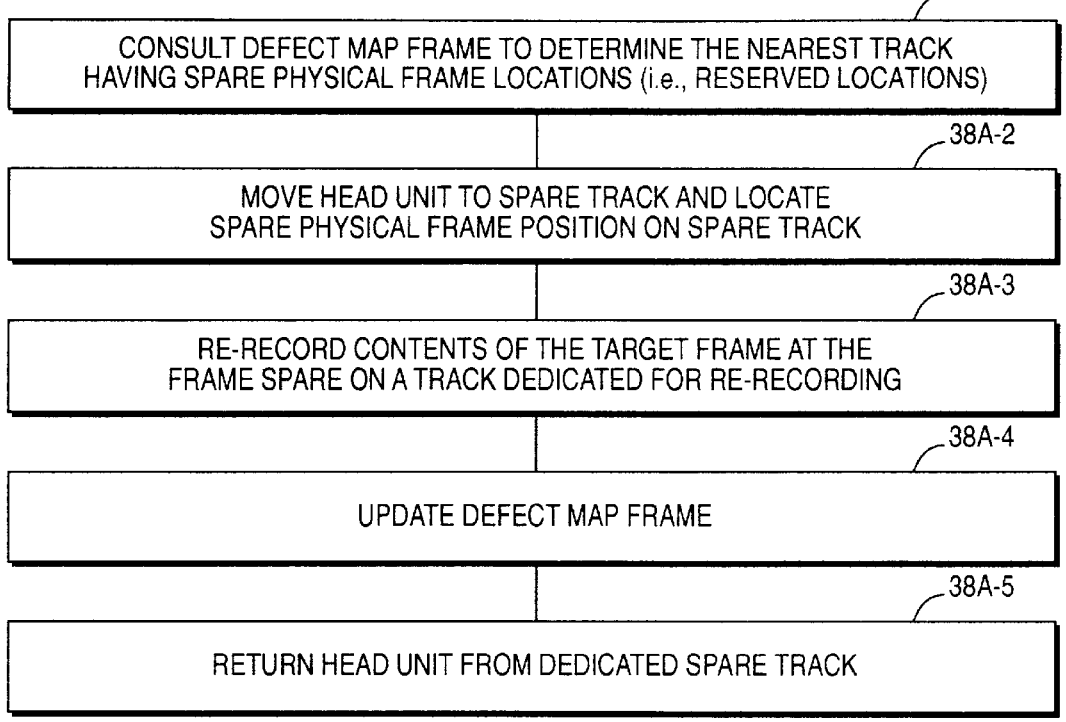
FIG. 38A is a flowchart showing steps involved in a re-recording procedure for frame according to the submode of FIG. 38.
Figure 38B:
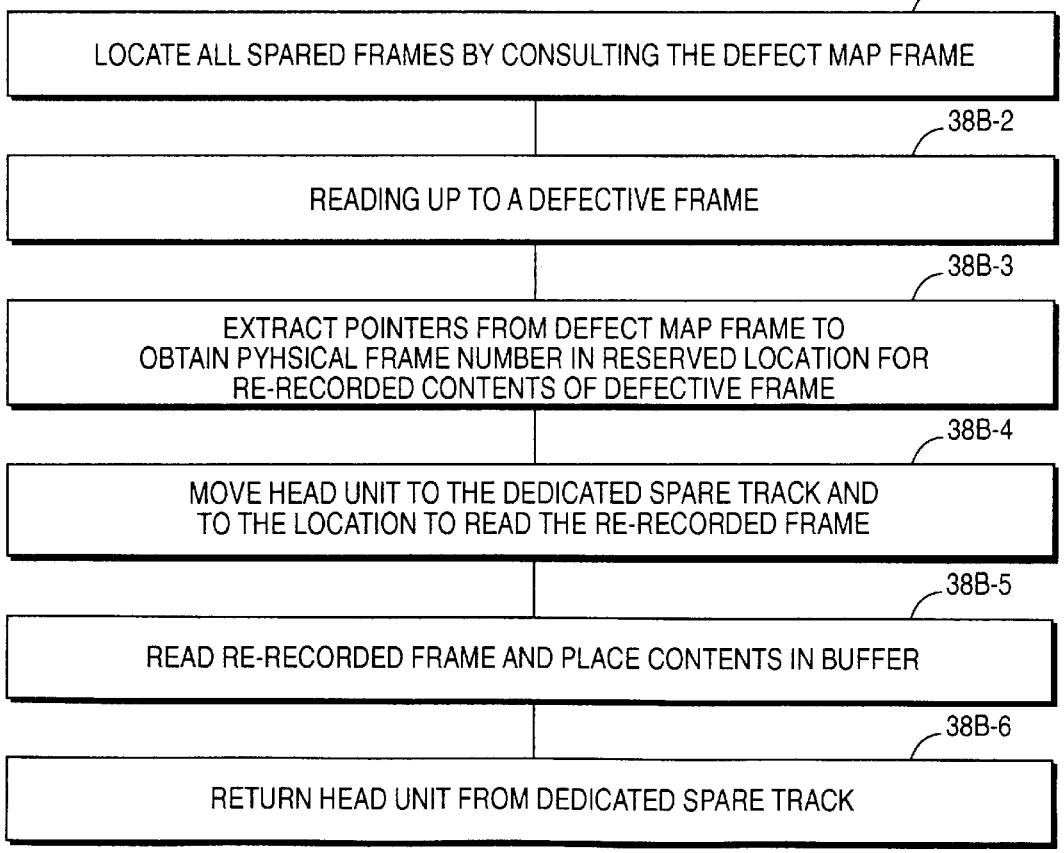
FIG. 38B is a flowchart showing steps involved in a read procedure for reconstructing a file containing a spared frame according to the submode of FIG. 38.

The procedure for reconstructing data containing a spared frame in a read operation according to the submode of FIG. 38 is shown in FIG. 38B. At step 38B-1, the drive locates all spared frames by consulting defect map frame 346. Step 38B-2 shows the device reading up to a defective frame. At step 38B-3, pointers are extracted from defect map frame 346 in order to obtain the new location of the spared frame, i.e., the physical frame number which is the reserved location whereat the contents of the defective frame are re-recorded. Step 38B-4 shows the head unit continuing to read forward on the same track, placing in buffer memory 116 the data obtained from ensuing frames, until the spared frame is encountered and its contents read and placed into buffer memory 116. A buffer control presents the contents of the frames stored in buffer memory 116 in proper order to the host.

The submode of FIG. 38, with the recording steps shown in FIG. 38A and the reading steps shown in FIG. 38B, has the advantage of maximizing data throughput only when a defective frame is encountered. If no defective frames are encountered, the submode of FIG. 38 has the disadvantage of decreasing the device's sustain rate by the allotted spare frame percentage. The periodicity and/or spacing of spare frames on a track is determined e.g., by the size of buffer memory 116 dedicated to user data throughput and error rate.

7.5.2.2 Special Track(s) As Reserved Locations for RWW

Figure 39:
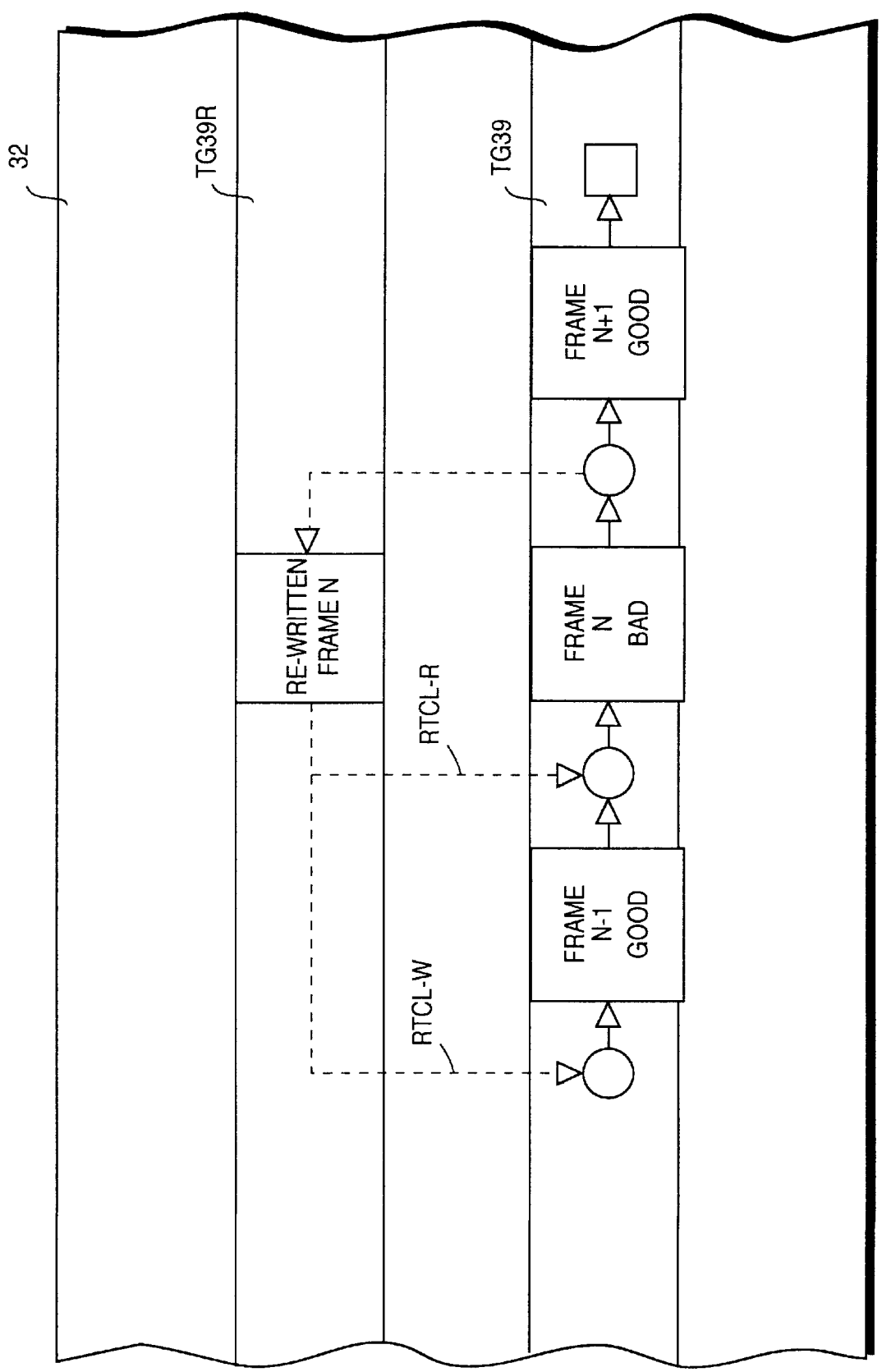
FIG. 39 is a schematic view of a tape in accordance with a submode of the invention wherein frames are re-recorded at a reserved location, the reserved location comprising a physical frame which is on a different track than the track on which the defective frame is originally recorded.

FIG. 39 shows a submode of the invention wherein frames are re-recorded at a reserved location, the reserved location comprising a physical frame which is on a different track than the track on which the defective frame is originally recorded. For a multi-channel frame shown in FIG. 39, the reserved location is labeled "Re-written Frame N". The reserved location "Re-written Frame N" is shown as residing in a different horizontal logical track TG39R than the horizontal logical track TG39 in which frame N was initially but defectively recorded.

In the FIG. 39 embodiment, head unit 100 must change tracks from track group TG39 to track group TG39R, and then travel in the reverse direction while re-recording Frame N. After re-recording frame N, head unit 100 returns to track group TG39, thereby completing a re-record track change loop indicated by broken line RTCL-W in FIG. 39.

The re-record track change loop indicated by broken line RTCL-W in FIG. 39 shows that head unit 100 must continue in the reverse direction on track TG39R at least far enough so that, upon changing tracks back to track TG39, frame N−1 can be read. The purpose in reading frame N−1 is in order to obtain sufficient synchronizing information (e.g., physical frame number of frame N−1 ) so that head unit 100 will know where to record frame N+1 relative to the hard sectored frames of tape 32. On the other hand, when tape 32 is being being read and frame N is detected as being defective, head unit 100 travels the re-record track change loop indicated by broken line RTCL-R in FIG. 39.

Figure 40:
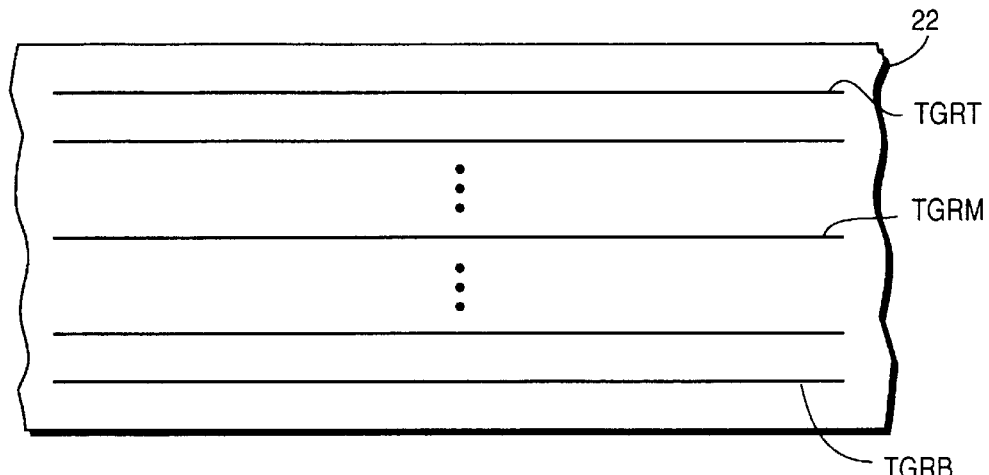
FIG. 40 is a schematic view showing a plurality of spare track groups or frames recorded on tape in accordance with the submode of FIG. 32.

There may be more than one track or logical track which can potentially serve as a reserved location. FIG. 40 shows tape 32 having a plurality of logical tracks TGRT, TGRM, and TGRB serving as reserved locations for the re-recording of frames. Logical track TGRT is preferably near the top horizontal of tape 32; logical track TGRM is preferably near the vertical middle of tape 32; and logical track TGRB is preferably near the bottom horizontal edge of tape 32. Thus, logical tracks TGRT, TGRM, and TGRB are at predetermined vertical positions of tape 32.

In the embodiment of FIG. 39, of the plurality of logical tracks serving as reserved locations, it is preferable to have some of the logical tracks being those written in a forward direction of tape movement and others of the logical tracks written in a reverse direction of tape movement. For example, for the logical tracks TGRT, TGRM, and TGRB shown in FIG. 40, there could be two logical tracks at the top, one being a forward direction logical track and the other being a reverse direction logical track; two logical tracks at the middle, one being a forward direction logical track and the other being a reverse direction logical track; and so forth.

Figure 40A:
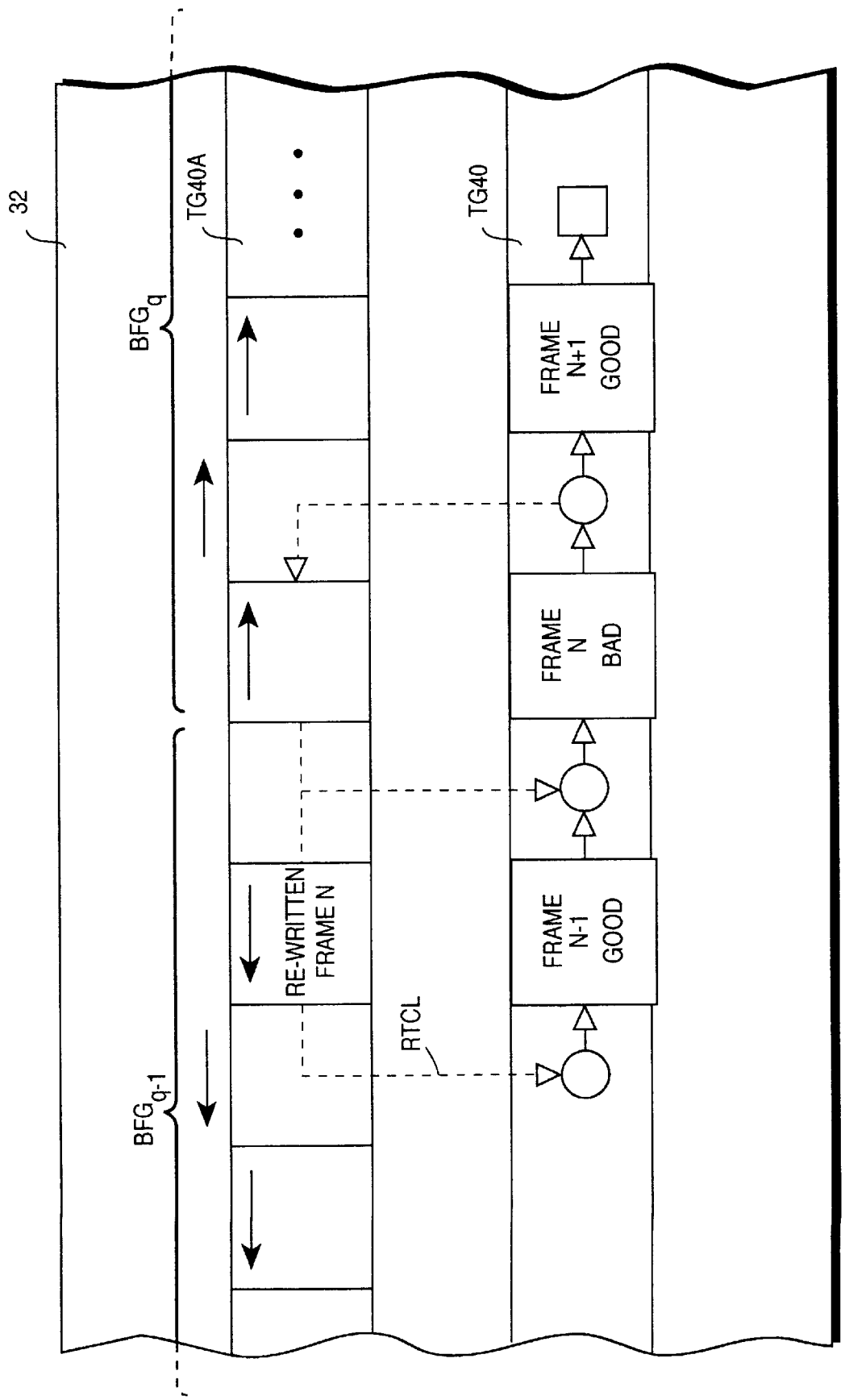
FIG. 40A is a schematic view showing a bidirectional spare track in accordance with the submode of FIG. 39.

FIG. 40A shows an embodiment in which served track TG40A is a bidirectional track. Track TG39A is segmented into directional frame groups. For example, bidirectional frame group BFGq is a forward direction frame group into which re-recorded frames can only be recorded when tape 32 is transported in a forward direction. Bidirectional frame group BFGq-1, on the other hand, is a reverse direction frame group into which re-recorded frames can only be recorded when tape 32 is transported in a reverse direction.

The operation for FIG. 40A differs from that of FIG. 39 in that, upon track change, the write head may find itself in a directional frame group having a direction opposite than that necessary for performing a re-record track change loop RTCL. For example, upon changing track after a first (defective) recording of Frame N on track TG40, head unit 100 finds itself in forward direction frame group BFGq on track TG40A. Head unit 100 must then travel in the reverse direction for a sufficient distance to an available hard-sectored frame which can be recorded in the reverse direction, as shown in FIG. 40A. Upon re-recording of Frame N as shown in FIG. 40A, head unit 100 can change tracks back to track TG40. On track TG40 head unit 100 continues to travel in the forward direction looking for the first available frame in which the next frame from the buffer can be recorded.

Thus, the re-record track change loop RTCL is potentially larger in the embodiment of FIG. 40A than that of FIG. 39. The greater loop size results from the fact that head unit 100 may have to move a further distance along the reserved track in order not only to reach a vacant frame space, but also a frame space of appropriate directionality.

The embodiment of FIG. 40A, although having potential larger re-record track change loops, shows an advantage in that only one reserved track (e.g., logical track) need be provided on tape 32. In contrast to FIG. 40 wherein a plurality of tracks are utilized for re-recording and for having reserved locations, the single bidirectional reserved track of FIG. 40A advantageously reduces the tape space requirements for re-recording of defective frames.

It should be understood that, in the embodiments of FIG. 39 and FIG. 40A, for example, that the tracks having reserved locations need not necessarily be solely dedicated to reserved frame locations. For example, only a portion of such a track may be allocated for reserved locations, while another portion may be utilized for original recording of frames. The allocations of such tracks, whether solely devoted or partially devoted to reserved locations, is discernible from the defect map 346 (see FIG. 19). For example, in connection with the embodiment of FIG. 40A, head unit 100 is moved an appropriate distance in the reverse direction for the re-recording of Frame N in accordance with foreknowledge of track FG40A afforded, e.g., by defect map 346.

Figure 39A:
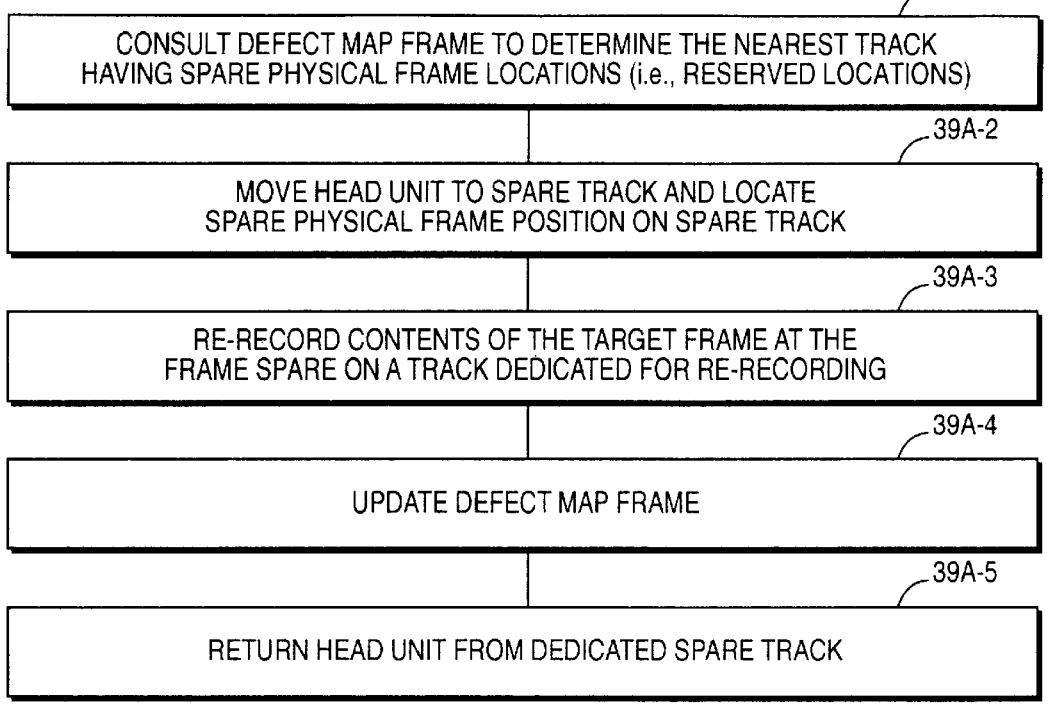
FIG. 39A is a flowchart showing steps involved in a re-recording procedure for frame according to the submode of FIG. 39.

When the target frame is determined to be defective in a recording or editing mode, the steps of FIG. 39A are implemented. At step 39A-1, the defect map frame 346 (see FIG. 19) is consulted to determine an available logical track, preferably the nearest logical track in the appropriate direction, in the reserved area (i.e., a reserved location with space to write the target frame). In this regard, the known physical frame location and track of the target frame is compared with the values stored in defect map frame 346. Then, as shown by step 39A-2, the head unit 100 is moved vertically by positioner motor 144 to the vertical position of the logical track which is dedicated to the re-recording of frames. As shown in FIG. 39, the spare or reserved logical track TG31R is preferably a logical track in which frames are recorded in a direction which is the reverse of the direction of recording of frames on logical track TG31. At step 39A-3, the contents of the target frame are re-recorded at the spare physical frame location on the spare logical track i.e., at the spare physical frame location that was determined from the defect map frame 346. As mentioned above, the re-recording preferably occurs with the tape being transported in a direction which is the opposite of the direction in which the tape moves when recording on logical track TG31. This is advantageously faster since it requires fewer tape stops and starts. Then, as shown by step 39A-4, a memory copy of the defect map frame 346 is updated. In particular, at step 39A-4, an entry in Table 23 is made for the defective frame, the first four bytes of the entry being the physical frame number of the defective frame and the second four bytes of the entry being the physical frame number at which the frame contents were re-recorded. Thus, the updated defect map frame 346 both indicates that the target frame's original area on tape is bad, and provides a pointer designating a new location for the target frame.

Lastly, as shown by step 39A-5, the head unit is returned to logical track TG31 for the recording of subsequent frames on logical track TG31. At the end of a recording session, the actual defect map frame 346 is updated on tape 32 based on the updated memory copy of defect map.

Figure 39B:
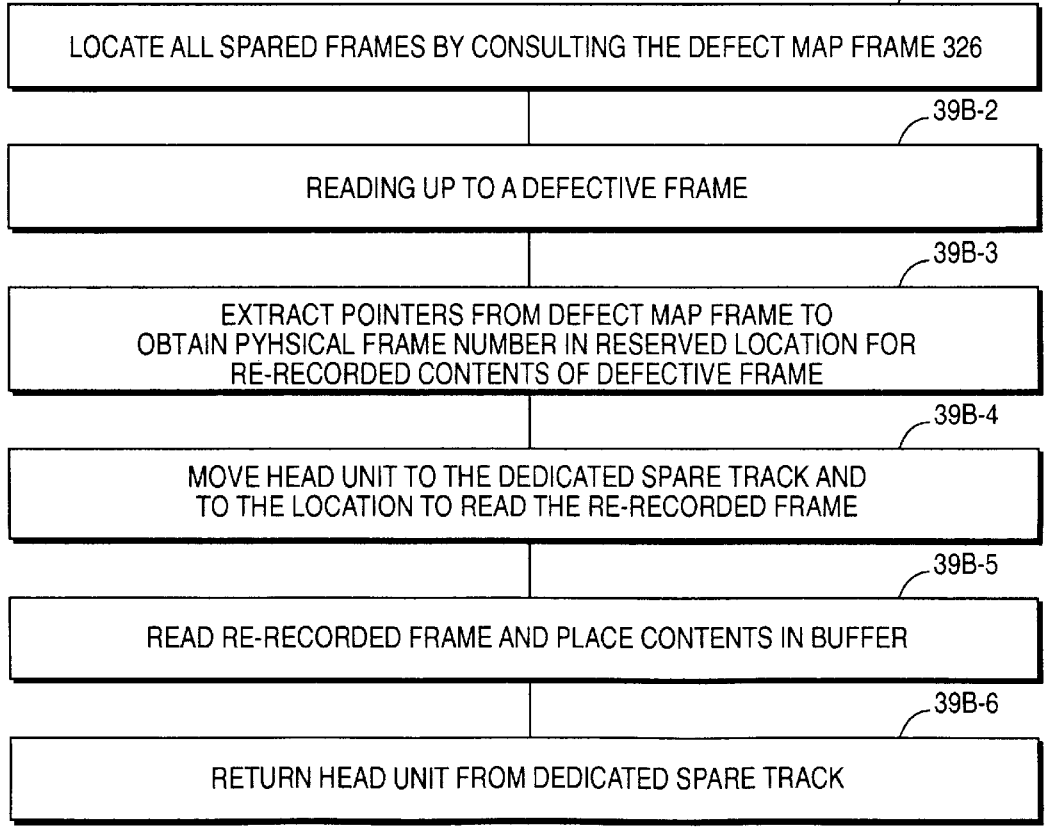
FIG. 39B is a flowchart showing steps involved in a read procedure for reconstructing a file containing a spared frame according to the submode of FIG. 39.

The procedure for reconstructing a file containing a spared frame in a read operation according to the submode of FIG. 39 is shown in FIG. 39B. At step 39B-1, the drive locates all spared frames by consulting defect map frame 346. Step 39B-2 shows the device reading up to a defective frame. At step 39B-3, pointers are extracted from defect map frame 346 in order to obtain the new location of the spared frame, i.e., the physical frame number which is the reserved location whereat the contents of the defective frame are re-recorded. Step 39B-4 shows the head unit being moved to the dedicated spare track TG31R and to the location to read the re-recorded frame which replaces the defective frame. At step 39B-5 the re-recorded frame is read and its contents placed in buffer memory 116. Then, as shown by step 39B-6, the head unit is returned to logical track TG31 and the tape advanced in the forward direction for the reading of subsequent frames.

The submode of FIG. 39, with the recording steps shown in FIG. 39A and the reading steps shown in FIG. 39B, has the advantage of potentially keeping data contiguous while not affecting the sustained rate until a defective frame is encountered. In addition, the submode of FIG. 39 does not place impose memory management requirements (e.g., holding intermediate frames in buffer memory 116 until the re-recorded frame is read).

Described above are method and apparatus for re-recording of a frame magnetic tape 32 when a first recording of the frame is determined to be defective. A frame whose first recording is defective is re-recorded at a spare or reserved location on the tape. The reserved location is dedicated to re-recording of frames, and otherwise cannot have data stored therein. The tape contains a defect map frame 346 which is used to pair physical locations of defective frames with the reserved location whereat the frame is re-recorded.

In the embodiment of FIG. 38, the reserved location whereat a frame is re-recorded is a reserved physical frame on the same track in which the defective frame is recorded. In fact, a plurality of reserved locations is provided on the same track with user data frames and are interspersed among physical frame locations of the user data frames track. Consecutive ones of the plurality of reserved locations on the same track are separated by a predetermined number of physical frame locations.

In the embodiment of FIG. 39, the reserved location is on a reserved track which is not the original track upon which the frame is recorded. Preferably the original track is recorded/read when relative movement between the head unit and the tape is in a first direction and the reserved track is recorded/read when relative movement between the head unit and the tape is in a direction which is opposite the first direction. In a related embodiment, there are a plurality of reserved tracks which are spaced at predetermined vertical positions of the tape.

For embodiments having multi-channel or multi-track frames, the reserved location employs a corresponding plurality of tracks.

In a method of recording on a magnetic tape is a recording mode which has a read-while-write (RWW) capability, after a frame is recorded it is read back to determine whether the frame is readable or accurately recorded. If the frame is defective, the contents of the frame are re-recorded at the reserved location. Further, a defect memory map is updated with a pairing of the first physical frame location of the defect with the reserved location at which the re-recording occurred. At a later time the memory copy of the defect map 346 is written to the control partition.

In a method of reading a magnetic tape having frames re-recorded to spare or reserved locations, the contents of the defect map frame is first acquired from the tape. The defect map having a pairing of frame original physical locations on the tape with frame re-recording physical locations for frames which are unreadable or erroneously recorded in their frame original physical locations. During the reading operation, frames are read from corresponding frame original physical locations on the tape. When an original physical location is encountered on the tape for which there is a pairing in the frame is consulted to dimap frame is consulted to discover the reserved location at which the frame contents are re-recorded so that the frame contents may be obtained from the reserved location. If the original physical location proves to be readable despite the indication in the defect map, the original physical location may be read without having to go to the reserved location.

Also provided is a hard sectored magnetic tape storage medium on which information is stored on a plurality of horizontally extending tracks. Each track has a plurality of frames, at least one of the frames including a defect map. The defect map has a pairing of frame original physical locations on the tape with frame re-recording physical locations for frames which are unreadable or erroneously recorded in their frame original physical locations. The frame re-recording locations are in a reserved portion of the tape. The tape can have either one or more tracks reserved for frame re-recording physical locations, or have frame re-recording physical locations are interspersed among frame original physical locations on the tape.

7.6 Recording and Use of Buried Servo Signal 7.6.1 Encoding of Buried Servo Signal in Data Region As previously explained in §2.1 and with reference to FIG. 7 and FIG. 9, a buried servo or tracking sense (TS) signal is recorded on tape 32. On some of the physical tracks of a logical track the servo signal serves as a servo position signal $TS_p$ in order to assure that head unit 100 is correctly vertically aligned to follow the horizontal physical tracks. On at least one of the physical tracks of a logical track the servo signal serves as a servo clock signal $TS_c$. The servo clock signal $TS_c$ is detected by servo clock recovery circuit 174 (see FIG. 2).

As previously explained in connection with FIG. 10, servo clock signal $TS_c$ has sets of cycles. In the example of tape 32, there are thirty six cycles per set. Moreover, on tape 32 each set of cycles serves to delineate a frame 220. In the illustrated embodiment, all but one of the cycles of the servo clock signal $TS_c$ is symmetrical. Preferably the asymmetrical cycle of the servo clock signal $TS_c$ is either the first cycle with its intermediate transition $x_0$ or the last such cycle with its transition $x_{35}$. FIG. 10 particularly shows a situation in which the first cycle is asymmetrical. Having an asymmetrical transition in at least one of its cycles is an example of servo clock signal $TS_c$ being modulated for a frame.

The modulation of servo clock signal $TS_c$, described in §2.1, can be utilized to provide information about tape 32. Such information includes an indication of relative horizontal position on tape 32 and buried header information which is indicative of one or more characteristics of tape 32. In the illustrated embodiment, the modulation of servo clock signal $TS_c$ provides each set (e.g., frame) with a modulation value. In the ensuing discussion, reference is made to a frame as being one example of a "set" of cycles. However, it should be understood that the buried servo encoding techniques described herein are not limited in application to frames, but that the sets of cycles can be otherwise composed or constituted (e.g., for example having numbers of cycles according to other criteria).

Concerning modulation, if, in a given frame, the selected cycle of servo signal $TS_c$ is modulated so that its asymmetrical intermediate zero crossing occurs before (e.g., earlier in time than) the expected symmetrical intermediate zero crossing, the frame in which the modulated cycle occurs is said to have a "0" modulation value. On the other hand, if the selected cycle of servo signal $TS_c$ for a frame is modulated so that its asymmetrical intermediate zero crossing occurs after (e.g., later in time than) the expected period zero crossing, the frame is said to have a "1" modulation value for the frame. It should be understood that other modulation value assignment conventions can apply to other embodiments (e.g,. the inverse of that illustrated). Moreover, it should be understood that the above described modulations are reversed if the tape direction is reversed.

Figure 41:
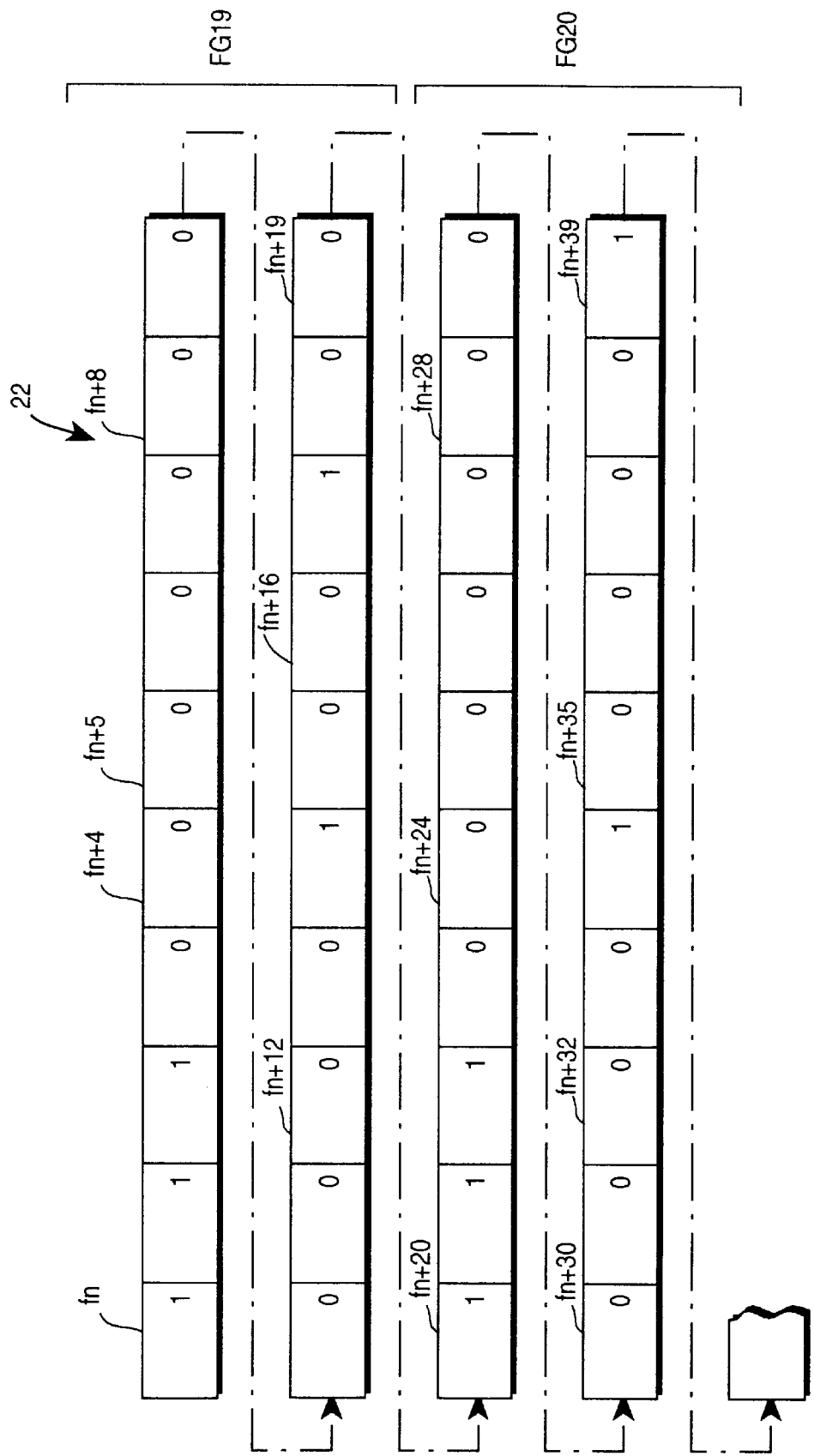
FIG. 41 is a schematic view of tape showing modulation of a buried servo signal on magnetic tape.

By assigning a modulation value to each frame in the foregoing manner, a plurality of consecutive frames can be grouped together into a frame group FG, with the modulation values of the constituent frames of the frame groups collectively forming a frame group identifier. FIG. 41 shows just two frame groups of a plurality of frame groups provided on tape 32, in particular frame groups FG19 and FG20. Each frame group FG is composed of twenty frames. That is, frame group FG19 is composed of frames $f_n$ through $f_{n+19}$; frame group FG20 is composed of frame $f_{n+20}$ through frame $f_{n+39}$.

Each frame group is further divided into frame subgroups. A predetermined number N of frames consecutive constitutes a frame subgroup, N being four in the illustrated embodiment. For example, frames $f_n$ through $f_{n+3}$ constitute a first frame subgroup of frame group FG19; frames $f_{n+4}$ through $f_{n+8}$ constitute a second frame subgroup of frame group FG19, and so forth.

The first frame subgroup of a frame is known as a synchronization subgroup. For example, frames $f_n$ through $f_{n+3}$ constitute a synchronization subgroup for frame group FG19; frames $f_{n+20}$ through $f_{n+23}$ constitute a synchronization subgroup for frame group FG20. As discussed in more detail hereinafter, in synchronization subgroups the modulation values compose a predetermined synchronization pattern which does not occur in consecutive frames not residing in synchronization subgroups. Therefore, the synchronization subgroups serve to delimit frame groups from one another. For example, the synchronization subgroup constituted by frames $f_{n+20}$ through $f_{n+23}$ indicates that frame group FG19 has terminated and that another frame group begins (e.g., frame group FG20).

For each frame in FIG. 41 there is shown only the modulation value for the frame. The modulation values of each frame subgroup comprise a predetermined number M of digits of the group frame identifier for the group frame. While it is possible for there to be a one-to-one relationship between the number of frames N in a frame subgroup and the number of digits M, in the illustrated embodiment there is a 4: 3 relationship between N and M. Table 29 sets forth the coding relationships between the N modulation values of a frame subgroup and the M-digit value of a portion the frame identifier.

In the above regard, it will be remembered that the first frame subgroup of frame group FG19 is a synchronization subgroup. In the illustrated embodiment, all synchronization subgroups have the modulation values 1,1,1,0. The synchronization subgroup is so formed that the modulation values thereof yield a pattern 111—three consecutive ones—which is not present in modulation values of consecutive frames of non-synchronization subgroups.

It can be seen from FIG. 41 for frame group FG19 that the second frame subgroup has modulation values 0,0,0,0; that the third frame subgroup has modulation values 0,0,0,0; that the fourth frame subgroup has modulation values 0,0,1,0; and that the fifth frame subgroup has modulation values 0,1,0,0.

Now with reference to Table 29, it can be seen that the frame group identifier for frame group FG19 is the twelve binary digit value 000000010011. From Table 35, the modulation values (0,0,0,0) of the second frame subgroup yield the first three digits 000; the modulation values (0,0,0,0) of the third frame subgroup yield the next three digits 000; the modulation values (0,0,1,0) of the fourth frame subgroup yield the next four digits 010; and the modulation values (0,1,0,0) of the fifth frame subgroup yield the last three digits 011. Thus, with reference to Table 29, the value of the frame group identifier for frame FG19 is, appropriately enough, nineteen. Similarly it can be seen that the value of the group frame identifier for frame group FG20 is twenty.

It is to be noted that no sequence of the values in Table 29 yield the synchronization pattern 1110. Thus, the synchronization pattern is distinguishable from modulation values that are used to form the frame group identifier. In other words, the synchronization pattern is chosen such that the synchronization pattern does not appear in any potential group identifier value.

FIG. 41 provides an example in which there is a 4: 3 relationship between the number of frame N in a frame subgroup and the number M of frame group identifier digits obtained therefrom. In other embodiments other relationships between N and M are envisioned, for example 5:4.

Referring to FIG. 2, servo signal $TS_c$ is applied from head unit 100 to servo clock recovery circuit 174. Servo clock recovery circuit 174 detects the low frequency buried servo signal, so that waveform values such as that shown in FIG. 10 are transmitted to clock modulation detector 180. Servo clock recovery circuit 174 analyzes the received waveforms and provides control processor 130 with an interrupt on line 179 at the beginning of each cycle of servo signal $TS_c$ (e.g., at each positive-going zero crossing transition). Clock modulation detector 180 generates an interrupt on line 181 at each intermediate transition (e.g., at each negative-going zero crossing transition). The interrupts on lines 179 and 181 are applied to tape location detector 135 of processor 130. Tape location detector 135 of processor 130 uses these interrupts to form sets or frames of cycles, to detect the modulation value of each frame by determining the timing of the intermediate zero crossing of the selected cycle of the frame; to identify the synchronization pattern e.g., for forming groups of frames; and, to determine the group identifier for each group.

In embodiments which utilize coding relationships such as that shown in Table 29, it should be realized that conversions can be performed by tape location detector 135 with, e.g., resort to a look up table having the paired values of the appropriate conversions stored therein (e.g, the values of Table 29, for example).

The buried encoding scheme of servo signal $TS_c$ of the present invention provides an efficient way for a device such as a tape drive to determine its position relative to tape 32. For example, suppose head unit 100 were located to read frame $f_{n+5}$ Of tape 32 as shown in FIG. 41. Head unit 100 need to read only from frames $f_{n+5}$ through and including $f_{n+27}$ in order to determine its location on tape 32. Upon reaching frames $f_{n+23}$, tape location detector 135 will conclude that it has just read a synchronization subgroup, and therefore will conclude that the fifteen modulation values obtained prior to the synchronization subgroup constitute the fifteen lower order modulation values which can be used to decode the frame group identifier. By continuing to read frames $f_{n+24}$ through $f_{n+27}$, tape location detector acquires the four highest order modulation values. At this point, the entire frame second subgroup (e.g, frames $f_{n+24}$ through $f_{n+27}$) has been acquired. Thereafter, tape location detector 135 can decode the frame group identifier. Thus, in the worst case scenario just discussed, head unit 100 need read no more than twenty three modulation values in order to determine its horizontal location on tape 32, e.g., about 1.5 feet of tape movement.

Thus, the horizontal position on tape 32 is determined by tape location detector 135 as described above with reference to frame identifiers. The vertical location of head unit 100 on tape is known by control processor 130 in view of its connection to positioner motor driver 158, which controls the vertical positioner motor 144 for head unit 100.

In the illustrated embodiment of FIG., 41 in which twenty frame are provided per frame group, with each frame group having a twelve binary digit (e.g, bit) identifier, 4096 frame group identifiers are possible per tape. With each fame group requiring about fifteen inches of tape, the scheme of FIG. 41 provides frame identifiers for over fourtyeight hundred feet of tape.

It should be understood that variations of the illustrated embodiments are also envisioned. For example, the synchronization frames can be recorded at a position other than at the beginning of a frame group, such as at the end of a frame group. Moreover, it is envisioned that frames can, in other embodiments, be modulated to have more than one asymmetrical zero crossing, thereby affording two modulation values per frame. Further, although the coding scheme of Table 29 is particularly advantageous for affording an Hamming distance of two or greater between adjacent frame groups (i.e., any two frame groups next to each other will differ by at least two positions in their code), other modulation coding schemes can be employed.

7.6.2 Encoding of Buried Servo Signal in Non-Data Regions

FIG. 6 shows non-data regions of tape 32 as including hub wrap lead region NML 200, beginning of tape lead-in zone 202; scratch area 204; buried header region 206; pad region 208; start of track marker 210; end of track marker 214; end of tape lead-out zone 216; and hub wrap lead region NML 218. Some of these areas/regions have buried servo signal recorded thereon; others do not.

The hub wrap lead regions NML 200, 218 are as short as possible given tape loader constraints and have no buried servo signal recorded thereon. Hub wrap lead regions NML 200, 218 are preferably about two feet at each end of tape 32.

Beginning of tape lead-in zone 202 has buried servo, with the buried servo signal being modulated in the following manner: 1X1X1X1X1X1X1X1X1X1X... (X being an unmodulated cycle). The length of the beginning of tape lead-in zone 202 is about five feet. The end of track marker 214, also about five feet in length, has the buried servo signal modulated in the following manner: 1X0X1X0X1X0X....

Scratch areas 204 and 216 have the buried servo recorded thereon, but the buried servo signal is not modulated in these areas.

Buried header region 206 is about ten inches in length, and has the buried servo signal modulated as discussed below.

Pad region 208 is about two feet in length and has about 1222 cycles of the buried servo signal TS recorded thereon. Pad region 208 is a suggested parking zone for tape 32 at rewind and eject. Modulation of buried servo signal TS in pad region 208 is 11111000001111100000. . . .

Start of track marker 210 and end of track marker 214 are each approximately 0.63 inches and have about 32 cycles of buried servo signal. Start of track marker 210 is modulated with the following pattern: 0011111000001111000011100011110010XX. End of track marker 214 is modulated with the following pattern: XX0100110001110000111100001111100. Padding markers 210 and 214 to thirty two bits makes the pattern fill a double word register in firmware.

Upon insertion of a cartridge 30 into a device, it is recommended that tape 32 be wound forward until the buried servo signal TS can be decoded for a few cycles (a minimum number of feet). If tape 32 is not at beginning of tape area 202, tape 32 should be rewound until beginning of tape area 202 is found. Then tape 32 is wound forward to read buried header region 206. An attempt is made to lock on track twelve. Then configuration frames of tape 32 are read. Next tape 32 is rewound to pad area 208.

7.6.2.1 Buried Header Region

Figure 44:
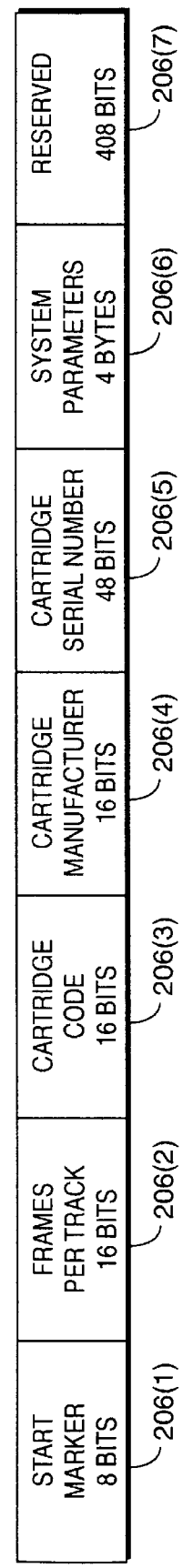
FIG. 44 is a schematic view of a format of a buried header region on magnetic tape according to an embodiment of the invention.

Buried header region 206, shown context of tape 32 in FIG. 6, is seen in more detail in FIG. 44. FIG. 44 shows buried header region 206 has comprising fields 206(1) through 206(7). These fields include start marker field 206(1); number of frames per track field 206(2); cartridge code field 206(3); cartridge manufacturer field 206(4); cartridge serial number field 206(5); system parameter field 206(6); and reserved field 206(7).

Bytes in the buried header are delimited by a "1X0". That is, the buried header as a sequence of 1X0, first byte, 1X0, second byte, 1X0, third byte, etc. Start marker field 206(1) has eight bits. In start marker field 206(1), buried servo signal TS has the pattern 11111111 to indicate the start of the buried header.

The number of frames per track field 206(2) has sixteen bits. The number of physical data frames per track is approximately seventeen thousand for a standard EX cartridge.

The cartridge code field 206(3) has sixteen bits. Cartridge code field 206(3) has a value of zero for a minicartridge; a value of one for an EX cartridge; with other cartridge code values being reserved.

Cartridge manufacturer field 206(4) has sixteen bits, and is of a value assigned to the manufacturer. Cartridge serial number field 206(5) is forty eight bits, and is a unique number assigned to the cartridge at manufacturing time.

System parameter field 206(6) has four bytes. The first of these bytes indicates the number of channels per track group (eight in the illustrated embodiment [see FIG. 4 and FIG. 5]). The second byte is the number of track groups per band. The third byte is the number of bands on tape 32. The fourth byte is reserved.

7.6.2.1 Pre-recording of Buried Servo Signal

Figure 42:
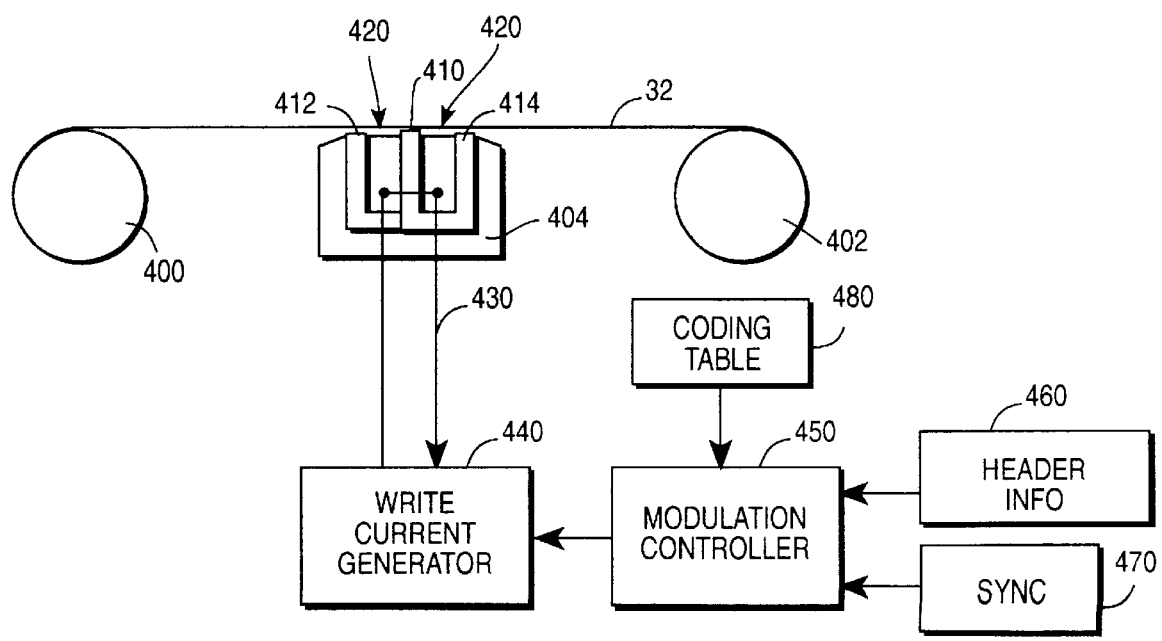
FIG. 42 is a top view of a system for recording a buried servo signal on tape.
Figure 43:
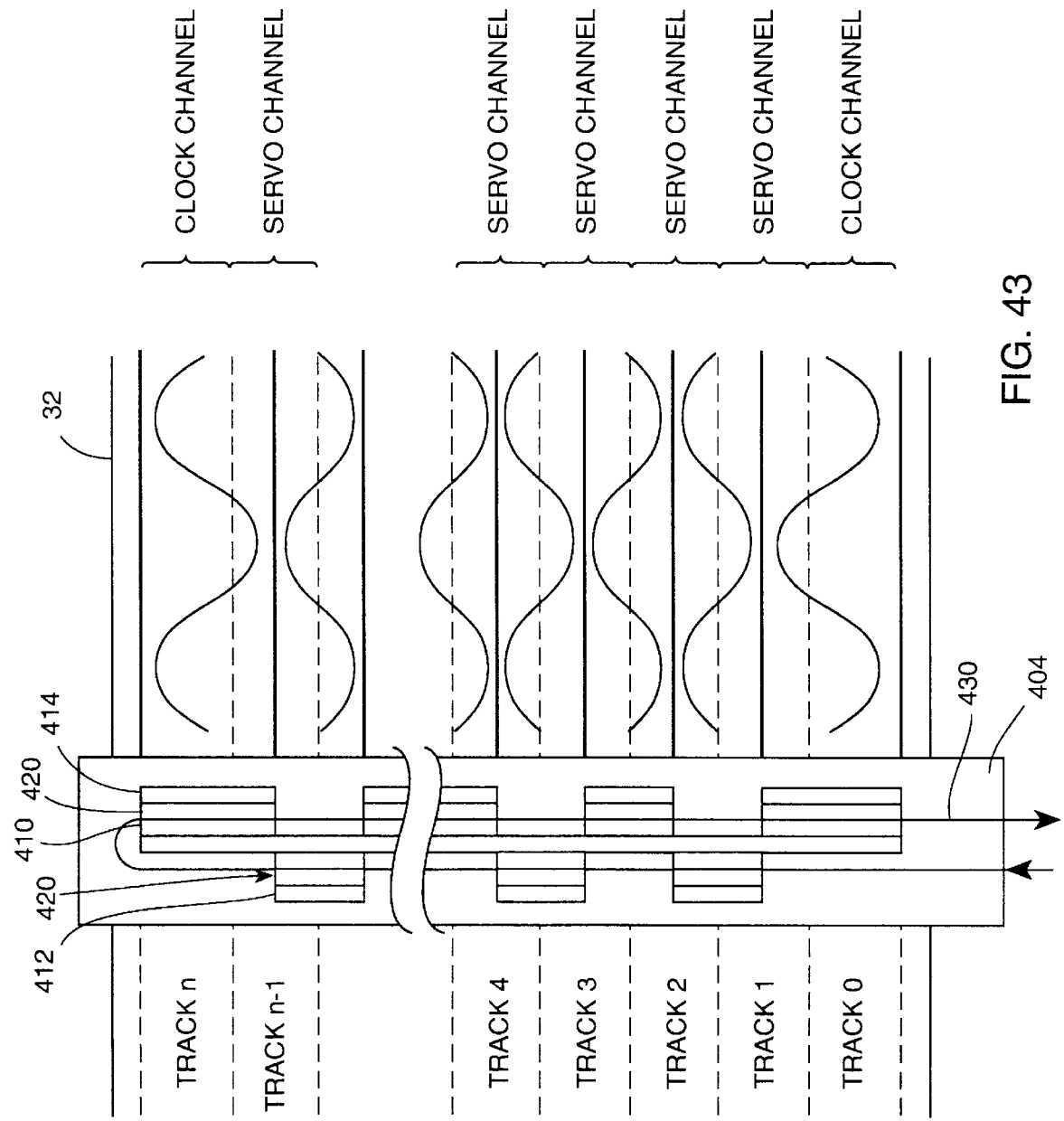
FIG. 43 is a side view of a recording head of the system of FIG. 42.

The invention thus covers not only the use of the modulated buried servo signal TS as above described, but also tape 32 upon which the buried servo signal TS is modulated in accordance with the foregoing and methods for modulating the buried servo signal TS. Apparatus for modulating the buried servo signal TS is shown in FIG. 42 and FIG. 43. FIG. 42 shows tape 32 being transported between supply reel 400 and take-up reel 402, both reels 400 and 402 being driven for transport of tape 32. As tape 32 is transported tape 32 comes into proximity with servo signal write head 404. Servo signal write head 404 has a central magnetic pole 410 and lateral poles 412, 414. Central pole 410 is coextensive along the width of the tape with all physical tracks of the tape (see FIG. 43). In adjacent physical positions, lateral poles 412, 414 alternate in position about central pole 410. Magnetic recording gaps 420 extend between each lateral pole 412, 414 and central pole 410. A magnetic coil 430 extends through the gaps 20 in the manner shown in FIG. 42 and FIG. 43. Coil 430 is connected to write current generator 440 (see FIG. 42). Write current generator 440 applies a write current to coil 430. The write current applied by write current generator 440 produces the servo signal TS on each physical track in the manner shown in FIG. 43. Moreover, write current generator 440 is governed by modulation controller 450. Modulation controller 450 supervises modulation of the selected cycles of the servo clock signal $TS_c$. The modulation of the selected cycles is understood in accordance with the foregoing. Based on the modulation and encoding scheme (e.g., 4: 3 encoding) above discussed, the selected cycles are modulated to contribute either a synchronization value or an appropriate modulation value to its frame subgroup, whereby an appropriate group identifier is prepared for the logical track frame to which the frame belongs.

While the invention has been particularly shown and described with reference to the preferred embodiments thereof, it will be understood by those skilled in the art that various alterations in form and detail may be made therein without departing from the spirit and scope of the invention.

Appendix I

Definitions

Appendable Point: An appendable point is where a write operation is allowed to begin.

A/V: Audio/Video refers to devices, data or operations that are designed to accommodate the requirements of audio and video recording and playback.

AUX Data: The AUX Data is a 512 byte control field associated with each 32 KB tape frame.

BOLG: BOLG indicates the Beginning of a Logical Group. The BOLG is defined in the DAT Entry.

BOP: The Beginning of Partition, which is used to signal the first tape frame in a partition.

BOPT Marker: The BOPT marker is the Beginning of Partition Track, which is used to signal the vertical boundary of a partition closest to the take-up reel on the tape.

BOT: The Beginning of Tape, which is the take-up reel end of the tape.

CEW: The Corner Early Warning, which is concept used to signal that the end of a track within a partition is approaching. This signal allows the device or system to prepare for track cornering operations through caching and buffering of data.

Configuration Frames: The Configuration Frames are reserved non-user data frames that are used for configuration and directory information. The Configuration Frames are located in the Configuration Partition, which is the first partition located at BOT.

Configuration Partition: The Configuration Partition is the first vertical partition located on tape from BOT. The Configuration Partition contains the Configuration Frames. The Configuration Partition is composed of five (5) frames horizontally and twenty-four (24) logical tracks vertically. The Configuration Partition has a partition number of FFh (−1 ).

Defect Map: The Defect Map is a configuration frame that contains a list of physical locations on tape that have exhibited data integrity problems.

ECC: ECC represents an Error Correction Code that is used for correcting recoverable data.

EOD: The End of Data, which is used to mark the end of the valid data area for a partition in a streaming tape application.

EOLG: EOLG indicates the End of a Logical Group. The EOLG is defined in the DAT Entry.

EOP: The End of Partition, which is the last tape frame of a partition.

EOPT Marker: The EOPT marker is the End of Partition Track, which is used to signal the vertical boundary of a partition closest to supply reel on the tape.

EOT: The End of Tape, which is the supply reel end of the tape.

Filemark: A virtual point within the sequence of data blocks placed by the host to aid navigation. A read operation will terminate upon reaching a Filemark. Each Filemark is assigned a unique logical block address.

ID Frame: The Identify (ID) Frame is a Configuration frame used to contain basic information about the nature of the volume. The ID frame includes information on the origin of the format, the location of other Configuration frames and the partitioning of the data area.

Kbytes (KB): This Standard defines 1 KB to be equal to 1024 bytes.

Logical Block: A Logical Block is a group of data bytes that the host application specifies.

LEW: The Logical Early Warning, which is used to signal that the end of recordable area is approaching. This signal allows the device to prepare for partition full operations through buffer flushes.

Logical Element: A Logical Element represents an entity on tape that possess a unique logical block address. This specification supports three types of logical elements, data blocks, filemarks, and setmarks.

Logical Group: A logical group is the sequential grouping of logical elements that possess the same attributes with no format discontinuities within the group.

Logical Track: A group of physical tracks recorded or read simultaneously through a multi-channel head forming a single logical entity.

Magnetic Tape Cartridge: A cartridge containing magnetic tape wound on two coplanar hubs with an internal drive belt to transport the tape between the hubs, the two hubs form a supply reel and a take-up reel for the tape.

MPDR: Multi-Purpose Data Recorder.

Partition: A sequence of logical data blocks with logical addresses starting from zero. All tapes have a minimum of two partitions labeled partition−1 and partition 0. Partition 0 may be further subdivided into additional partitions.

Partition−1 : Partition−1 (FFh) is the Configuration Partition.

Program: A set of data identified as a sequential contiguous data stream of A/V data.

RWW (Read-While-Write). A hardware architecture involving a double bump head, where the lead bump writes data to tape and the following bump performs a read/verify operation.

Reserved (res): Reserved fields are to be written with zeros and ignored by firmware to facilitate future enhancements.

Setmark: A virtual point within the sequence of data blocks placed by the host to aid navigation. A read operation will terminate upon reaching a Setmark. Each Setmark is assigned a unique logical block address.

Streaming: A method of recording on magnetic tape that maintains continuous tape motion without the requirement to start and stop.

Tape Frame: A complete data entity consisting of 32 KB of user available data combined with ECC data and control fields. Each tape frame shares a one-to-one correspondence with a particular physical location on tape and is synchronized to the buried servo. Depending on the device model, the tape frame may or may not have a linear correlation with the host's logical blocks.

TOC: The Table of Contents (TOC) is a simplified directory structure pointing to the beginning and ending of audio and video programs. This is the primary navigation tool used in A/V recorder/player.

Track: A longitudinal area on tape along which magnetic signals are serially recorded. Each track is marked by a buried servo signal, and positioned between BOT and EOT.

Track Table: A table that contains position information relating logical block numbers to physical partition track boundaries. The track table is used primarily in the streaming tape application to assist in rapid seeking to logical locations on tape.

Undefined: Undefined fields may contain any value. The contents of an undefined field are not considered to have any meaning. These may be fields which are inactive in a certain mode or are reserved for future enhancements, but which are not required to be zero filled.

Underrun: A condition developed when the application transmits data at a rate less than required for streaming.

Volume: A complete unit consisting of the recording medium (the magnetic tape) and its physical carrier (the cartridge). A volume has the characteristic of be mounted or demounted. In the mounted state the volume is in a logical and physical state such that the tape drive mechanism can execute commands from the host to move the tape. When the volume is in an demounted state either the physical or logical conditions prevent the host from executing commands for tape motion.

Appendix II

Byte and Code Requirements

Byte: A group of 8 data bits operated on as a unit. Byte Length. The data is in eight-bit bytes. The 8 bits in each byte are numbered b0 to b7, b7 being the most significant bit.

Byte Order. Little endian ordering is used for variables larger than one byte, all efforts are be made to ensure that independent variables are placed on even address boundaries (word length).

Text Code. Bits b0 to b6 correspond to the 7 least significant bit assignments specified in the American National Standard Code for Information Interchange (ASCII), ANSI X3.4-1986. To comply with this Standard, bit 7 shall always be set to Zero and the seven bits b0 through b6 shall represent ASCII characters.

Radix. All numbers are decimal, base 10, unless followed by an 'h' suffix that indicates hexadecimal, base 16.

Word: A group of 16 data bits operated on as a unit.

Word Length. The data shall be in sixteen-bit words. The 16 bits in each word are numbered b0 to b15, b15 being the most significant bit.

Double-Word Length. The data shall be in thirty-two-bit double-words. The 32 bits in each byte are numbered b0 to b31, b31 being the most significant bit.

Signed Numbers: Negative numbers are represented by the 2's complement.

TABLE 1

AUX Data Structure

| Position | Bytes | Usage | A/V | Streamer | R/A |
|---|---|---|---|---|---|
| 0–1 | 2 | Frame Type | M | M | M |
| 2–7 | 6 | reserved | | | |
| 8–11 | 4 | Tape Frame Address | M | M | M |
| 12–25 | 14 | reserved | | | |
| 26–27 | 2 | Write Pass Counter | | M | |
| 28–31 | 4 | Filemark Count | | M | |
| 32–35 | 4 | Setmark Count | | M | |
| 36–39 | 4 | Frame Sequence Number | | M | |
| 40–47 | 8 | Logical Frame Address | O | M | M |
| 48–307 | 260 | Data Access Table (DAT) | O | M | M |
| 308–333 | 26 | reserved | | | |
| 334–335 | 2 | Partition Control Flags | M | O* | O* |
| 336–367 | 32 | Partition Description | M | M | M |
| 368–431 | 64 | A/V Program Description | M | O* | O* |
| 432–511 | 80 | reserved | | | |

TABLE 2

Frame Type Field

| byte\bit | 7 | 6 | 5 | 4 | 3 | 2 | 1 | 0 |
|---|---|---|---|---|---|---|---|---|
| 0 | A/V | Data | TrkTb1 | Ident | Marker | DefMap | TOC | EOD |
| 1 | res | res | uCode | res | res | res | res | res |

TABLE 3

Frame Type Values

| Frame Type | Byte 0 Value | Byte 1 Value |
|---|---|---|
| Filler Frame | 0x00 | 0x00 |
| Micro-code Frame | 0x00 | 0x20 |
| EOD Frame | 0x01 | 0x00 |
| Defect Map Frame | 0x04 | 0x00 |
| Marker Frame | 0x08 | 0x00 |
| Identify Frame | 0x10 | 0x00 |
| Track Table Frame | 0x20 | 0x00 |
| Data Frame | 0x40 | 0x00 |
| Partition Boundary Frame | 0xA0 | 0x00 |
| TOC Frame | 0xA2 | 0x00 |
| A/V Data Frame | 0xC0 | 0x00 |

TABLE 4

Tape Frame Address

| MSB | | LSB |
|---|---|---|
| y | | x |

TABLE 5

Tape Frame Address Byte Locations in AUX Data

| AUX Byte Position | Usage |
|---|---|
| 8 | 'x' LSB |
| 9 | 'x' Middle |
| 10 | 'x' MSB |
| 11 | 'y' |

TABLE 6

Logical Group Attribute Discontinuities

| Previous DAT Entry | Next DAT Entry |
|---|---|
| Data blocks of a given logical block size | Data blocks of a different logical block size |
| A group of like data blocks that will all fit in the current frame | A data block that will span into the next frame |
| A data block which has spanned from the previous frame | A group of like data blocks that will all fit in the current frame |
| A data block which has spanned from the previous frame | A data block that will span into the next frame |
| Uncompressed data | Compressed data |
| Compressed data | Uncompressed data |
| Filemark(s) | Setmark(s) |
| Setmark(s) | Filemark(s) |

TABLE 7

DAT Structure

| Byte | Description |
|---|---|
| 0 | DAT Entry Size (8) |
| 1 | reserved |
| 2 | Number of DAT Entries (n) |
| 3 | reserved |
| 4–259 | (n) DAT Entries |

TABLE 8

DAT Entry Structure

| Byte | Description |
|---|---|
| 0–3 | Logical Block Size |
| 4–5 | Number of Logical Elements |
| 6 | DAT Entry Flags |
| 7 | reserved |

TABLE 9

DAT Entry Flags

| Bits | 7 | 6 | 5 | 4 | 3 | 2 | 1 | 0 |
|---|---|---|---|---|---|---|---|---|
| Description | EXT | CMP | CID | | BOLG | EOLG | res | MARK |

TABLE 10

Frame Spanning Control Flag Definitions

| BOLG | EOLG | DESCRIPTION |
|---|---|---|
| 1 | 1 | The entire logical group is contained within this frame. For this frame the DAT entry for the Logical Block Size specifies the number of bytes for one logical element. |
| 0 | 0 | Only a portion or mid part of the logical group is contained within this frame. The beginning of this logical group is contained in a frame on the BOP side. The end of this logical group is contained in a frame on the EOP side. The DAT entry for the Logical Block Size for this frame specifies only the number of bytes that are represented in this frame. |
| 0 | 1 | Only the end of the logical group is contained within this frame. The beginning and mid portions of this logical group are contained in a frame(s) on the BOP side. The DAT entry for the Logical Block Size for this frame specifies only the number of bytes that are represented in this frame. |
| 1 | 0 | Only the beginning of the logical group is contained within this frame. The end and mid portions of this logical group are contained in a frame(s) on the EOP side. The DAT entry for the Logical Block Size for this frame specifies only the number of bytes that are represented in this frame. |

TABLE 11

Partition Control Field

| byte\bit | 0 | 1 | 2 | 3 | 4 | 5 | 6 | 7 |
|---|---|---|---|---|---|---|---|---|
| 0 | res | BOPT | res | EOPT | res | res | res | res |
| 1 | CEW | | | | | | | |

TABLE 12

A/V Program Description Structure

| byte | Description |
|---|---|
| 0–1 | Program Entry Number |
| 2–3 | reserved |
| 4–7 | Tape Frame Address Start |
| 8–11 | Tape Frame Address End (0) |
| 12–13 | Multi-media Source |
| 14–15 | reserved |
| 16–47 | Program Name/Credits (ASCII text string) |
| 48–49 | Program Date/Year (0000–9999) |
| 50 | Program Date/Month (00–12) |
| 51 | Program Date/Day (00–31) |
| 52 | Program Time/Hour (00–24) |
| 53 | Prdgram Time/Minute (00–59) |
| 54 | Program Time/Second (00–59) |
| 55 | reserved |
| 56–64 | reserved for Running Time |

TABLE 13

Multi-media Source Field

| byte\bit | 0 | 1 | 2 | 3 | 4 | 5 | 6 | 7 |
|---|---|---|---|---|---|---|---|---|
| 0 | CP | SCPY | res | res | res | res | VIDEO | AUDIO |
| 1 | FUNK | res | res | res | res | TSTP | MPEG | NOCMP |
| 2 | res | res | res | res | res | res | res | res |
| 3 | Revision | | | | | | | |

TABLE 14

Copy Protection Support Field

| CP | SCPY | description |
|---|---|---|
| 0 | 0 | unlimited copies are authorized |
| 0 | 1 | a single copy is authorized |
| 1 | 1 | no copies are authorized |

TABLE 15

Partition Boundary Data Structure

| byte | Description |
|---|---|
| 0 | MPDR Physical Format Major Revision Level |
| 1 | MPDR Physical Format Minor Revision Level |
| 2 | MPDR Logical Format Major Revision Level |
| 3 | MPDR Logical Format Minor Revision Level |
| 4 | Partition Boundary Entry Length (16) |
| 5 | reserved |
| 6 | Number of Partitions on Tape (n) |
| 7 | reserved |
| n | Partition Boundary Entries |

TABLE 16

Partition Entry Data Structure

| byte | Description |
|---|---|
| 0 | Partition Number |
| 1 | reserved |
| 2–3 | Tape Device Model |
| 4–7 | Lower Left Tape Frame Address |
| 8–11 | Upper Right Tape Frame Address |
| 12–15 | reserved |

TABLE 17

Tape Device Model Field

| byte\bit | 0 | 1 | 2 | 3 | 4 | 5 | 6 | 7 |
|---|---|---|---|---|---|---|---|---|
| 0 | A/V | RA | STRMR | res | res | res | res | res |
| 1 | TOC | DEF | TrkTbl | RWW | res | res | res | ERASE |

TABLE 18

TOC Data Structure

| byte | Description |
|---|---|
| 0 | TOC Frame Number |
| 1 | Total Number of Frames in TOC |
| 2–3 | reserved |
| 4–5 | Number of Entries in this Frame |
| 6 | TOC Entry Length (64) |
| 7 | reserved |
| n | TOC Entries |

TABLE 19

Track Table Data Structure

| byte | Description |
|---|---|
| 0–1 | Maximum Write Pass Count |
| 2–5 | reserved |
| 6 | Number of Partitions (n) |
| 7 | Partition Entry Header Length (16) |
| | (n) Track Table Partition Entries |

TABLE 20

Partition Entry Data Structure

| byte | Description |
|---|---|
| 0 | Partition Number |
| 1 | reserved |
| 2–3 | Write Pass Counter |
| 4–7 | EOD Tape Frame Address |
| 8–15 | reserved |
| 16–23 | Last Marker Frame Address |
| 24–27 | Last Marker Frame LFA |
| 28–29 | reserved |
| 30 | Number of Tracks in Partition (m) |
| 31 | Track Entry Length (16) |
| m | Track Entries |

TABLE 21

Track Entry

| Byte | Description |
|---|---|
| 0–7 | Next Logical Block Address |
| 8–11 | Filemark Running Count |
| 12–15 | Setmark Running Count |

TABLE 22

Defect Map Data Structure

| byte | Description |
|---|---|
| 0 | Defect Map Frame Number |
| 1 | Total Number of Frames in Defect Map |
| 2–3 | reserved |
| 4–5 | Number of Entries in this Defect Map (n) |
| 6 | Defect Map Entry Length (8) |
| 7 | reserved |
| n | Defect Entries |

TABLE 23

Defect Entry Data Structure

| byte | Description |
|---|---|
| 0–3 | Defect Tape Frame Address |
| 4–7 | Re-mapped Tape Frame Address |

TABLE 24

Identify Frame Data Structure

| byte | Description |
|---|---|
| 0–1 | Tape Device Model |
| 2–17 | Manufacturer Name (ASCII text) |
| 18–33 | Model Name (ASCII text) |
| 34–49 | Model Revision (ASCII text) |
| 50–509 | reserved |
| 510–511 | Additional Identify Fields Supported |
| 512–1023 | Inquiry Data |
| 1024–1535 | Mode Sense Pages |
| 1536–2047 | Log Sense Pages |
| 2048–2559 | ATA/ATAPI Identify |
| 2560–32768 | undefined |

TABLE 25

Tape Device Model Field

| byte\bit | 0 | 1 | 2 | 3 | 4 | 5 | 6 | 7 |
|---|---|---|---|---|---|---|---|---|
| 0 | A/V | RA | STRMR | res | res | res | res | FMTR |
| 1 | res | res | res | res | res | res | res | res |

TABLE 26

Additional Identify Fields Supported Field

| byte\bit | 7 | 6 | 5 | 4 | 3 | 2 | 1 | 0 |
|---|---|---|---|---|---|---|---|---|
| 0 | res | res | res | res | ATAID | LOG | MODE | INQ |
| 1 | res | res | res | res | res | res | res | res |

TABLE 27

Marker Frame Data Structure

| byte | Description |
|---|---|
| 0 | Partition Number |
| 1 | reserved |
| 2–7 | undefined |
| 8–15 | reserved |
| 16–23 | Previous Marker Frame Address |
| 24–27 | Previous Marker Frame LFA |
| 28–29 | reserved |
| 30–31 | undefined |

TABLE 28

Tape Model Configuration Frame Support Requirements

| Device Model | Partition Frame | TOC Frame | Track Table Frame | DEF Frame | ID Frame |
|---|---|---|---|---|---|
| AV | Mandatory | Mandatory | Not Supported | Not Supported | Optional |
| RA w/o RWW | Mandatory | Not Supported | Not Supported | Optional* | Optional |
| RA with RWW | Mandatory | Not Supported | Not Supported | Mandatory | Optional |
| RA/AV w/o RWW | Mandatory | Mandatory | Not Supported | Optional* | Optional |
| RA/AV with RWW | Mandatory | Mandatory | Not Supported | Mandatory | Optional |
| Streaming Tape w/o RWW | Mandatory | Not Supported | Mandatory | Not Supported | Optional |
| Streaming Tape with RWW | Mandatory | Not Supported | Mandatory | Not Supported | Optional |
| Streaming Tape/AV w/o RWW | Mandatory | Mandatory | Mandatory | Not Supported | Optional |
| Streaming Tape/AV with RWW | Mandatory | Mandatory | Mandatory | Not Supported | Optional |

TABLE 29

Servo Signal Modulation Codes

| Group ID bits | Modulated Symbols |
|---|---|
| 000 | 0000 |
| 001 | 0101 |
| 010 | 0010 |
| 011 | 0100 |
| 100 | 0001 |
| 101 | 0110 |
| 110 | 1010 |
| 111 | 1001 |

The embodiments of the invention in which an exclusive property or privilege is claimed are defined as follows:

1. A method of operating a magnetic tape drive which transduces frames of information to and from magnetic tape, the method comprising:
   (1) reserving at least one reserved location on the tape for the re-recording of frames;
   (2) recording a frame at a first physical frame location on the tape during a recording mode; and
   (3) after the recording of step (2), checking whether the frame is readable or accurately recorded;
   (4) if the result of the checking of step (3) is negative, re-recording the frame at the reserved location and establishing in a memory a pairing of the first physical frame location with the reserved location;
   wherein the magnetic tape drive uses a head unit to transduce frames of information to and from tracks of the magnetic tape, wherein the frame is recorded at the first physical frame location on a first track, and wherein the at least one reserved location is on a reserved track which is not the first track;
   wherein the first track is recorded or read when relative movement between the head unit and the tape is in a first direction and the track having the at least one reserved location is recorded or read when relative movement between the head unit and the tape is in a direction which is opposite the first direction.

2. The method of claim 1, wherein a plurality of tracks are employed to record each frame, and wherein the reserved location employs a corresponding plurality of tracks.

3. The method of claim 2, wherein the frame is recorded at the first physical frame location on a first group of tracks, and wherein the at least one reserved location is on a second group of tracks.

4. The method of claim 1, further comprising recording on the tape the memory with the pairing of the first physical frame location with the reserved location.

5. The method of claim 4, wherein the memory is recorded as a frame on the tape.

6. The method of claim 5, wherein the memory is recorded as a frame in a partition of the tape not utilized for user data.

7. A method of operating a magnetic tape drive which transduces frames of information to and from magnetic tape, the method comprising:

(1) reserving at least one reserved location on the tape for the re-recording of frames;

(2) recording a frame at a first physical frame location on the tape during a recording mode; and (3) after the recording of step (2), checking whether the frame is readable or accurately recorded;

(4) if the result of the checking of step (3) is negative, re-recording the frame at the reserved location and establishing in a memory a pairing of the first physical frame location with the reserved location;

wherein the magnetic tape drive uses a head unit to transduce frames of information to and from tracks of the magnetic tape, wherein the frame is recorded at the first physical frame location on a first track, and wherein the at least one reserved location is on a reserved track which is not the first track;

wherein the step of re-recording the frame at the reserved location comprises:

moving a head unit to a bidirectional track, the bidirectional track having at least a first group of frame locations in which frames are recordable when the relative motion between the head unit and the tape occurs in a first direction and a second group of frame locations in which frames are recordable when the relative motion between the head unit and the tape occurs in a second direction, the second direction being opposite to the first direction; the recording of step (2) having been done in the first direction;

transporting one of the head unit and the tape until the head unit is proximate the second group of frame locations; and re-recording the frame at an available one of the frame locations in the second group of frame locations.

8. A method of operating a magnetic tape drive to transduce frames of information from magnetic tape, the method comprising:

(1) acquiring contents of a defect map from the tape, the defect map having a pairing of a frame original physical location on the tape with a frame re-recording physical location for a frame which is unreadable or erroneously recorded in its frame original physical location, the frame re-recording location being in a reserved portion of the tape;

(2) reading non-defective frames from corresponding frame original physical locations on the tape;

(3) when an original physical location is encountered on the tape for which there is a pairing in the defect map, obtaining the contents of a frame from a paired frame re-recording physical location;

wherein the reading of step (2) occurs when relative movement between the head unit and the tape is in a first direction and wherein a track having the frame re-recording physical location is read when relative movement between the head unit and the tape is in a direction which is opposite the first direction.

9. The method of claim 8, wherein a plurality of tracks are employed to record each frame, and wherein the frame re-recording physical location employs a corresponding plurality of tracks.

10. The method of claim 9, wherein the original physical frame location is on a first group of tracks, and wherein the frame re-recording physical location is on a second group of tracks.

11. A method of operating a magnetic tape drive to transduce frames of information from magnetic tape, the method comprising:

(1) acquiring contents of a defect map from the tape, the defect map having a pairing of a frame original physical location on the tape with a frame re-recording physical location for a frame which is unreadable or erroneously recorded in its frame original physical location, the frame re-recording location being in a reserved portion of the tape;

(2) reading non-defective frames from corresponding frame original physical locations on the tape;

(3) when an original physical location is encountered on the tape for which there is a pairing in the defect map, obtaining the contents of a frame from a paired frame re-recording physical location;

wherein the step of obtaining the contents of a frame from a paired frame re-recording physical location comprises:

moving a head unit to a bidirectional track, the bidirectional track having at least a first group of frame locations in which frames are recordable when the relative motion between the head unit and the tape occurs in a first direction and a second group of frame locations in which frames are recordable when the relative motion between the head unit and the tape occurs in a second direction, the second direction being opposite to the first direction; the encountering of step (3) having been done in the first direction;

transporting one of the head unit and the tape until the head unit is proximate the second group of frame locations; and reading the contents of a frame from the second group of frame locations in accordance with the defect map.

12. A magnetic tape drive comprising:

a head unit which contains at least one head element for transducing information to or from tracks on the tape, the head unit including a write element for writing a frame to the tape during a write mode and a read element for reading back the frame from the tape during the write mode;

a transport for moving the tape relative to the head unit;

a controller which, when a frame is unable to be read back from its original physical location on a first track or is read back from its original physical location on the first track as a defective frame, causes the frame to be re-recorded at a reserved physical location on the tape and establishes in a memory a mapping of the frame's original physical location with the reserved physical location;

wherein the first track is recorded or read when relative movement between the head unit and the tape is in a first direction and the reserved physical location is recorded or read when relative movement between the head unit and the tape is in a direction which is opposite the first direction.

13. The apparatus of claim 12, wherein a plurality of tracks are employed to record each frame, and wherein the reserved location employs a corresponding plurality of tracks.

14. The apparatus of claim 13, wherein the frame is recorded at a first physical frame location on a first group of tracks, and wherein the reserved location is on a second group of tracks.

15. The apparatus of claim 12, wherein the controller causes the write head to record the memory on the tape.

16. The apparatus of claim 15, wherein the controller causes the write head to record the memory as a frame on the tape.

17. The apparatus of claim 16, wherein the controller causes the write head to record the memory as a frame in a partition of the tape not utilized for user data.

18. A method of operating a magnetic tape drive having a head unit which transduces frames of information to and from magnetic tape, the method comprising:

(1) recording a frame at a first physical frame location on the tape during a recording mode; and (2) after the recording of step (1), checking whether the frame is readable or accurately recorded;

(3) if the result of the checking of step (2) is negative, re-recording the frame at a second physical frame location on the tape;

wherein the frame is recorded at the first physical frame location when relative movement between the head unit and the tape is in a first direction and wherein the frame is recorded at the second physical frame location when relative movement between the head unit and the tape is in a second direction which is opposite the first direction.

19. A method of operating a magnetic tape drive having a head unit which transduces frames of information to and from magnetic tape, the method comprising:

(1) recording a frame at a first physical frame location on the tape during a recording mode; and (2) after the recording of step (1), checking whether the frame is readable or accurately recorded;

(3) if the result of the checking of step (2) is negative, re-recording the frame at a second physical frame location on the tape;

wherein the re-recording of the frame at step (3) comprises:

moving the head unit to a bidirectional track, the bidirectional track having at least a first group of frame locations in which frames are recordable when the relative motion between the head unit and the tape occurs in a first direction and a second group of frame locations in which frames are recordable when the relative motion between the head unit and the tape occurs in a second direction, the second direction being opposite to the first direction; the recording of step (1) having been done in the first direction;

transporting one of the head unit and the tape until the head unit is proximate the second group of frame locations; and re-recording the frame at the second physical frame location in the second group of frame locations.

* * * * *